(12) United States Patent
Kinsman et al.

(10) Patent No.: US 9,010,768 B2
(45) Date of Patent: *Apr. 21, 2015

(54) SUSPENSION SYSTEM FOR A VEHICLE

(71) Applicant: Polaris Industries Inc., Medina, MN (US)

(72) Inventors: Anthony J. Kinsman, Wyoming, MN (US); Kelly J. Knutson, Middle River, MN (US); Louis J. Brady, Wyoming, MN (US); Donald Brett Gass, Dreieich (DE)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,447

(22) Filed: Dec. 20, 2013

(65) Prior Publication Data

US 2014/0110893 A1  Apr. 24, 2014

Related U.S. Application Data

(60) Continuation of application No. 13/667,851, filed on Nov. 2, 2012, now Pat. No. 8,613,337, which is a continuation of application No. 13/314,929, filed on Dec. 8, 2011, now Pat. No. 8,302,711, which is a division of application No. 12/134,909, filed on Jun. 6, 2008, now Pat. No. 8,079,602.

(51) Int. Cl.
*B60G 17/016* (2006.01)
*B60G 15/06* (2006.01)
(Continued)

(52) U.S. Cl.
CPC ............ *B60G 15/062* (2013.01); *B60G 15/063* (2013.01); *B60G 17/021* (2013.01); *B60G 2200/18* (2013.01); *B60G 2202/242* (2013.01); *B60G 2202/312* (2013.01); *B60G 2204/416* (2013.01); *B60G 2204/4502* (2013.01); *B60G 2206/60* (2013.01); *B60G 2300/13* (2013.01); *B60L 11/126* (2013.01); *B60L 11/14* (2013.01);
(Continued)

(58) Field of Classification Search
USPC .......... 280/5.512, 5.514, 5.515; 188/124.103, 188/322.19, 321; 267/221, 226
See application file for complete search history.

(56) References Cited

U.S. PATENT DOCUMENTS

| D119,377 S | 3/1940 | Cadwallader |
| 2,553,795 A | 5/1951 | Staude |

(Continued)

FOREIGN PATENT DOCUMENTS

| DE | 2210070 A1 | 9/1973 |
| EP | 0237085 A1 | 9/1987 |

(Continued)

OTHER PUBLICATIONS

2009 Honda Big Red, ATV Illustrated at http://www.atvillustrated.com/?q=node/6615/20/2008, 6 pgs.
(Continued)

*Primary Examiner* — Faye M. Fleming
(74) *Attorney, Agent, or Firm* — Faegre Baker Daniels LLP

(57) ABSTRACT

A utility vehicle is disclosed. The utility vehicle may include storage areas under the dash. The utility vehicle may include suspension systems for utility vehicles having shocks with both a fluidic stiffness adjustment and a mechanical stiffness adjustment. The utility vehicle may include an electrical power steering.

17 Claims, 48 Drawing Sheets

(51) Int. Cl.
  *B60G 17/02* (2006.01)
  *B60L 11/12* (2006.01)
  *B60L 11/14* (2006.01)
  *B62D 5/04* (2006.01)
  *B62D 21/14* (2006.01)
  *B62D 21/18* (2006.01)
  *B62D 33/02* (2006.01)
  *F16F 9/02* (2006.01)
  *F16F 13/00* (2006.01)
  *B60R 21/13* (2006.01)

(52) U.S. Cl.
  CPC .......... *B60L 2200/22* (2013.01); *B60L 2200/36* (2013.01); *B60L 2240/12* (2013.01); *B60L 2240/441* (2013.01); *B60L 2270/145* (2013.01); *B60R 21/13* (2013.01); *B62D 5/04* (2013.01); *B62D 21/14* (2013.01); *B62D 21/186* (2013.01); *B62D 33/02* (2013.01); *F16F 9/0218* (2013.01); *F16F 13/002* (2013.01); *Y02T 10/6217* (2013.01); *Y02T 10/7077* (2013.01)

(56) References Cited

U.S. PATENT DOCUMENTS

| | | |
|---|---|---|
| 3,048,233 A | 8/1962 | Crain et al. |
| 3,734,219 A | 5/1973 | Christensen et al. |
| 3,861,229 A | 1/1975 | Domaas |
| 4,010,975 A | 3/1977 | Horton |
| 4,577,716 A | 3/1986 | Norton |
| 4,671,521 A | 6/1987 | Talbot et al. |
| 4,686,433 A | 8/1987 | Shimizu |
| 4,712,629 A | 12/1987 | Takahashi et al. |
| D312,441 S | 11/1990 | Guelfi et al. |
| 5,010,970 A | 4/1991 | Yamamoto |
| 5,020,616 A | 6/1991 | Yagi et al. |
| 5,021,721 A | 6/1991 | Oshita et al. |
| 5,027,915 A | 7/1991 | Suzuki et al. |
| 5,038,582 A | 8/1991 | Takamatsu |
| 5,044,614 A | 9/1991 | Rau |
| 5,076,383 A | 12/1991 | Inoue et al. |
| 5,078,225 A | 1/1992 | Ohmura et al. |
| 5,181,696 A | 1/1993 | Abe |
| 5,195,607 A | 3/1993 | Shimada et al. |
| 5,205,371 A | 4/1993 | Karnopp |
| 5,253,730 A | 10/1993 | Hayashi et al. |
| D354,264 S | 1/1995 | McCoy |
| 5,473,990 A | 12/1995 | Anderson et al. |
| D373,099 S | 8/1996 | Molzon et al. |
| 5,653,304 A | 8/1997 | Renfroe |
| D391,911 S | 3/1998 | Lagaay et al. |
| 5,820,114 A | 10/1998 | Tsai |
| 5,887,671 A | 3/1999 | Yuki et al. |
| 5,921,343 A | 7/1999 | Yamakaji |
| 5,957,252 A | 9/1999 | Berthold |
| D414,735 S | 10/1999 | Gerisch et al. |
| 5,961,106 A | 10/1999 | Shaffer |
| D421,934 S | 3/2000 | Hunter et al. |
| 6,095,275 A | 8/2000 | Shaw |
| 6,098,739 A | 8/2000 | Anderson et al. |
| 6,120,399 A | 9/2000 | Okeson et al. |
| 6,176,796 B1 | 1/2001 | Lislegard |
| 6,202,993 B1 | 3/2001 | Wilms et al. |
| D461,151 S | 8/2002 | Morris |
| D467,200 S | 12/2002 | Luo et al. |
| D472,193 S | 3/2003 | Sinkwitz |
| 6,547,224 B2 | 4/2003 | Jensen et al. |
| 6,553,761 B2 | 4/2003 | Beck |
| 6,582,002 B2 | 6/2003 | Hogan et al. |
| D476,935 S | 7/2003 | Boyer |
| 6,725,962 B1 | 4/2004 | Fukuda |
| D490,018 S | 5/2004 | Berg et al. |
| 6,767,022 B1 | 7/2004 | Chevalier |
| D493,749 S | 8/2004 | Duncan |
| D497,324 S | 10/2004 | Chestnut et al. |
| D497,327 S | 10/2004 | Lai |
| D498,435 S | 11/2004 | Saito et al. |
| 6,827,184 B1 | 12/2004 | Lin |
| D501,570 S | 2/2005 | Tandrup et al. |
| 6,860,826 B1 | 3/2005 | Johnson |
| D503,905 S | 4/2005 | Saito et al. |
| D507,766 S | 7/2005 | McMahan et al. |
| D508,224 S | 8/2005 | Mays et al. |
| 6,938,508 B1 | 9/2005 | Saagge |
| 6,942,050 B1 | 9/2005 | Honkala et al. |
| 6,966,399 B2 | 11/2005 | Tanigaki et al. |
| 6,978,857 B2 | 12/2005 | Korenjak |
| 7,000,931 B1 | 2/2006 | Chevalier |
| D519,439 S | 4/2006 | Dahl et al. |
| D521,413 S | 5/2006 | Katoh |
| 7,055,454 B1 | 6/2006 | Whiting et al. |
| 7,077,233 B2 | 7/2006 | Hasegawa |
| 7,096,988 B2 | 8/2006 | Moriyama |
| 7,147,075 B2 | 12/2006 | Tanaka et al. |
| 7,182,169 B2 | 2/2007 | Suzuki |
| 7,185,732 B2 | 3/2007 | Saito et al. |
| 7,213,669 B2 | 5/2007 | Fecteau et al. |
| 7,216,733 B2 | 5/2007 | Iwami et al. |
| D548,662 S | 8/2007 | Markefka |
| 7,287,619 B2 | 10/2007 | Tanaka et al. |
| D555,036 S | 11/2007 | Eck |
| 7,347,296 B2 | 3/2008 | Nakamura et al. |
| 7,367,247 B2 | 5/2008 | Horiuchi et al. |
| 7,367,417 B2 | 5/2008 | Inui et al. |
| 7,370,724 B2 | 5/2008 | Saito et al. |
| 7,374,012 B2 | 5/2008 | Inui et al. |
| 7,377,351 B2 | 5/2008 | Smith et al. |
| 7,380,622 B2 | 6/2008 | Shimizu |
| D578,433 S | 10/2008 | Kawaguchi et al. |
| D578,934 S | 10/2008 | Tanaka et al. |
| 7,438,147 B2 | 10/2008 | Kato et al. |
| 7,458,593 B2 | 12/2008 | Saito et al. |
| 7,481,293 B2 | 1/2009 | Ogawa et al. |
| D586,694 S | 2/2009 | Huang et al. |
| 7,490,694 B1 | 2/2009 | Berg et al. |
| 7,497,299 B2 | 3/2009 | Kobayashi |
| 7,497,471 B2 | 3/2009 | Kobayashi |
| D592,998 S | 5/2009 | Woodard, Jr. et al. |
| 7,540,511 B2 | 6/2009 | Saito et al. |
| D595,613 S | 7/2009 | Lai et al. |
| 7,565,944 B2 | 7/2009 | Sakamoto et al. |
| 7,565,945 B2 | 7/2009 | Okada et al. |
| 7,600,603 B2 | 10/2009 | Okada et al. |
| 7,604,084 B2 | 10/2009 | Okada et al. |
| 7,610,132 B2 | 10/2009 | Yanai et al. |
| D604,201 S | 11/2009 | Kawaguchi et al. |
| 7,623,327 B2 | 11/2009 | Ogawa |
| D610,514 S | 2/2010 | Eck |
| 7,740,103 B2 | 6/2010 | Sasajima |
| 7,742,851 B2 | 6/2010 | Hisada et al. |
| D631,395 S | 1/2011 | Tandrup et al. |
| 7,913,782 B1 | 3/2011 | Foss et al. |
| 8,079,602 B2 | 12/2011 | Kinsman et al. |
| 8,302,711 B2 | 11/2012 | Kinsman et al. |
| 8,613,337 B2 | 12/2013 | Kinsman et al. |
| 2001/0007396 A1 | 7/2001 | Mizuta |
| 2001/0013433 A1 | 8/2001 | Szymkowiak |
| 2003/0132075 A1 | 7/2003 | Drivers |
| 2003/0173754 A1 | 9/2003 | Bryant |
| 2004/0153782 A1 | 8/2004 | Fukui et al. |
| 2004/0195018 A1 | 10/2004 | Inui et al. |
| 2004/0195019 A1 | 10/2004 | Kato et al. |
| 2004/0195034 A1 | 10/2004 | Kato et al. |
| 2004/0221669 A1 | 11/2004 | Shimizu et al. |
| 2004/0226384 A1 | 11/2004 | Shimizu et al. |
| 2005/0012421 A1 | 1/2005 | Fukuda et al. |
| 2005/0045414 A1 | 3/2005 | Takagi et al. |
| 2005/0173177 A1 | 8/2005 | Smith et al. |
| 2005/0231145 A1 | 10/2005 | Mukai et al. |
| 2005/0235767 A1 | 10/2005 | Shimizu et al. |
| 2005/0235768 A1 | 10/2005 | Shimizu et al. |
| 2005/0242677 A1 | 11/2005 | Akutsu et al. |

(56) References Cited

U.S. PATENT DOCUMENTS

| | | |
|---|---|---|
| 2005/0246052 A1 | 11/2005 | Coleman et al. |
| 2005/0257989 A1 | 11/2005 | Iwami et al. |
| 2005/0257990 A1 | 11/2005 | Shimizu |
| 2005/0267660 A1 | 12/2005 | Fujiwara et al. |
| 2005/0269141 A1 | 12/2005 | Davis et al. |
| 2006/0006010 A1 | 1/2006 | Nakamura et al. |
| 2006/0022619 A1 | 2/2006 | Koike et al. |
| 2006/0042862 A1 | 3/2006 | Saito et al. |
| 2006/0055139 A1 | 3/2006 | Furumi et al. |
| 2006/0065472 A1 | 3/2006 | Ogawa et al. |
| 2006/0075840 A1 | 4/2006 | Saito et al. |
| 2006/0076180 A1 | 4/2006 | Saito et al. |
| 2006/0108174 A1 | 5/2006 | Saito et al. |
| 2006/0162990 A1 | 7/2006 | Saito et al. |
| 2006/0169525 A1 | 8/2006 | Saito et al. |
| 2006/0175124 A1 | 8/2006 | Saito et al. |
| 2006/0180383 A1 | 8/2006 | Bataille |
| 2006/0180385 A1 | 8/2006 | Yanai et al. |
| 2006/0185741 A1 | 8/2006 | McKee |
| 2006/0185927 A1 | 8/2006 | Sakamoto et al. |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito et al. |
| 2006/0196722 A1 | 9/2006 | Makabe et al. |
| 2006/0201270 A1 | 9/2006 | Kobayashi |
| 2006/0207823 A1 | 9/2006 | Okada et al. |
| 2006/0207824 A1 | 9/2006 | Saito et al. |
| 2006/0207825 A1 | 9/2006 | Okada et al. |
| 2006/0208564 A1 | 9/2006 | Yuda et al. |
| 2006/0212200 A1 | 9/2006 | Yanai et al. |
| 2006/0219452 A1 | 10/2006 | Okada et al. |
| 2006/0219469 A1 | 10/2006 | Okada et al. |
| 2006/0219470 A1 | 10/2006 | Imagawa et al. |
| 2006/0270503 A1 | 11/2006 | Suzuki et al. |
| 2006/0288800 A1 | 12/2006 | Mukai et al. |
| 2007/0023566 A1 | 2/2007 | Howard |
| 2007/0068726 A1 | 3/2007 | Shimizu |
| 2007/0074588 A1 | 4/2007 | Harata et al. |
| 2007/0074589 A1 | 4/2007 | Harata et al. |
| 2007/0074927 A1 | 4/2007 | Okada et al. |
| 2007/0074928 A1 | 4/2007 | Okada et al. |
| 2007/0095601 A1 | 5/2007 | Okada et al. |
| 2007/0096449 A1 | 5/2007 | Okada et al. |
| 2007/0175696 A1 | 8/2007 | Saito et al. |
| 2007/0215404 A1 | 9/2007 | Lan et al. |
| 2007/0242398 A1 | 10/2007 | Ogawa |
| 2007/0261904 A1 | 11/2007 | Fecteau et al. |
| 2008/0023240 A1 | 1/2008 | Sunsdahl et al. |
| 2008/0023249 A1 | 1/2008 | Sunsdahl et al. |
| 2008/0041335 A1 | 2/2008 | Buchwitz et al. |
| 2008/0053738 A1 | 3/2008 | Kosuge et al. |
| 2008/0053743 A1 | 3/2008 | Tomita |
| 2008/0199253 A1 | 8/2008 | Okada et al. |
| 2008/0257630 A1 | 10/2008 | Takeshima et al. |
| 2008/0284124 A1 | 11/2008 | Brady et al. |
| 2008/0308334 A1 | 12/2008 | Leonard et al. |
| 2009/0000849 A1 | 1/2009 | Leonard et al. |
| 2009/0071737 A1 | 3/2009 | Leonard et al. |
| 2009/0071739 A1 | 3/2009 | Leonard et al. |
| 2009/0078491 A1 | 3/2009 | Tsutsumikoshi |
| 2009/0091101 A1 | 4/2009 | Leonard et al. |
| 2009/0121518 A1 | 5/2009 | Leonard et al. |
| 2009/0152035 A1 | 6/2009 | Okada et al. |
| 2009/0152036 A1 | 6/2009 | Okada et al. |
| 2009/0302590 A1 | 12/2009 | Van Bronkhorst et al. |
| 2010/0155170 A1 | 6/2010 | Melvin et al. |

FOREIGN PATENT DOCUMENTS

| | | |
|---|---|---|
| EP | 0575962 | 12/1993 |
| EP | 0893618 A2 | 1/1999 |
| FR | 2460797 A | 1/1981 |
| GB | 2081191 A | 2/1982 |
| GB | 2316923 | 12/1993 |
| GB | 2423066 A | 8/2003 |
| JP | 2005193788 | 3/1999 |
| JP | 2006232058 A | 9/2006 |
| JP | 2006232061 A | 9/2006 |
| JP | 2006256579 A | 9/2006 |
| JP | 2006256580 A | 9/2006 |
| JP | 2006281839 A | 10/2006 |
| JP | 2007106319 A | 4/2007 |
| WO | WO 2007/103197 A2 | 9/2007 |
| WO | WO 2008/013564 A1 | 1/2008 |
| WO | WO 2009/096998 | 6/2009 |

OTHER PUBLICATIONS

Arctic Cat, company website, Prowler XT 650 H1, undated, 9 pgs.

ATV Illustrated, "2009 Honda Big Red," retrieved from http://www.atvillustrated.com/?q=node/661, May 20, 2008, 6 pgs.

Boss Plow System for RANGER, at http:www.purepolaris.com/Detail.aspx?ItemID=2876870(PolarisPGACatalog), May 14, 2008, 2 pgs.

Boss Smarthitch 2 at http:www.bossplow.com/smarthitch.html, May 14, 2008, 13 pgs.

Buyers' Guide Supplement, 2006 Kart Guide, Powersports Business Magazine, 6 pgs.

Club Car, company website, product pages For XRT 1500 SE, undated, 2 pgs.

DuneGuide.com, "Product Review 2009 Honda Big Red MUV," retrieved from http:www.duneguide.com/ProductReview_Honda_BigRed.htm, May 20, 2008, 3 pgs.

Eulenbach, Dr.Ing. Dieter, NIVOMAT: The Automatic Level Control System with Spring Function and Damping Function, Lecture given as part of the course "Springing and damping systems for road and rail vehicles" at the Technical Academy of Esslingen, Oct. 11, 2000, 8 pgs.

European Patent Office, International Preliminary Report on Patentability for PCT/US2009/042986, Aug. 31, 2010, 15 pgs.

European Patent Office, International Search Report and Written Opinion for PCT/US2009/042985, Sep. 4, 2009, 23 pgs.

European Patent Office, International Search Report and Written Opinion for PCT/US2009/042986,Dec. 18, 2009, 17 pgs.

High-Performance "Truck Steering" Automotive Engineering, Society of Automotive Engineers. Warrendale, Us, vol. 98. No. 4, Apr. 1, 1990, pp. 56-60.

Honda Hippo 1800 New Competition for Yamaha's Rhino, Dirt Wheels Magazine, Apr. 2006, pp. 91-92.

Improved Fox Shox, Motocross Action, Mar. 1977 issue, 1 pg.

Polaris Ranger 2009 Brochure, ©2008, Polaris Industries Inc., 32 pgs.

Ray Sedorchuk, New for 2004, Yamaha Rhino 660 4x4, ATV Connection Magazine, Copyright 1996-2005, 4 pgs., Internet webpage.

Shock Owner's Manual: Float ATV + Snowmobile—Fox Racing Shox, 2006, 18 pgs.

Shock Owner's Manual: Float ATV Front Applications—Fox Racing Shox, 2004, 21 pgs.

Shock Owner's Manual: Float MXR—Fox Racing Shox, 2006, 16 pgs.

Shock Owner's Manual: Float X Evol — Snowmobile Applications, 2006, 32 pgs.

The International Bureau of Wipo,International Preliminary Report on Patentability for PCT/US2009/042985, Nov. 9, 2010, 11 pgs.

Welcome to Ranger Country brochure, © 2005, Polaris Industries Inc., 24 pgs.

Welcome to Ranger Country brochure, © 2006, Polaris Industries Inc., 20 pgs.

Work/Play Only Ranger brochure, © 2007, Polaris Industries Inc., 28 pgs.

Yamaha, company website, 2006 Rhino 450 Auto 4x4, Copyright 2006, 4 pgs.

Yamaha, company website, 2006 Rhino 660 Auto 4x4 Exploring Edition, Copyright 2006, 13 pgs.

(56) References Cited

OTHER PUBLICATIONS

Yamaha, company website, 2006 Rhino 660 Auto 4x4 Special Edition, Copyright 2006, 4 pgs.

Yamaha, company website, 2006 Rhino 660 Auto 4x4, Copyright 2006, 4 pgs.

European Patent Office, Written Opinion of the International Preliminary Examining Authority, for PCT/US2009/042986, May 20, 2019; 9 pages.

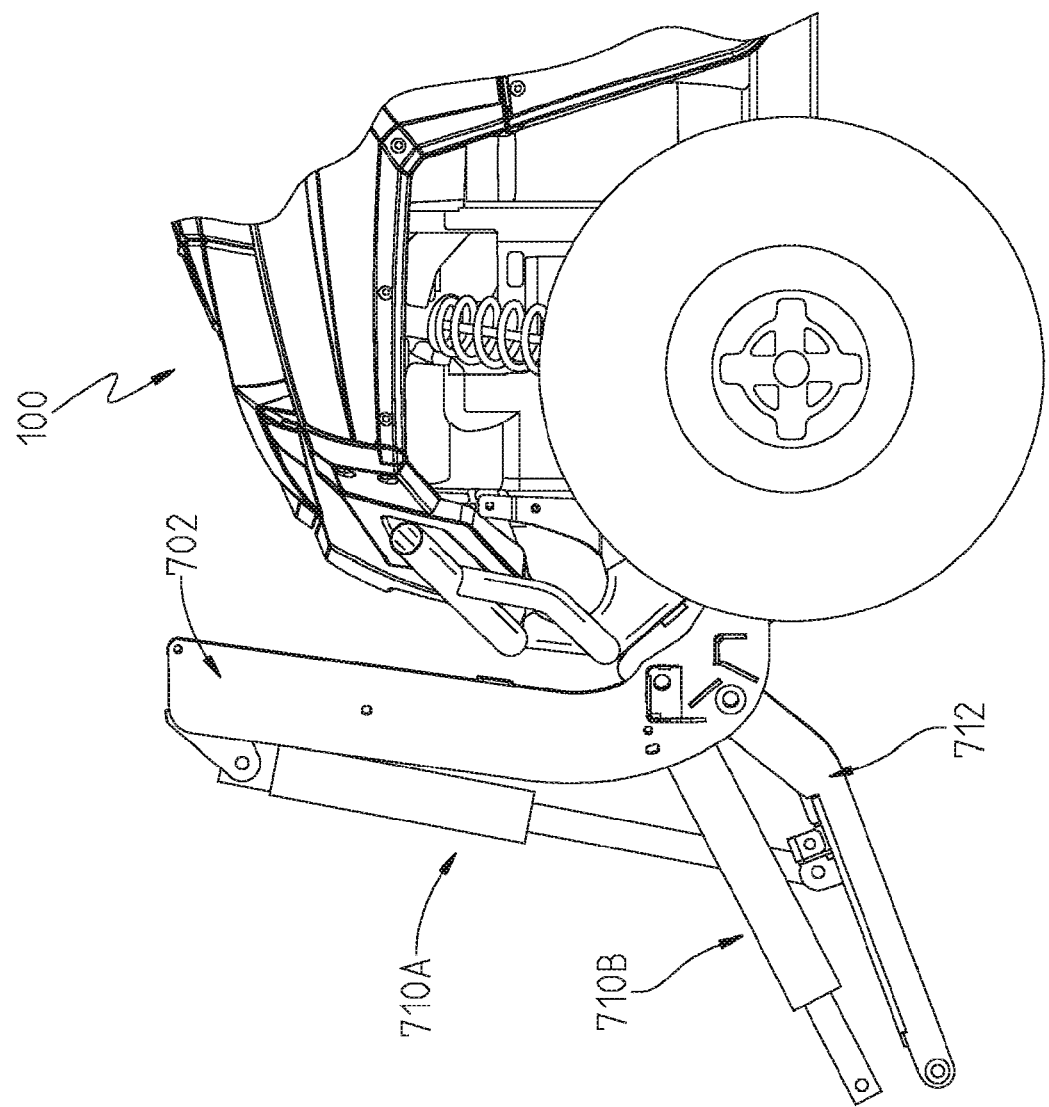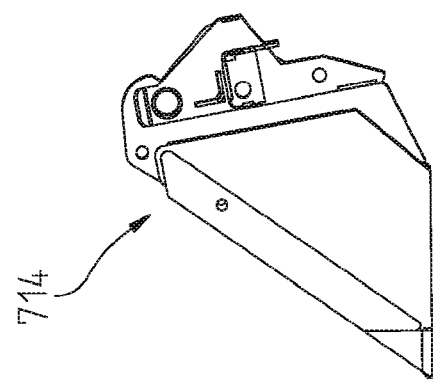
FIG. 47

SUSPENSION SYSTEM FOR A VEHICLE

RELATED APPLICATION

This application is a continuation of U.S. patent application Ser. No. 13/667,851, filed Nov. 2, 2012, titled AIR INTAKE SYSTEM FOR A VEHICLE, which is a continuation of U.S. patent application Ser. No. 13/314,929, U.S. Pat. No. 8,302,711, filed Dec. 8, 2011, titled SUSPENSION SYSTEMS FOR A VEHICLE, which is a divisional of U.S. patent application Ser. No. 12/134,909, U.S. Pat. No. 8,079,602, filed Jun. 6, 2008, titled SUSPENSION SYSTEMS FOR A VEHICLE, the disclosures of which are expressly incorporated by reference herein.

This application is related to U.S. patent application Ser. No. 12/135,107, filed Jun. 6, 2006, and U.S. Design patent application Ser. No. 29/317,885, filed May 8, 2008, the disclosures of which are expressly incorporated by reference herein.

FIELD OF THE INVENTION

The present invention relates generally to a vehicle and in particular to a utility vehicle having side-by-side seating.

BACKGROUND AND SUMMARY OF THE INVENTION

Utility vehicles are known. The present disclosure relates to vehicles, including utility vehicles. The present disclosure relates to utility vehicles having storage areas under the dash. The present disclosure relates to suspension systems for utility vehicles. The present disclosure relates to utility vehicles with an electrical power steering.

In exemplary embodiment of the present disclosure, a utility vehicle is provided. The utility vehicle, comprising a frame; a power source supported by the frame; seating supported by the frame, the seating having at least one seat bottom member and at least one seat back member; an operator area adapted for use by a vehicle operator when the vehicle is in motion, the at least one seat bottom member and the at least one seat back member being positioned within the operator area; a roll cage supported by the frame and positioned to protect the operator area; and a plurality of ground engaging members supporting the frame above the ground. The plurality of ground engaging members including at least two front ground engaging members positioned forward of the operator area and at least two ground engaging members located rearward of the operator area, wherein at least one of the plurality of ground engaging members are operatively coupled to the power source to propel the utility vehicle relative to the ground. The utility vehicle further comprising a braking system including at least one brake operatively coupled to at least one of the plurality of ground engaging members and a brake pedal supported by the frame, positioned in the operator area, and operatively coupled to the brake; an acceleration pedal supported by the frame, positioned in the operator area, and operatively coupled the power source; a dashboard supported by the frame and located above the acceleration pedal and forward of the seating; and at least one storage bin open to the operator area, supported by the frame, and positioned lower than the dashboard. In one example, the at least one storage bin is positioned lower than a top portion of the seat bottom member. In other example, the at least one storage bin is positioned opposite the seating in the operator area. In a variation thereof, the at least one storage bin is positioned below the dashboard. In a further example, the at least one storage bin includes a first storage bin positioned to a first lateral side of the accelerator pedal and a second storage bin positioned to a second lateral side of the accelerator pedal. In a variation thereof, the first storage bin includes a first bottom surface and the second storage bin includes a second bottom surface. The first bottom surface and the second bottom surface being angled downward from a front portion of the respective storage bin to a back portion of the respective storage bin to assist in retaining cargo placed in the respective first storage bin and second storage bin. In an additional example, the at least one storage bin includes a plurality of storage bins as part of a under dash body panel. In a variation thereof, the utility vehicle further comprises a steering assembly including a steering rod operatively coupled to the at least two front ground engaging members and a steering wheel supported by the frame and extending into the operator area through an opening in the dashboard and an opening in the under dash body panel, the steering wheel being operatively coupled to the steering rod to control an orientation of the at least two front ground engaging members. In another variation thereof, the under dash body panel includes an upper portion which defines a glove box and the dashboard includes an opening for accessing the glove box. In still a further example, the power source is positioned rearward of the dashboard. In still another example, the dashboard supports a modular instrument panel which may be uncoupled from the dashboard.

In another exemplary embodiment of the present disclosure, a utility vehicle is provided. The utility vehicle, comprising: a frame; a power source supported by the frame; seating supported by the frame, the seating having at least one seat bottom surface and at least one seat back surface; an operator area adapted for use by a vehicle operator when the vehicle is in motion, the at least one seat bottom surface and the at least one seat back surface being positioned within the operator area; a roll cage supported by the frame and positioned to protect the operator area; a plurality of ground engaging members supporting the frame above the ground; a dashboard body panel member supported by the frame and located above the acceleration pedal and forward of the seating, a floor body panel member supported by the frame and positioned below the dashboard and defining at least one floor surface; and at least one intermediate body panel member positioned between the dashboard body panel member and the floor body panel member, wherein the at least one intermediate body panel member substantially blocks air from a front portion of the utility vehicle from entering the operator area between the dashboard body panel member and the floor body panel member. The plurality of ground engaging members including at least two front ground engaging members positioned forward of the operator area and at least two ground engaging members located rearward of the operator area, wherein at least one of the plurality of ground engaging members are operatively coupled to the power source to propel the utility vehicle relative to the ground. In one example, the at least one intermediate body panel member defines at least one storage bin open to the operator area. In a variation thereof, the at least one intermediate body panel member includes an under dash body panel member coupled to the dashboard body panel member and a front body panel member coupled to the floor body panel member, the under dash body panel member and the front body panel member overlapping and the under dash body panel member including the storage bins. In another example, the at least one intermediate body panel member define a first storage bin which is accessible through an opening in the dashboard body panel member. In a variation thereof, the at least one intermediate body panel member further defines a second storage bin open to the operator area.

In a further exemplary embodiment of the present disclosure, a vehicle is provided. The vehicle, comprising: a frame; a power source supported by the frame; seating supported by the frame, the seating having at least one seat bottom surface and at least one seat back surface; an operator area adapted for use by a vehicle operator when the vehicle is in motion, the at least one seat bottom surface and the at least one seat back surface being positioned within the operator area; a plurality of ground engaging members supporting the frame above the ground; and a body panel defining a storage bin and supported by the frame, the body panel having a first portion defining a plurality of side surfaces of the storage bin and a back surface of the storage bin and a second portion defining a front surface of the storage bin and an access opening into an interior of the storage bin, wherein the second portion is coupled to the first portion through a living hinge. The plurality of ground engaging members including at least two front ground engaging members positioned forward of the operator area and at least two ground engaging members located rearward of the operator area, wherein at least one of the plurality of ground engaging members are operatively coupled to the power source to propel the vehicle relative to the ground. In one example, the storage bin has a first width and the access opening has a second width, the second width being less than the first width. In a variation, the storage bin is a glove box and the body panel is positioned behind a dashboard body panel such that the access opening is generally aligned with a glove box opening in the dashboard body panel.

In yet a further exemplary embodiment of the present disclosure, a shock is provided. The shock, comprising: a first body member supporting a piston and having a first stop member; a second body member having a second stop member, the first body member being received in an interior of the second body member, the piston being received in an interior of the second body member; a spring being compressed between the first stop member of the first body member and the second stop member of the second body member, at least one of the first stop member and the second stop member being moveable relative to the respective one of the first body member and the second body member; and an air inlet member being in fluid communication with the interior the second body member. In one example, the second stop member is moveable relative to the second body member to adjust the compression of the spring between the first stop member and the second stop member. In a variation thereof, the second stop member is a ring having a threaded internal surface which engages with a threaded external surface of the second body member. In another example, an overall stiffness of the shock may be adjusted by both a mechanical stiffness and a fluidic stiffness. In a variation thereof, the mechanical stiffness is adjusted by changing a separation of the first stop member and the second stop member. In another variation thereof, the fluidic stiffness is adjusted by passing air through the air inlet and one of into the interior of the second body member and out of the interior of the second body member.

In yet another exemplary embodiment of the present disclosure, a shock is provided. The shock comprising a first body member supporting a piston and having a first external stop member; a second body member having a second external stop member, the piston being received in an interior of the second body member; an air inlet member being in fluid communication with the interior the second body member; and a spring being compressed between the first external stop member of the first body member and the second external stop member of the second body member. A stiffness of the shock being adjustable both by changing an air pressure in the interior of the second body member and changing a separation of the first external stop member and the second external stop member. In one example, at least one of the first external stop member and the second external stop member is moveable relative to the respective one of the first body member and the second body member.

In still another exemplary embodiment of the present disclosure, a method of adjusting a stiffness of a suspension of a vehicle is provided. The method comprising the steps of providing an air shock having an interior for receiving compressed air to adjust a fluidic stiffness of the air shock and an external spring disposed between two stop members whose separation is adjustable to adjust a mechanical stiffness of the air shock, a sum of the fluidic stiffness and the mechanical stiffness giving an overall stiffness for the air shock; and setting the mechanical stiffness and the fluidic stiffness to correspond to an overall stiffness for a standard setup of the suspension. In one example, the air shock is adjusted to a second setup wherein the air pressure in the interior of the air shock is increased by adding additional compressed air. In a variation thereof, the second setup corresponds to when a load is placed on the vehicle and the additional compressed air is added to compensate for the increased load on the vehicle. In a further variation, the pressure in the interior of the air shock is at atmosphere in the standard setup and is at a positive pressure in the second setup.

In still a further exemplary embodiment of the present disclosure, a vehicle is provided. The vehicle comprising a frame; a power source supported by the frame; seating supported by the frame, the seating having at least one seat bottom surface and at least one seat back surface; an operator area adapted for use by a vehicle operator when the vehicle is in motion, the at least one seat bottom surface and the at least one seat back surface being positioned within the operator area; a roll cage supported by the frame and positioned to protect the operator area; a plurality of ground engaging members supporting the frame above the ground, the plurality of ground engaging members including at least two front ground engaging members positioned forward of the operator area and at least two ground engaging members located rearward of the operator area, wherein at least one of the plurality of ground engaging members are operatively coupled to the power source to propel the vehicle relative to the ground; a front suspension coupling a first ground engaging member of the at least two front ground engaging members to the frame, the front suspension including a shock; and a rear suspension coupling a first ground engaging member of the at least two rear ground engaging members to the frame, the rear suspension includes a load leveling shock. In one example, the shock of the front suspension is an adjustable, non-load leveling shock. In another example, the shock includes an adjustable fluidic stiffness and an adjustable mechanical stiffness. In a variation thereof, the shock is an air shock with an external spring positioned between two stop members and wherein the stiffness of the shock is adjustable by both changing an air pressure within an interior of the shock and changing a spacing between the two stop members.

In yet still another exemplary embodiment of the present disclosure, a utility vehicle is provided. The utility vehicle comprising a frame; a power source supported by the frame; seating supported by the frame, the seating having at least one seat bottom member and at least one seat back member; an operator area adapted for use by a vehicle operator when the vehicle is in motion, the at least one seat bottom member and the at least one seat back member being positioned within the operator area; a roll cage supported by the frame and positioned to protect the operator area; a plurality of ground engaging members supporting the frame above the ground, the plurality of ground engaging members including at least two front ground engaging members positioned forward of the operator area and at least two ground engaging members located rearward of the operator area, wherein at least one of the plurality of ground engaging members are operatively coupled to the power source to propel the utility vehicle relative to the ground; a steering assembly including a steering rack supported by the frame and a steering wheel supported by the frame, the steering assembly further including a power steering unit positioned between the steering rack and the steering wheel and operatively coupled to both the steering rack and the steering wheel; and a dashboard supported by the frame, the power steering unit being positioned behind the dashboard. In one example, the power steering unit is an electronic power steering unit. In another example, the utility vehicle further comprises a parking brake input in the operator area and a gear shift input, the parking brake input being on a first side of the steering wheel and the gear shift input on a second side of the steering wheel. In a further example, the roll cage couples to the frame through at least one forward attachment members and the power steering unit is positioned rearward of the forward attachment members.

In yet still a further exemplary embodiment of the present disclosure, a utility vehicle is provided. The utility vehicle comprising: a frame; a power source supported by the frame; seating supported by the frame, the seating having at least one seat bottom member and at least one seat back member; an operator area adapted for use by a vehicle operator when the vehicle is in motion, the at least one seat bottom member and the at least one seat back member being positioned within the operator area; a roll cage supported by the frame and positioned to protect the operator area; a plurality of ground engaging members supporting the frame above the ground, the plurality of ground engaging members including at least two front ground engaging members positioned forward of the operator area and at least two ground engaging members located rearward of the operator area, wherein at least one of the plurality of ground engaging members are operatively coupled to the power source to propel the utility vehicle relative to the ground; and a steering assembly including a steering rack supported by the frame and a steering wheel supported by the frame, the steering assembly further including a power steering unit positioned between the steering rack and the steering wheel and operatively coupled to both the steering rack and the steering wheel; wherein the power steering unit is configured to vary an amount of steering assist provided based on a speed of the vehicle. In one example, the amount of steering assist varies over a range of speeds of the vehicle. In one variation, the power steering unit provides a first amount of assist at a first speed and a second amount of assist at a second speed, the second speed being higher than the first speed and the second amount of assist being less than the first amount of assist. In another example, the amount of assist is provided by a speed profile selected from a plurality of speed profiles, the selection being made through an operator input.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 47 illustrates an accessory uncoupled from the accessory lift system of FIG. 45;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
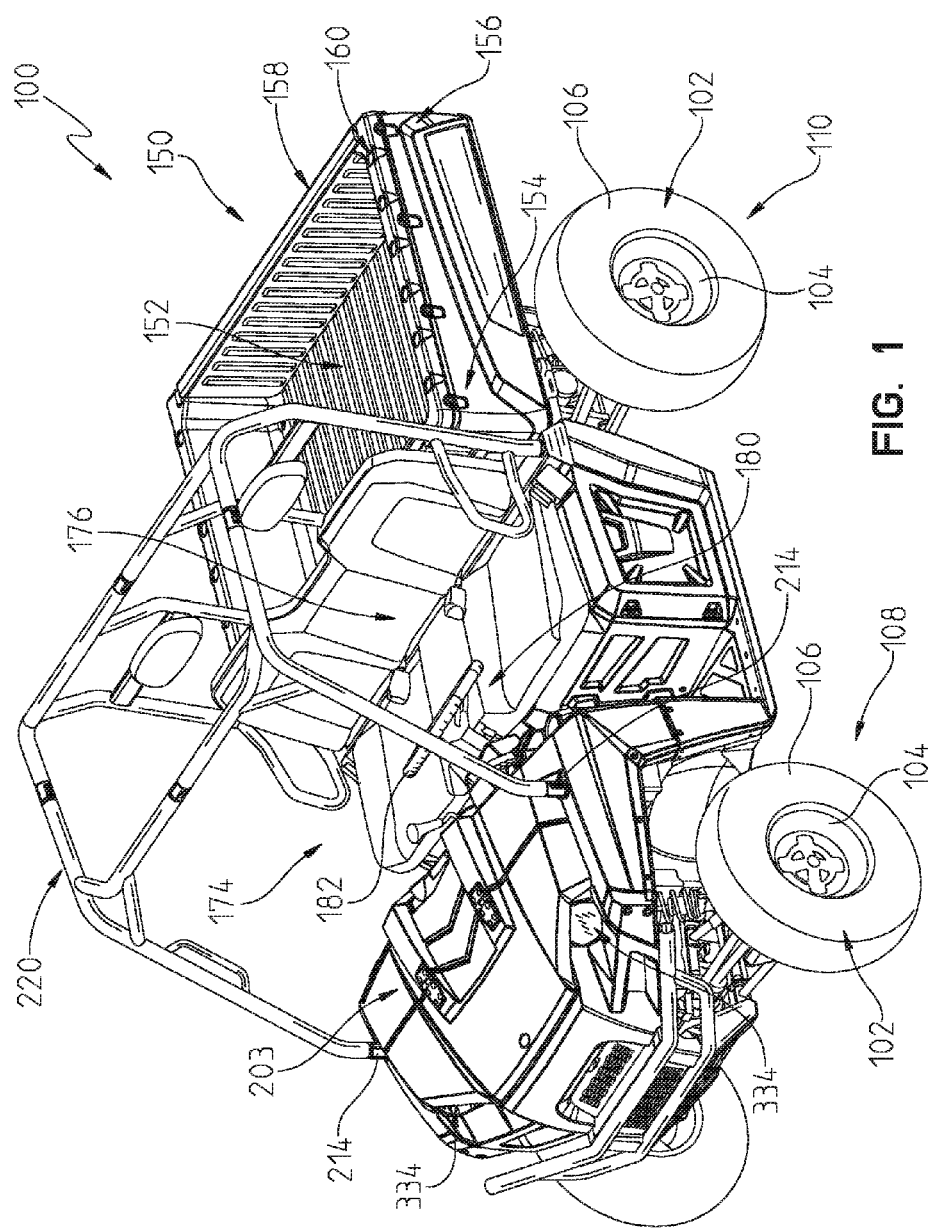
FIG. 1 is a perspective view of an exemplary utility vehicle.

Referring to FIG. 1, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

As mentioned herein one or more of ground engaging members 102 are operatively coupled to a power source 130 (see FIG. 12) to power the movement of vehicle 100. Exemplary power sources include combustion engines and electric engines.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110.

As configured in FIG. 1, vehicle 100 is a four wheel, two axle vehicle. In one embodiment, a modular subsections 112 may be added to vehicle 100 to transform vehicle 100 into a three axle (axle 120) vehicle, a four axle vehicle, and so on. Modular subsections 112 includes a frame 114 (see FIG. 8) which is coupled to a frame 116 (see FIG. 8) of vehicle 100. Frame 114 is supported by the ground engaging members 102 of axle 120. Frame 116 is supported by the ground engaging members 102 of vehicle 100. frame 114 is coupled to frame 116 through a plurality of connections points (122A-D on frame 116 and 123A-D on frame 114). These connection points couple frame 114 to frame 116 such that frame 114 does not rotate relative to frame 116.

Figure 9:
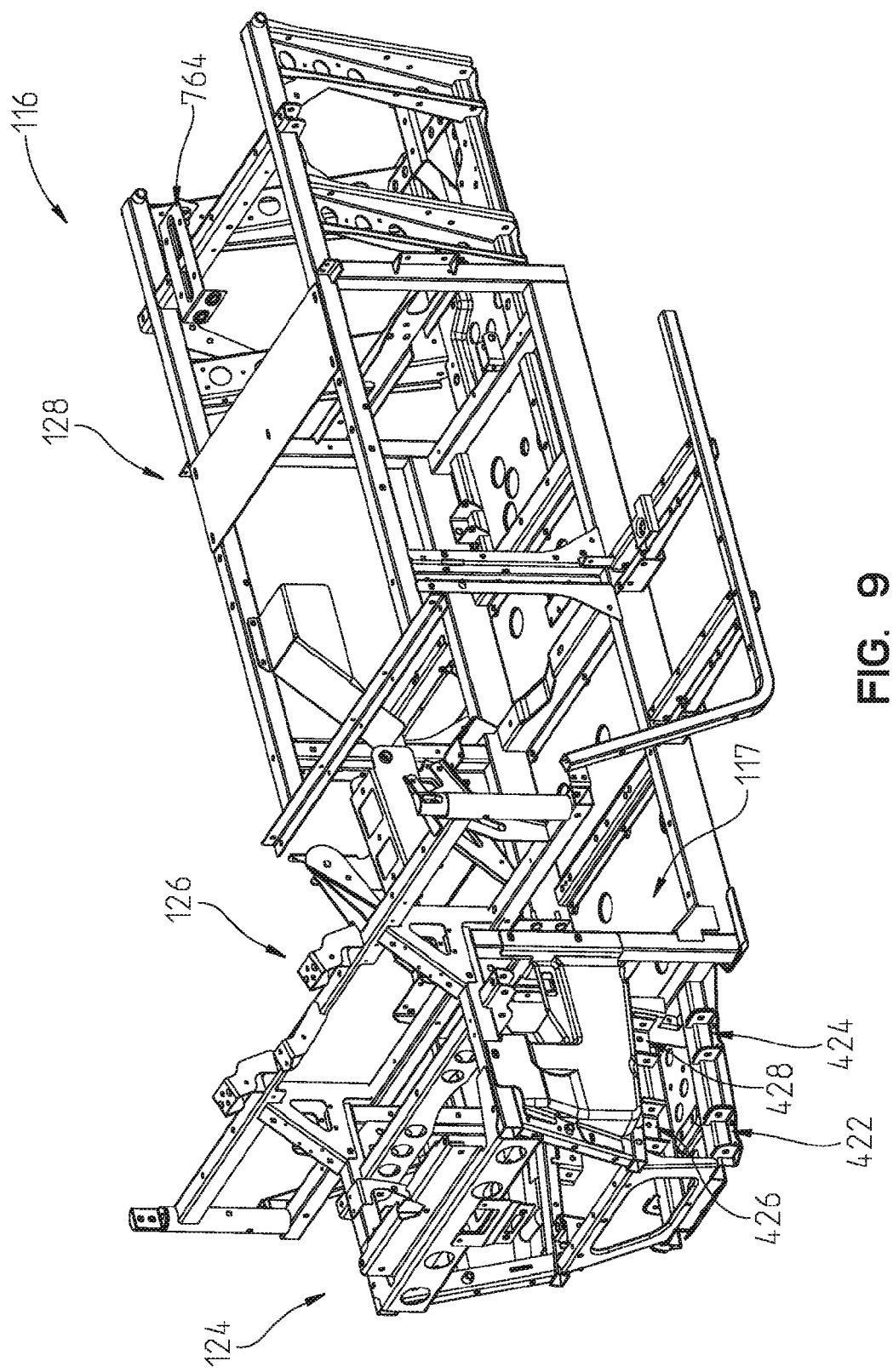
FIG. 9 illustrates a front, perspective view of a frame of the utility vehicle of FIG. 1.

Referring to FIG. 9, frame 116 includes a front portion 124, an operator area portion 126, and a rear portion 128. The construction of rear portion 128 of frame 116 including the connection points (122A-D) is generally the same as the corresponding portion of the frame disclosed in U.S. patent application Ser. No. 12/092,153, filed Apr. 30, 2009, and U.S. Provisional Patent Application Ser. No. 60/918,502, filed Mar. 16, 2007, the disclosures of which are expressly incorporated by reference herein.

Figure 12:
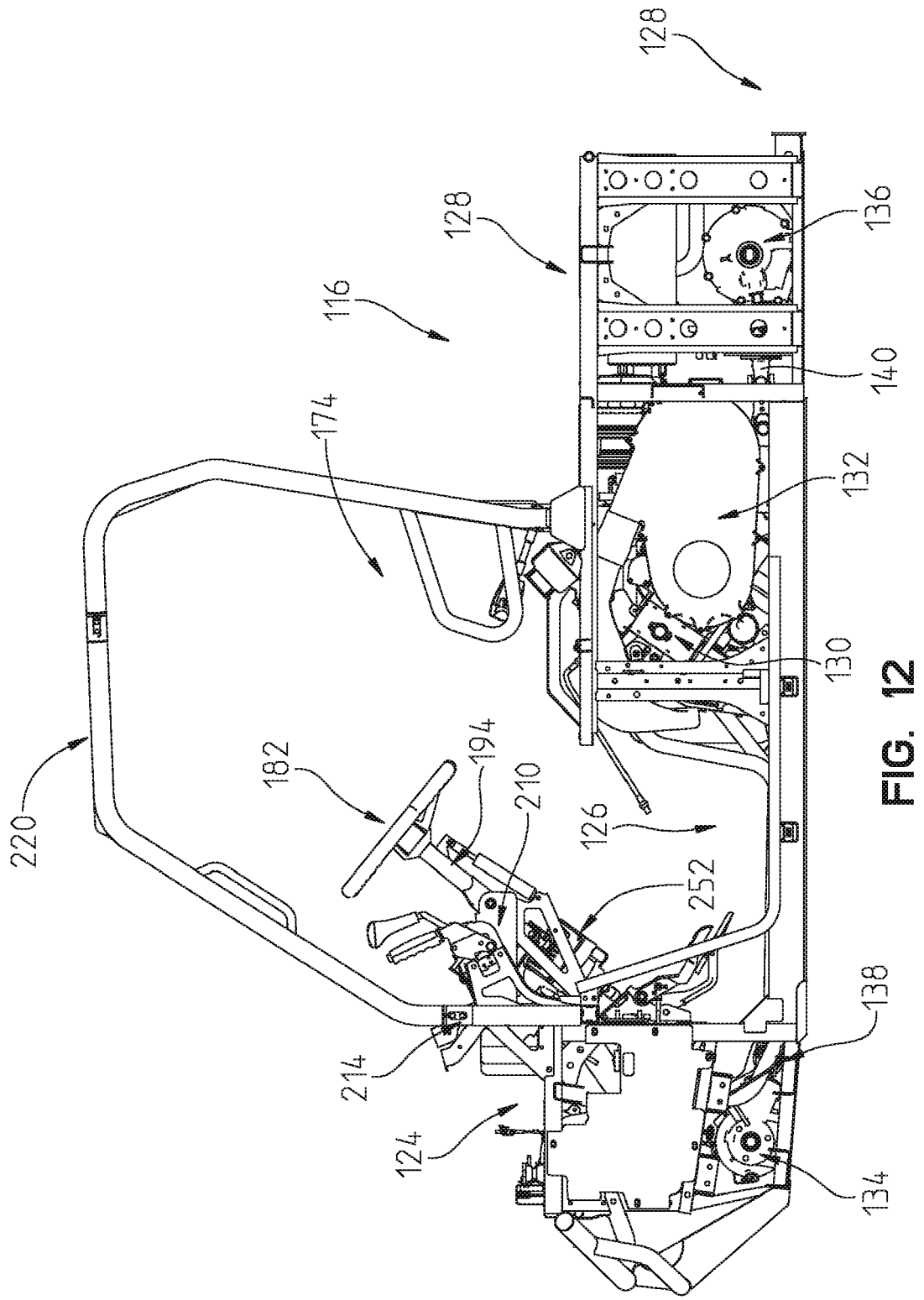
FIG. 12 illustrates a side view of a portion of the utility vehicle of FIG. 1 illustrating the placement of a front differential, a power source, a transmission, and a rear differential.

Turning to FIG. 12, a power source 130, illustratively a combustion engine, is supported by frame 116. Power source 130 is shown as a combustion engine. In one embodiment, power source 130 is a multifuel engine capable of utilizing various fuels. An exemplary multifuel engine capable of utilizing various fuels is disclosed in U.S. patent application Ser. No. 11/445,731, filed Jun. 2, 2006, the disclosure of which is expressly incorporated by reference herein. In one embodiment, power source 130 is a hybrid electric engine. In one embodiment, power source 130 is an electric engine.

Power source 130 is coupled to a front differential 134 and a rear differential 136 through a transmission 132 and respective drive line 138 and drive line 140. Drive line 138 and drive line 140, like other drive lines mentioned herein, may include multiple components and are not limited to straight shafts. Front differential 134 includes two output shafts 144A and 144B (see FIG. 26), each coupling a respective ground engaging members 102 of front axle 108 to front differential 134. In a similar fashion, rear differential 136 includes two output shafts, each coupling a respective ground engaging members 102 of rear axle 110 to rear differential 136.

Figure 20:
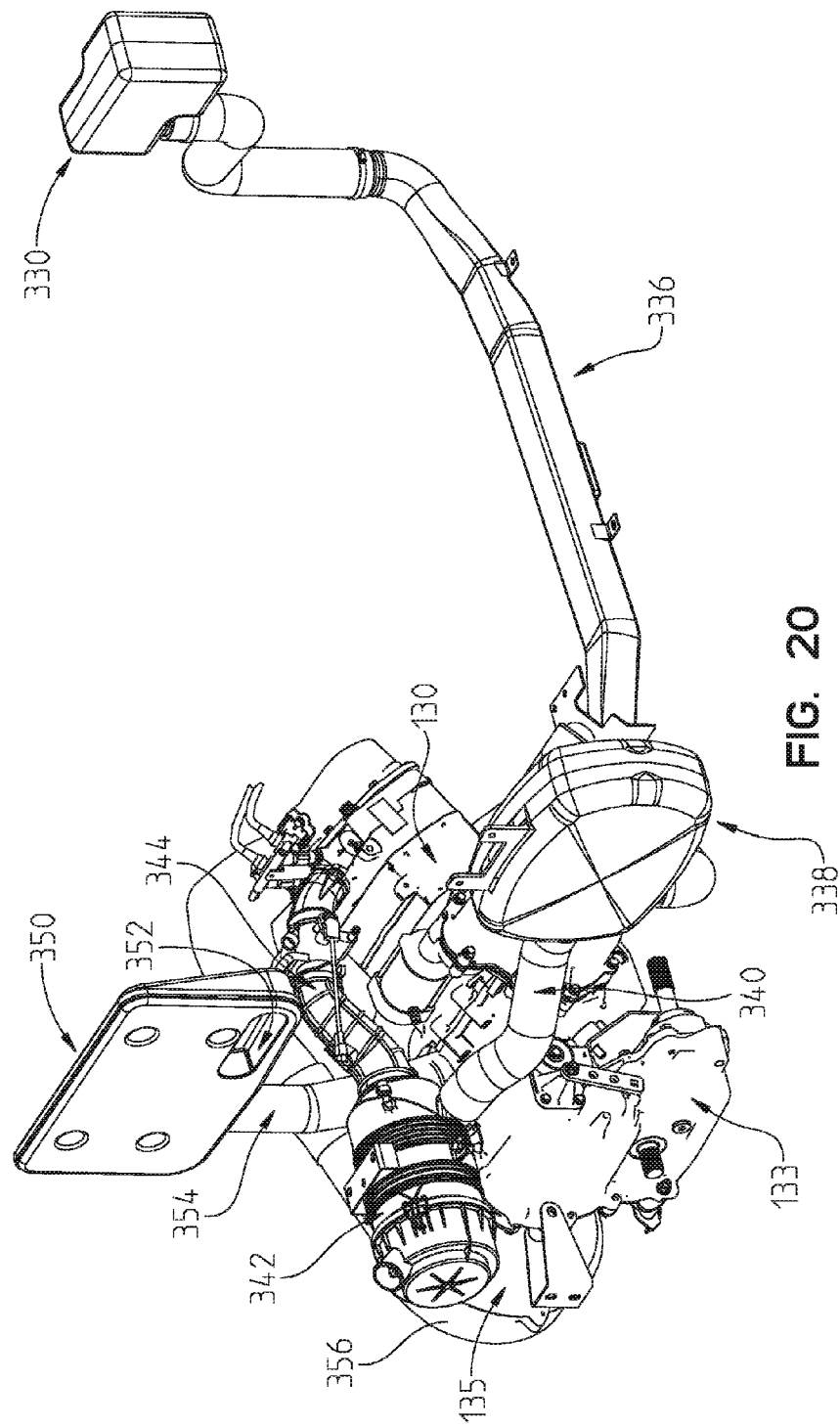
FIG. 20 illustrates an air supply system for an engine of the utility vehicle of FIG. 1 and an air supply system for a CVT of the utility vehicle of FIG. 1.

In one embodiment, transmission 132 includes a shiftable transmission 133 (see FIG. 20) and a continuously variable transmission ("CVT") 135 (see FIG. 20). The CVT 135 is coupled to power source 130 and the shiftable transmission 133. The shiftable transmission 133 is coupled to drive line 138 which is coupled to front differential 134 and to drive line 140 which is coupled to rear differential 136. In one embodiment, the shiftable transmission 133 is shiftable between a high gear for normal forward driving, a low gear for towing, and a reverse gear for driving in reverse. In one embodiment, the shiftable transmission further includes a park setting which locks the output drive of the shiftable transmission from rotating. Exemplary shiftable transmissions and CVTs are disclosed in U.S. Pat. No. 6,725,962 and U.S. Pat. No. 6,978,857, the disclosures of which are expressly incorporated by reference herein.

Returning to FIG. 8, frame 114 of modular subsection 112 supports a differential 142 which is connectable to rear differential 136 through a drive line. In one embodiment, modular subsections 112 does not include a differential and thus axle 120 is an non-powered axle.

Various configurations of front differential 134, rear differential 136, and differential 142 are contemplated. Regarding front differential 134, in one embodiment front differential 134 has a first configuration wherein power is provided to both of the ground engaging members 102 of front axle 108 and a second configuration wherein power is provided to one of ground engaging members 102 of front axle 108.

Regarding rear differential 136, in one embodiment rear differential 136 is a locked differential wherein power is provided to both of the ground engaging members 102 of rear axle 110 through the output shafts and, if included, to an output shaft for connection to differential 142 or for use as a power takeoff. In one embodiment, rear differential 136 is a lockable/unlockable differential relative to the output shafts for rear axle 110 and the drive shaft to be connected to differential 142 or used as a power takeoff. When rear differential 136 is in a locked configuration power is provided to both wheels of rear axle 110. When rear differential 136 is in an unlocked configuration, power is provided to one of the wheels of rear axle 110. In a similar fashion, differential 142 is a lockable/unlockable differential relative to the ground engaging members 102 of axle 120. In a first configuration, differential 142 is locked relative to the output shafts such that power is provided to both ground engaging members 102 of axle 120. In a second configuration, differential 142 is unlocked relative to the output shafts such that power is provided to one of the ground engaging members 102 of rear axle 110.

Additional details regarding rear portion 128 of frame 116, ground engaging members 102, various drive configurations of exemplary differentials, and related aspects are disclosed in one or more of the following applications: U.S. Provisional Patent Application Ser. No. 60/918,502, titled VEHICLE, filed Mar. 16, 2007; U.S. Provisional Patent Application Ser. No. 60/918,556, titled VEHICLE, filed Mar. 16, 2007; U.S. Provisional Patent Application Ser. No. 60/918,444, titled VEHICLE WITH SPACE UTILIZATION, filed Mar. 16, 2007; U.S. Provisional Patent Application Ser. No. 60/918,356, titled UTILITY VEHICLE HAVING MODULAR COMPONENTS, filed Mar. 16, 2007; U.S. Provisional Patent Application Ser. No. 60/918,500, titled METHOD AND APPARATUS RELATED TO TRANSPORTABILITY OF A VEHICLE, filed Mar. 16, 2007; U.S. Utility patent application Ser. No. 12/050,048, titled VEHICLE WITH SPACE UTILIZATION, filed Mar. 17, 2008; U.S. Utility patent application Ser. No. 12/050,064, titled VEHICLE WITH SPACE UTILIZATION, filed Mar. 17, 2008; U.S. Utility patent application Ser. No. 12/050,041, titled METHOD AND APPARATUS RELATED TO TRANSPORTABILITY OF A VEHICLE, filed Mar. 17, 2008; U.S. Utility patent application Ser. No. 12/092,151, titled UTILITY VEHICLE HAVING MODULAR COMPONENTS, filed Apr. 30, 2008; U.S. Utility patent application Ser. No. 12/092,153, titled VEHICLE, filed Apr. 30, 2008; and U.S. Utility patent application Ser. No. 12/092,191, titled VEHICLE, filed Apr. 30, 2008 ("2019 applications"), the disclosures of which are expressly incorporated by reference herein.

Returning to FIG. 1, vehicle 100 includes a bed 150 having a cargo carrying surface 152. Cargo carrying surface 152 may be flat, contoured, and/or comprised of several sections. In one embodiment, bed 150 is rigidly coupled to frame 116. in one embodiment, bed 150 is rotatably coupled to frame 116 and may be tilted so that a front portion 154 is higher relative to back portion 156. Back portion 156 includes a tailgate 158 which may be lowered to improve ingress to and egress from bed 150. Bed 150 further includes a plurality of mounts 160 for receiving an expansion retainer (not shown) which may couple various accessories to bed 150. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein. When modular subsection 112 is coupled to vehicle 100, bed 150 may be replaced with a longer bed or platform which extends over modular subsection 112.

Vehicle 100 includes an operator area 174 generally supported by operator area portion 126 of frame 116. Operator area 174 includes seating 176 for one or more passengers. Operator area 174 further includes a plurality of operator controls 180 by which an operator may provide input into the control of vehicle 100. Controls 180 include a steering wheel 182 which is rotated by the operator to change the orientation of one or more of ground engaging members 102, such as the wheels associated with front axle 108, to steer vehicle 100. In one embodiment, steering wheel 182 changes the orientation of the wheels of front axle 108 and rear axle 110 to provide four wheel steering.

Figure 2:
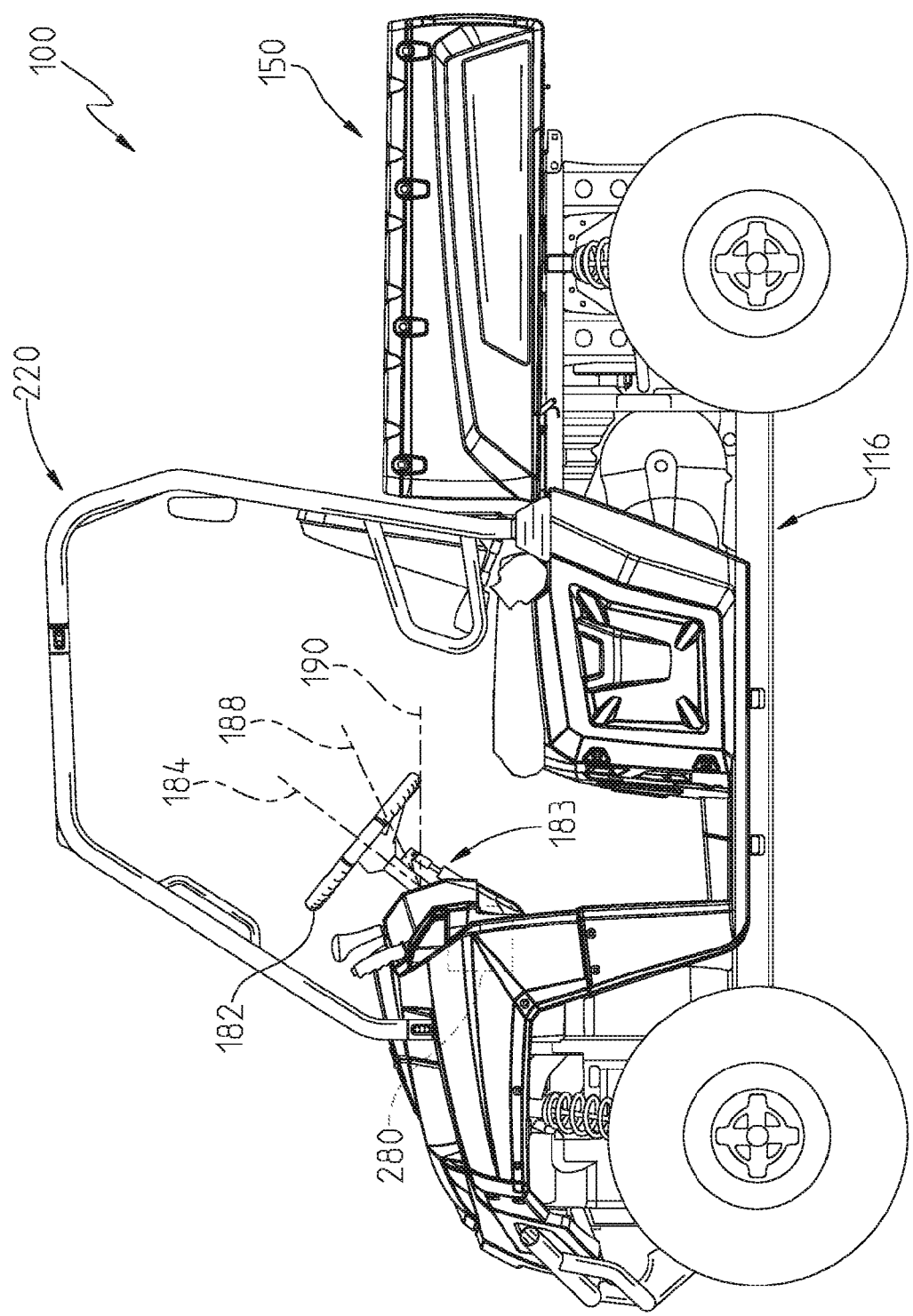
FIG. 2 illustrates a left side view of the exemplary utility vehicle of FIG. 1.

Referring to FIG. 2, steering wheel 182 is moveable to provide tilt steering through tilt steering member 183. As shown in FIG. 2, steering wheel 182 is in a raised position 184 which is about 70 degrees above horizontal 190. Steering wheel 182 may be tilted downward to a position 188 which is about 32 degrees above horizontal 190. Thus, steering wheel 182 has a range of motion of about 38 degrees. Additional details regarding an exemplary tilt steering system are provided in U.S. patent application Ser. No. 11/494,890, the disclosure of which is expressly incorporated by reference herein.

Figure 4:
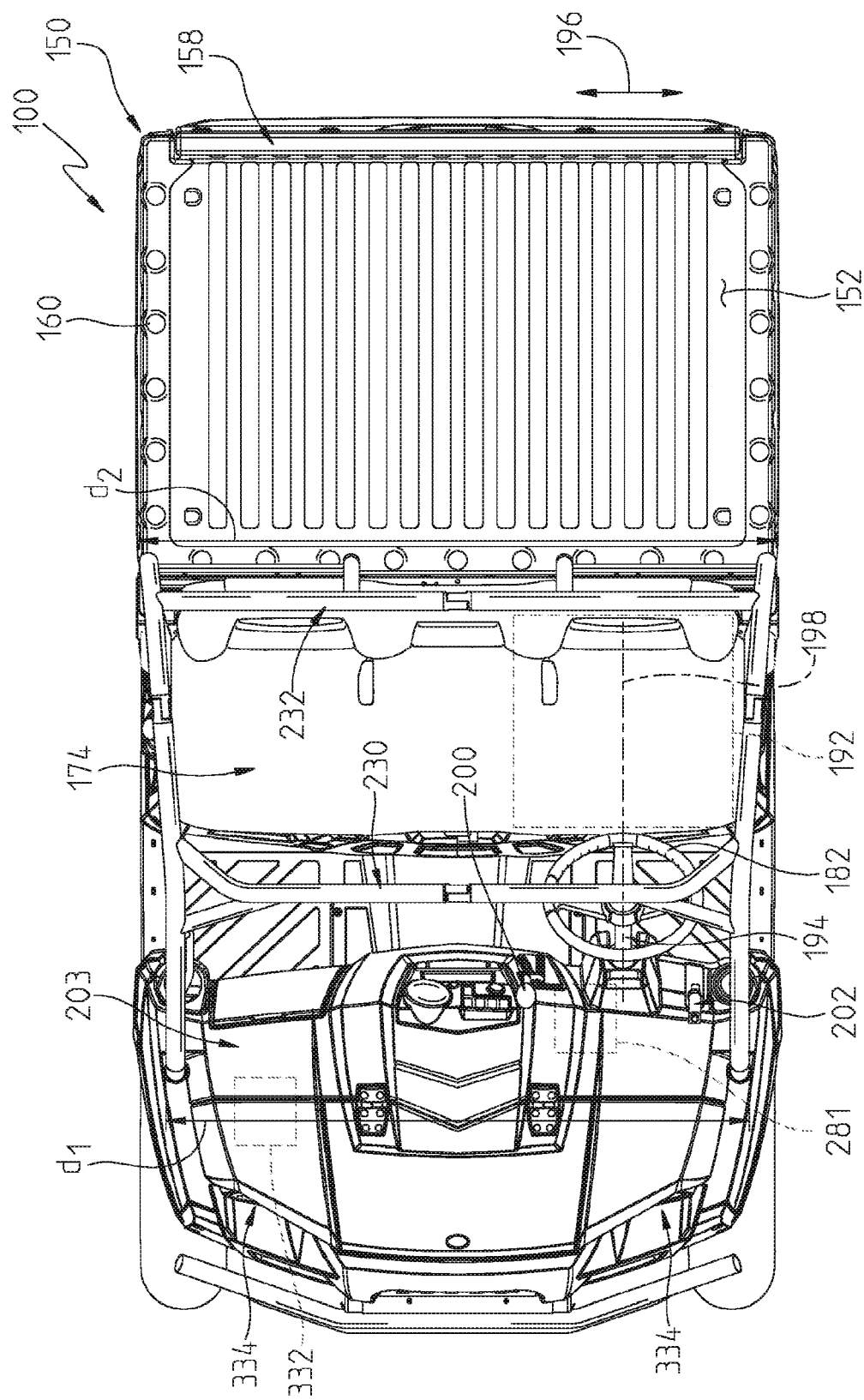
FIG. 4 illustrates a top view of the utility exemplary vehicle of FIG. 1.
Figure 5:
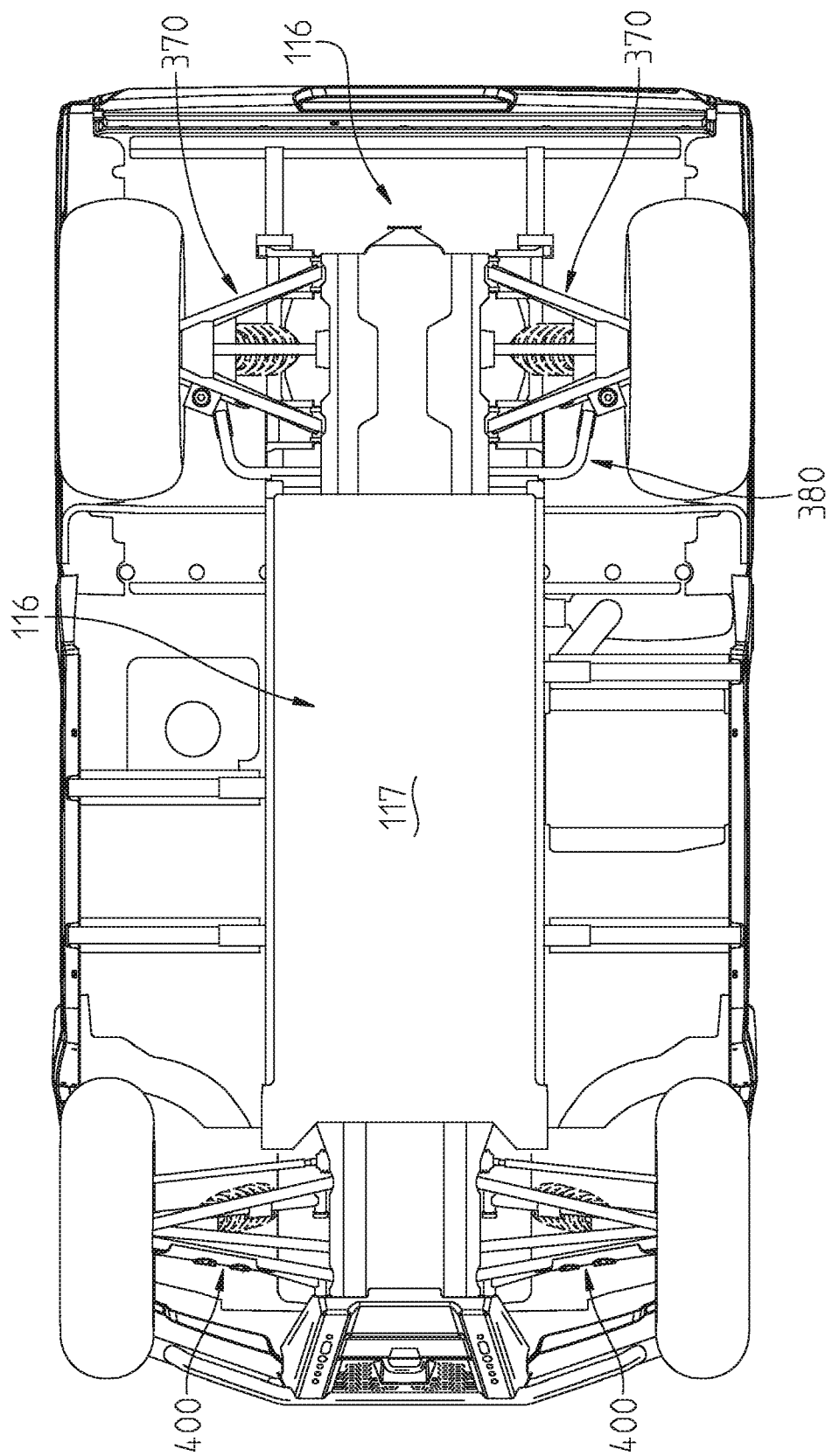
FIG. 5 illustrates a bottom view of the utility exemplary vehicle of FIG. 1.
Figure 6:
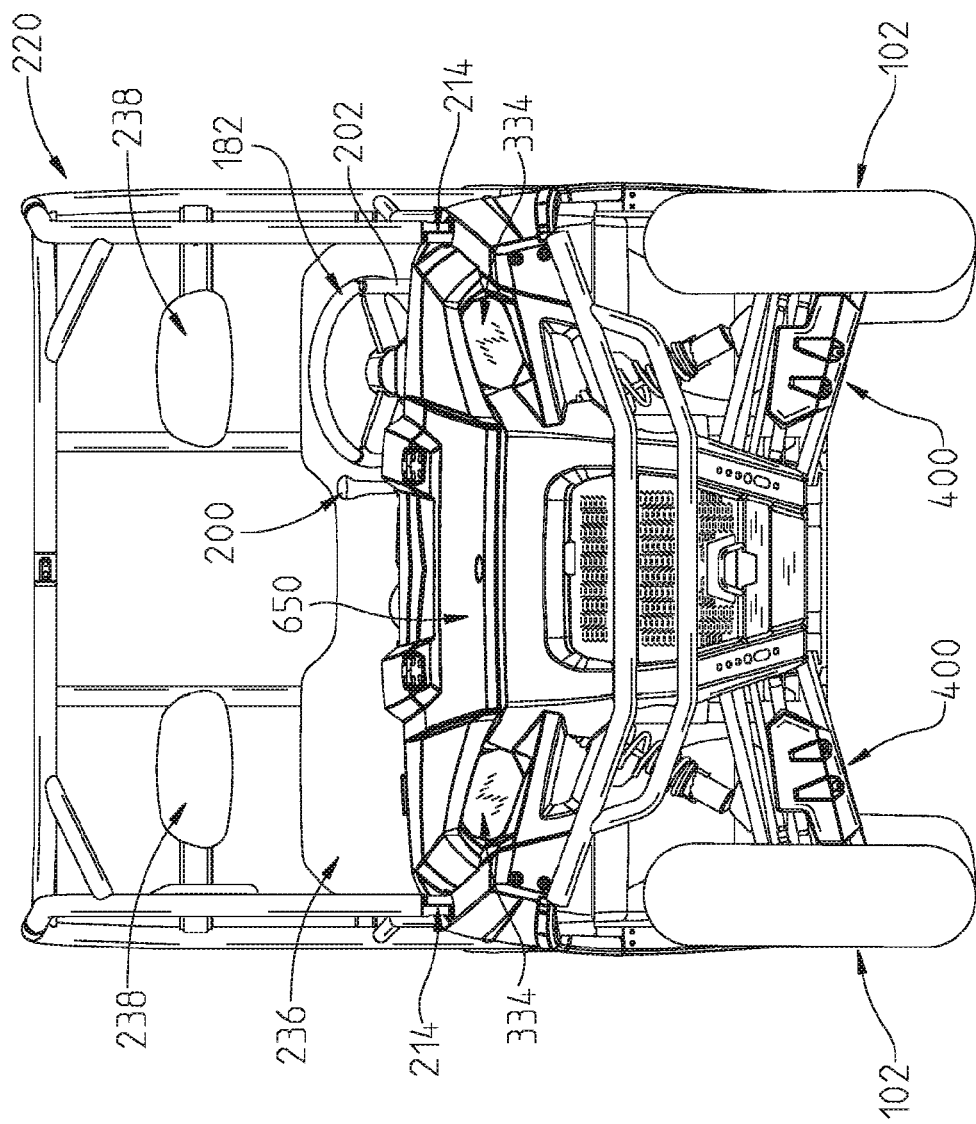
FIG. 6 illustrates a front view of the utility exemplary vehicle of FIG. 1.
Figure 7:
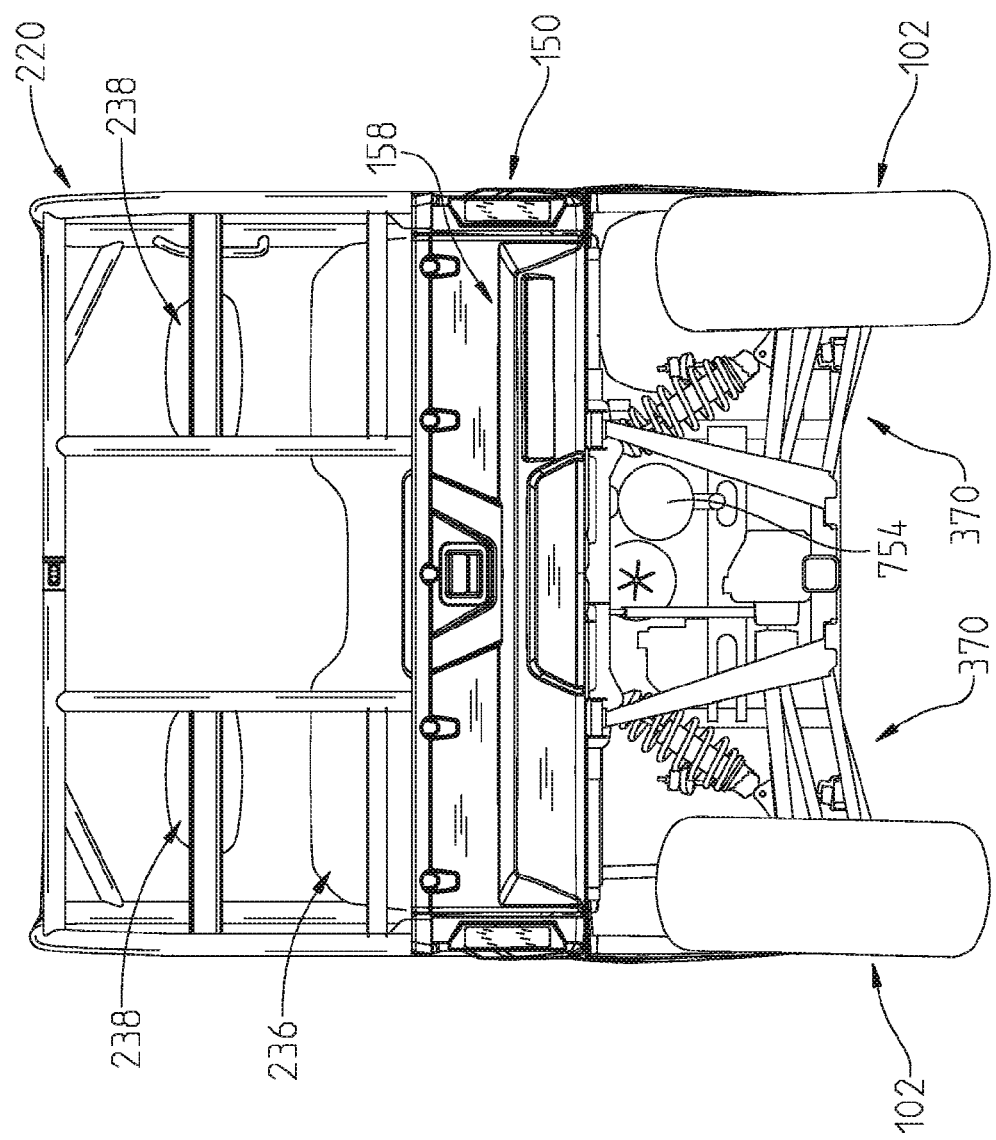
FIG. 7 illustrates a back view of the utility exemplary vehicle of FIG. 1.
Figure 11:
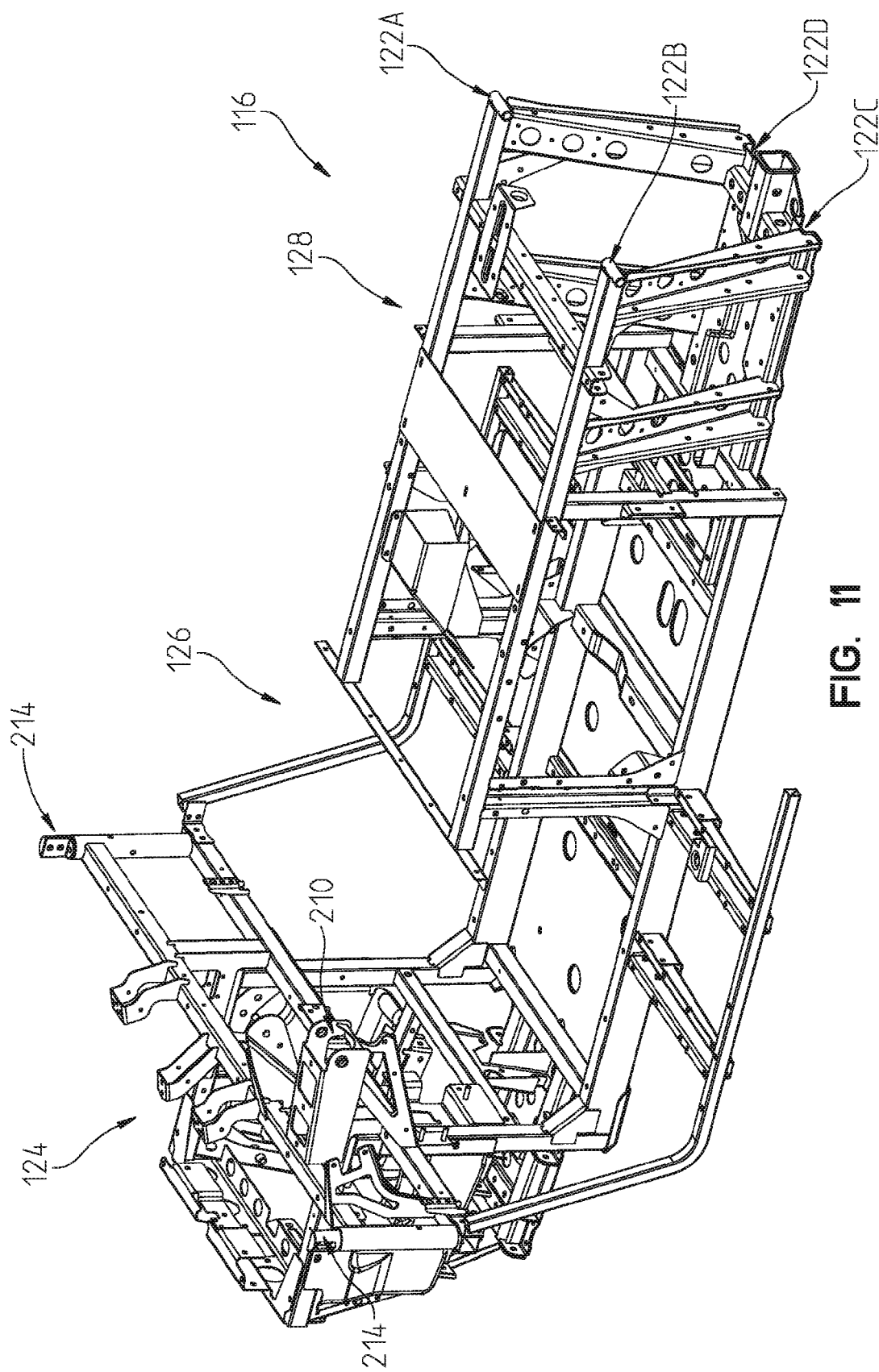
FIG. 11 illustrates a back, perspective view of the frame of FIG. 9.

Referring to FIG. 4, a vehicle operator position 192 on seating 176 is represented. As shown in FIG. 4, a steering column 194 of steering wheel 182 is centered side-to-side (arrows 196) as indicated by line 198 in the vehicle operator position 192. Referring to FIG. 11, steering column 194 is supported by bracket 210 of operator area portion 126 of frame 116 as shown in FIG. 12.

Also, shown in FIG. 2, is a gear shift input control 200 which is operatively coupled to the shiftable transmission of transmission 132 to communicate whether the shiftable transmission is in a low forward gear, a high forward gear, a reverse gear, neutral, and if included a park position. Although, gear shift input control 200 is shown as a lever, other types of inputs may be used. Gear shift input control 200 is positioned on a right hand side of steering column 194.

A parking brake input control 202 is also shown in FIG. 2. Parking brake input control 202 is operatively coupled to a parking brake of vehicle 100. In one embodiment, the parking brake is positioned on one of drive line 138 and drive line 140 as disclosed in the 2019 applications which are expressly incorporated by reference herein. In one embodiment, a master cylinder which is operatively coupled to parking brake input control 202 is positioned underneath a dashboard body member 203. An exemplary master cylinder is disclosed in the 2019 applications, the disclosures of which are expressly incorporated by reference. Although, parking brake input control 202 is shown as a lever, other types of inputs may be used. parking brake input control 202 is positioned on a left hand side of steering column 194.

Figure 8:
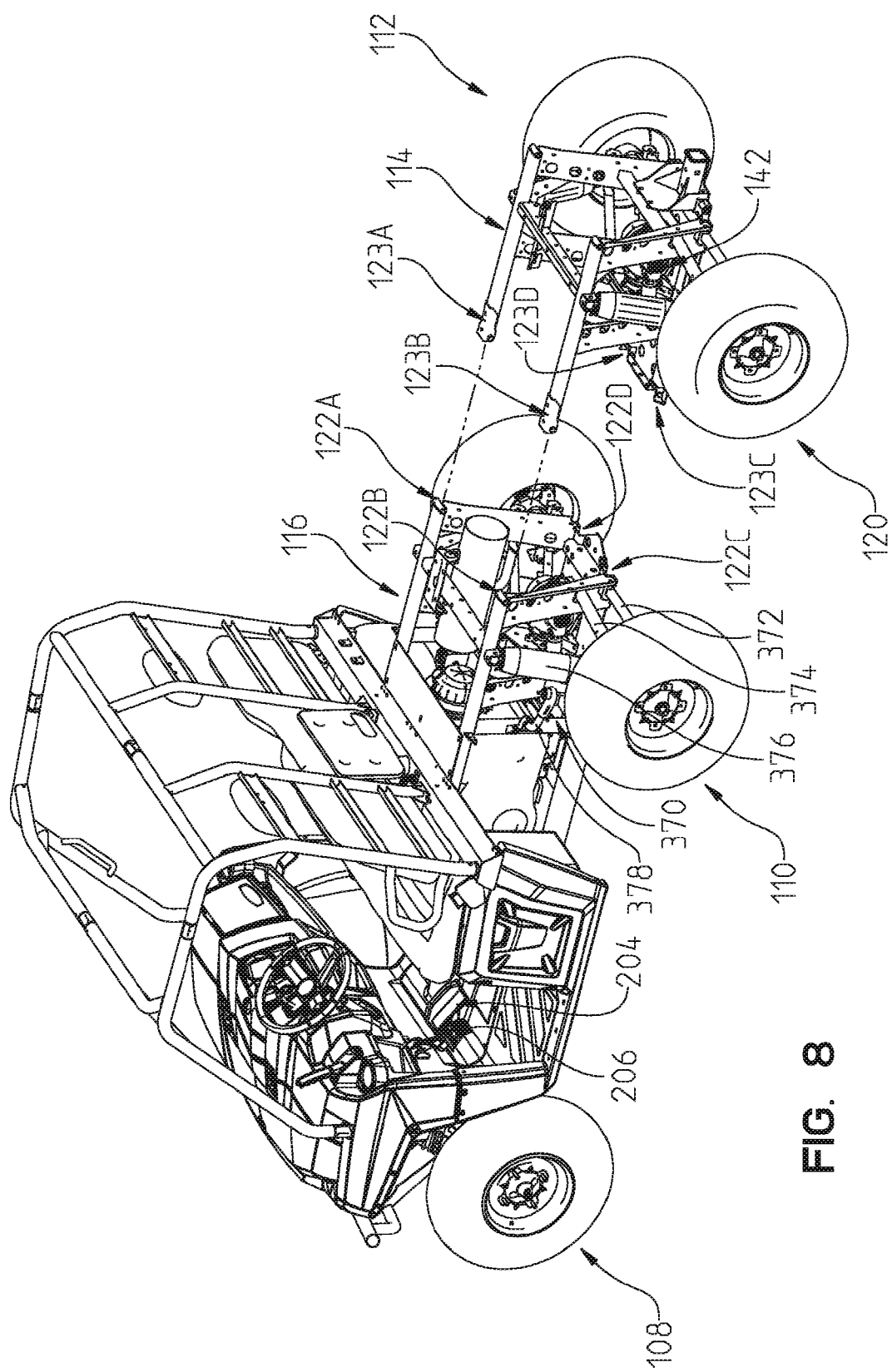
FIG. 8 illustrates a perspective view of the utility vehicle of FIG. 1 with a cargo bed removed and a modular subsection spaced apart therefrom.

Referring to FIG. 8, controls 180 also include a first foot pedal 204 actuatable by the vehicle operator to control the acceleration and speed of vehicle 100 through the control of power source 130 and a second foot pedal 206 actuatable by the operator to decelerate vehicle 100 through a braking system described in more detail herein. In one embodiment, pedal 206 is offset to the right of steering column 194 such that both of the first foot pedal 204 and the second foot pedal 206 are generally in line with a right foot of an operator (see FIG. 13).

Returning to FIGS. 9 and 11, operator area portion 126 of frame 116 includes a plurality of brackets 212 which support portions of dashboard body member 203. Further, operator area portion 126 includes as part of the frame weldment attachment members 214. Attachment members 214 couple to a roll cage 220 of vehicle 100. As shown in FIG. 1, attachment members 214 extend through openings in dashboard body member 203 and are coupled to lower ends of roll cage 220. By providing attachment members 214, dealer assembly of roll cage 220 to vehicle 100 upon delivery is simplified.

Figure 3:
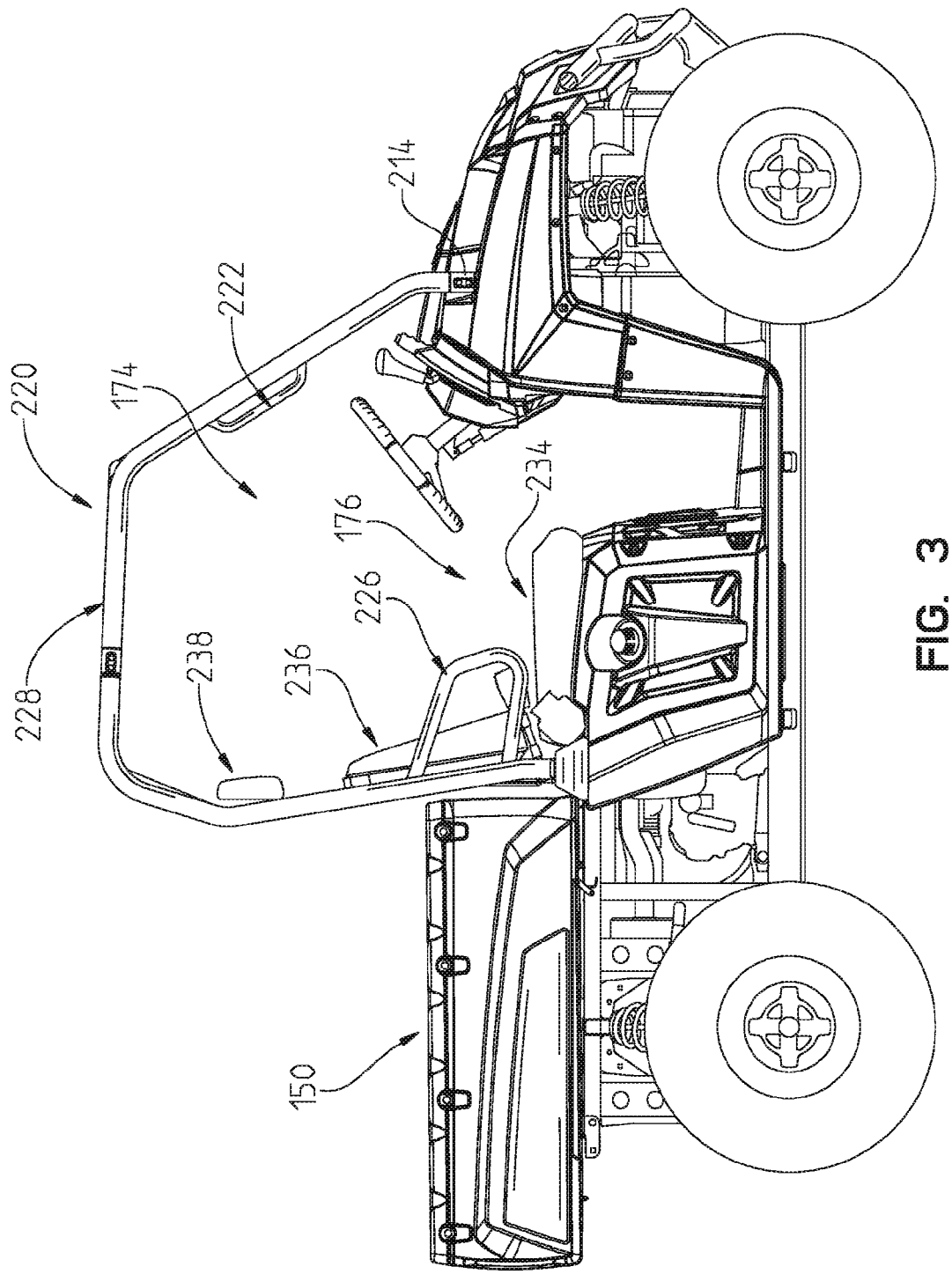
FIG. 3 illustrates a right side view of the exemplary utility vehicle of FIG. 1.

Referring to FIG. 3, roll cage 220 is coupled to attachment members 214 and is coupled again to frame 116 just forward of bed 150. Roll cage 220 include grab handles 222 on each side to assist in ingress into operator area 174 and egress from operator area 174. Further, a handle 226 is provided to also assist in ingress into operator area 174 and egress from operator area 174 and to limit side-to-side movement of persons located in operator area 174.

Upper portion 228 of roll cage 220 slopes downward toward the front of vehicle 100. Although upper portion 228 slopes downward, cross members 230 and 232 (FIG. 4) are at a generally equal height. By keeping cross members 230 and 232 at a generally equal height, a stable platform is provided to carry cargo on top of roll cage 220. Looking at FIG. 4, roll cage 220 also narrows toward the front of vehicle 100.

In one embodiment, roll cage 220 at attachment members 214 (d1 on FIG. 4) is up to about 92 percent of a width of roll cage 220 proximate to bed 150 (d2 on FIG. 4). In one embodiment, the ratio of d1/d2 is about 91.3 percent with d1 being about 1387 mm and d2 being about 1518 mm (outside).

As shown in FIG. 3, seating 176 includes a seat bottom portion 234 and a seat back portion 236. Seat bottom portion 234 is tilted from horizontal by about 8.5 degrees such that the back edge of the seat bottom (proximate the bed) is lower than the front edge of the seat bottom. Seat back portion 236 is titled towards bed 150 from vertical about 17 degrees. Seating 176 also includes head rests 238. In one embodiment, seating 176 is a split bench with the operator side being adjustable along the longitudinal axis of vehicle 100.

Figure 13:
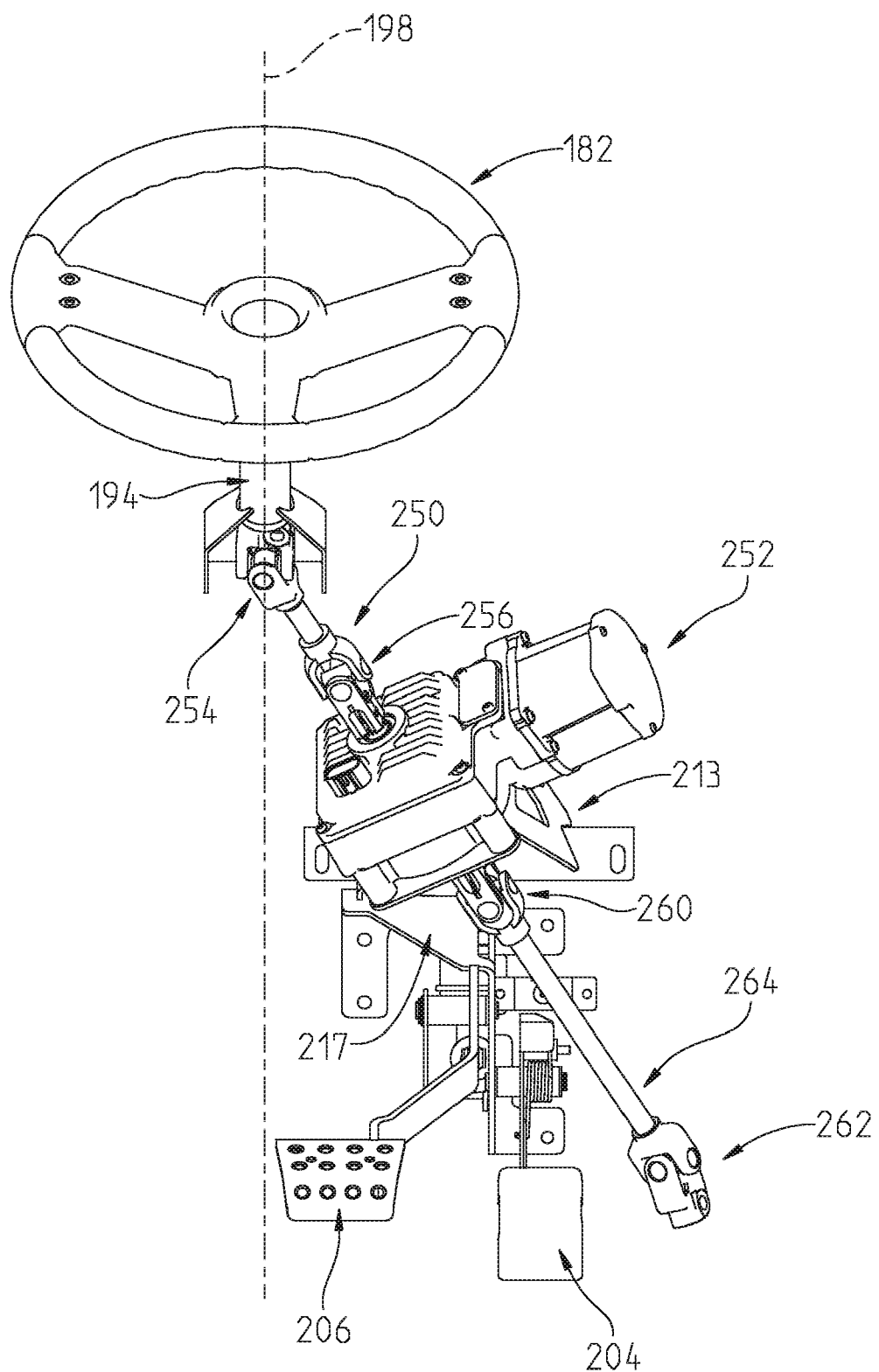
FIG. 13 illustrates a portion of the operator controls of the utility vehicle of FIG. 1 including a portion of a steering assembly, a portion of a braking system, and a portion of speed control system.
Figure 15:
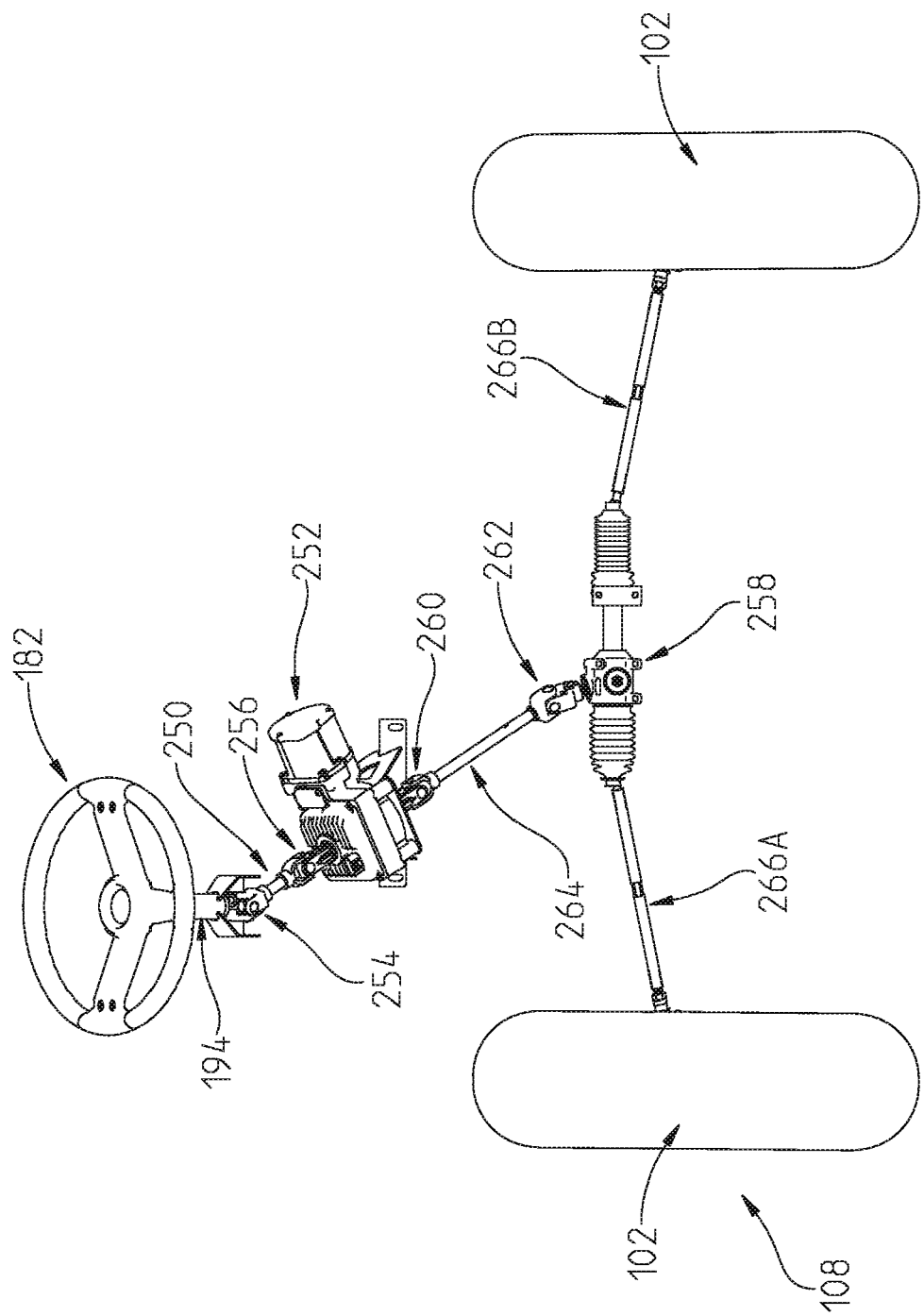
FIG. 15 illustrates an electrical power steering unit incorporated into a steering assembly of the utility vehicle of FIG. 1.

Referring to FIG. 13, steering wheel 182 is shown coupled to steering column 194. Steering column 194 is in turn coupled to a power steering unit 252 through a steering shaft 250 coupled to steering column 194 at a first U-joint 254 and coupled to power steering unit 252 at a second U-joint 256. Power steering unit 252 is mounted to a bracket 213 which orients power steering unit 252 in line with shaft 250. Power steering unit 252 is coupled to a steering rack 258 (see FIG. 15) through a third U-joint 260 and a fourth U-joint 262 with a steering shaft 264 disposed therebetween. Third u-joint 260, fourth u-joint 262, and steering shaft 264 are provided to ease assembly of the steering system. However, third u-joint 260, fourth u-joint 262, and steering shaft 264 may be omitted such that power steering unit 252 is coupled directly to steering rack 258.

Figures 26, 27:
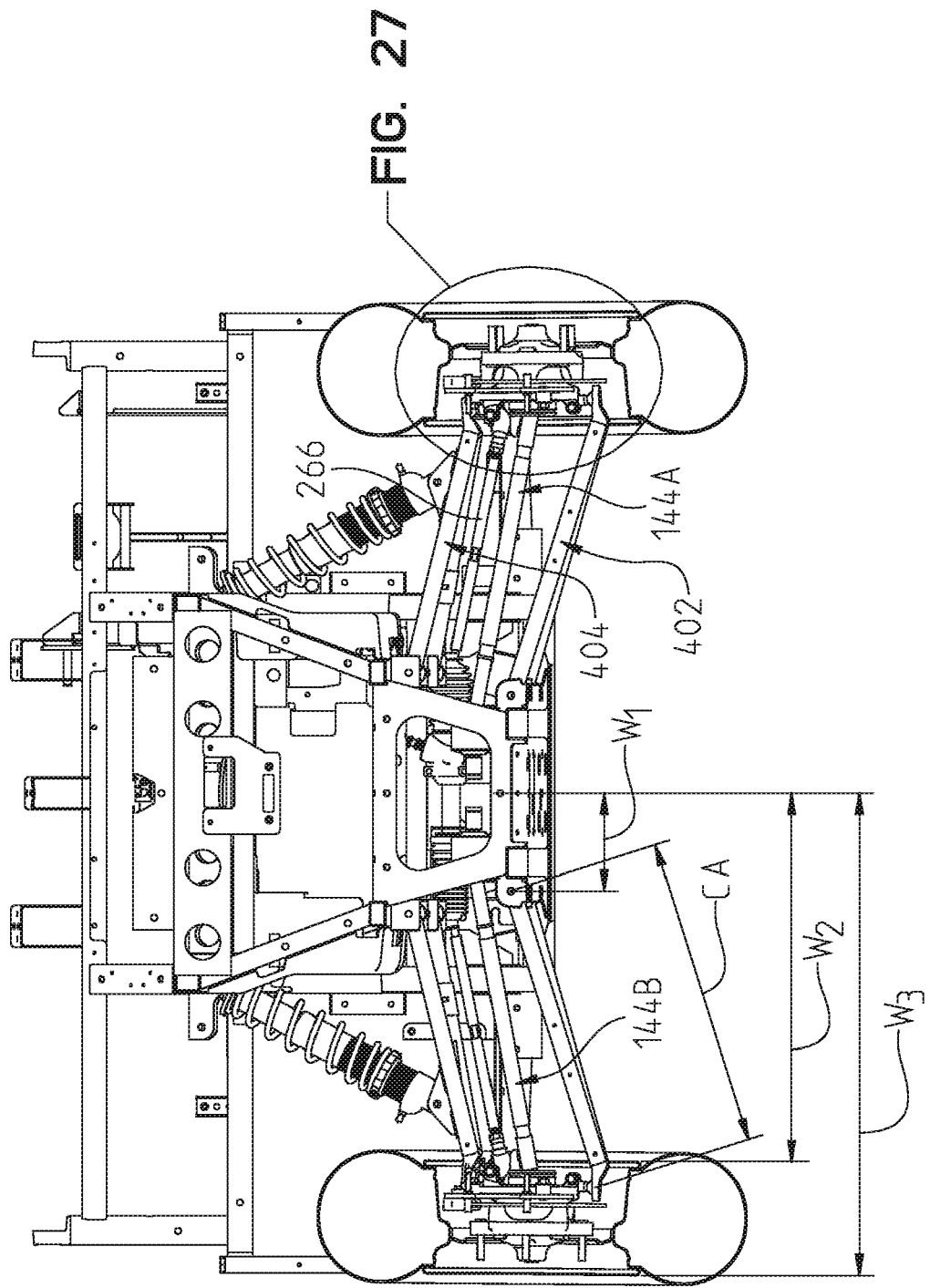
FIG. 26 illustrates the front suspension of FIG. 22 having the front ground engaging members coupled thereto and shown in cross section.
FIG. 27 illustrates a detail view of the operator side ground engaging member of FIG. 26.
Figure 27:
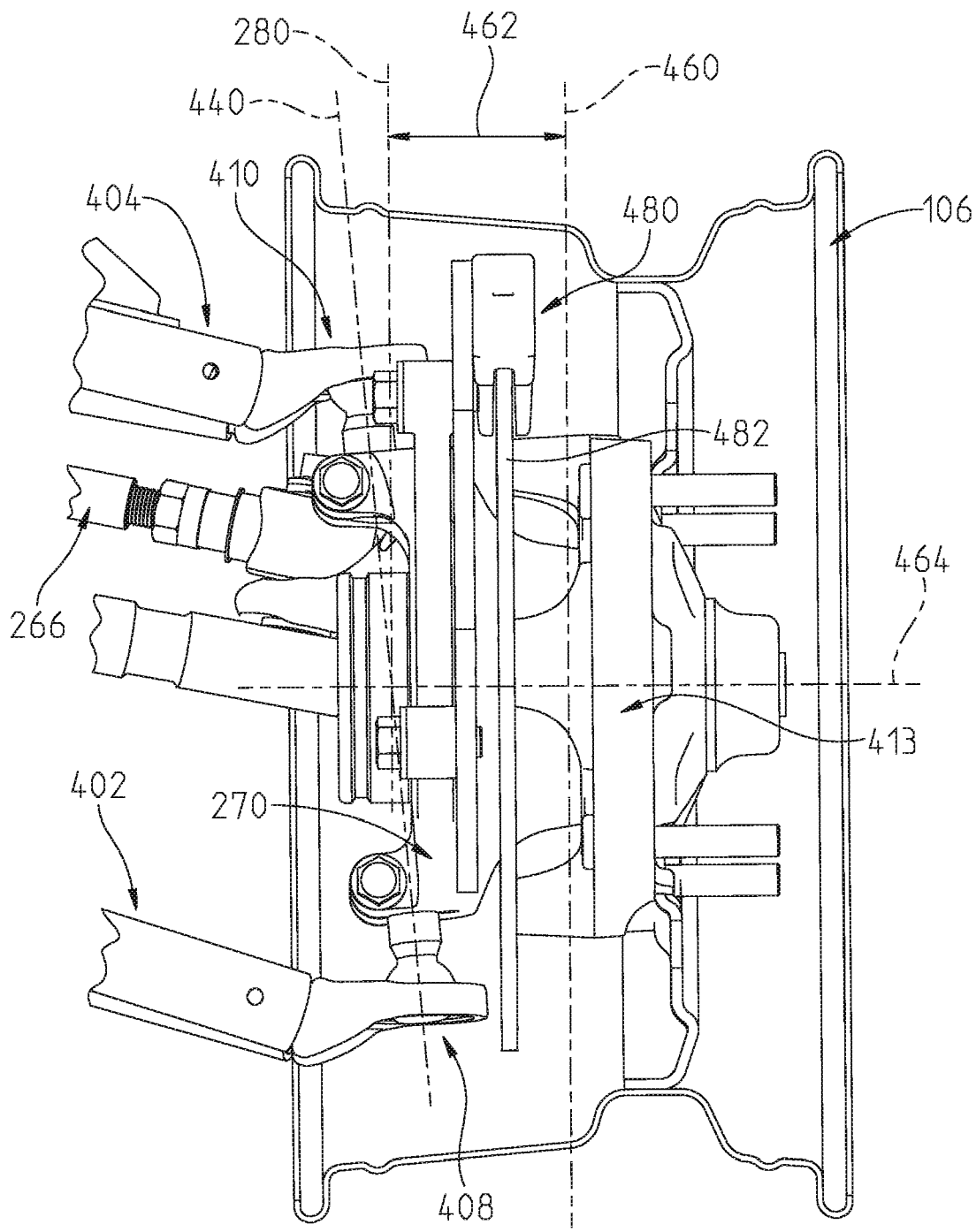

Steering rack 258 is coupled to ground engaging members 102 of front axle 108 through steering rods 266A and 266B, respectively. Referring to FIG. 27, the steering rods 266 are coupled to respective steering posts 268 provided on a wheel carrier 270. The movement of steering wheel 182 results in the respective steering post 266 moving in one of direction 272 and direction 274. This movement of the steering rod 266 is transferred to the steering post 268 which in turn causes wheel carrier 270 to rotate in either direction 276 or direction 278 about an axis 280 (see FIG. 24).

Figure 16:
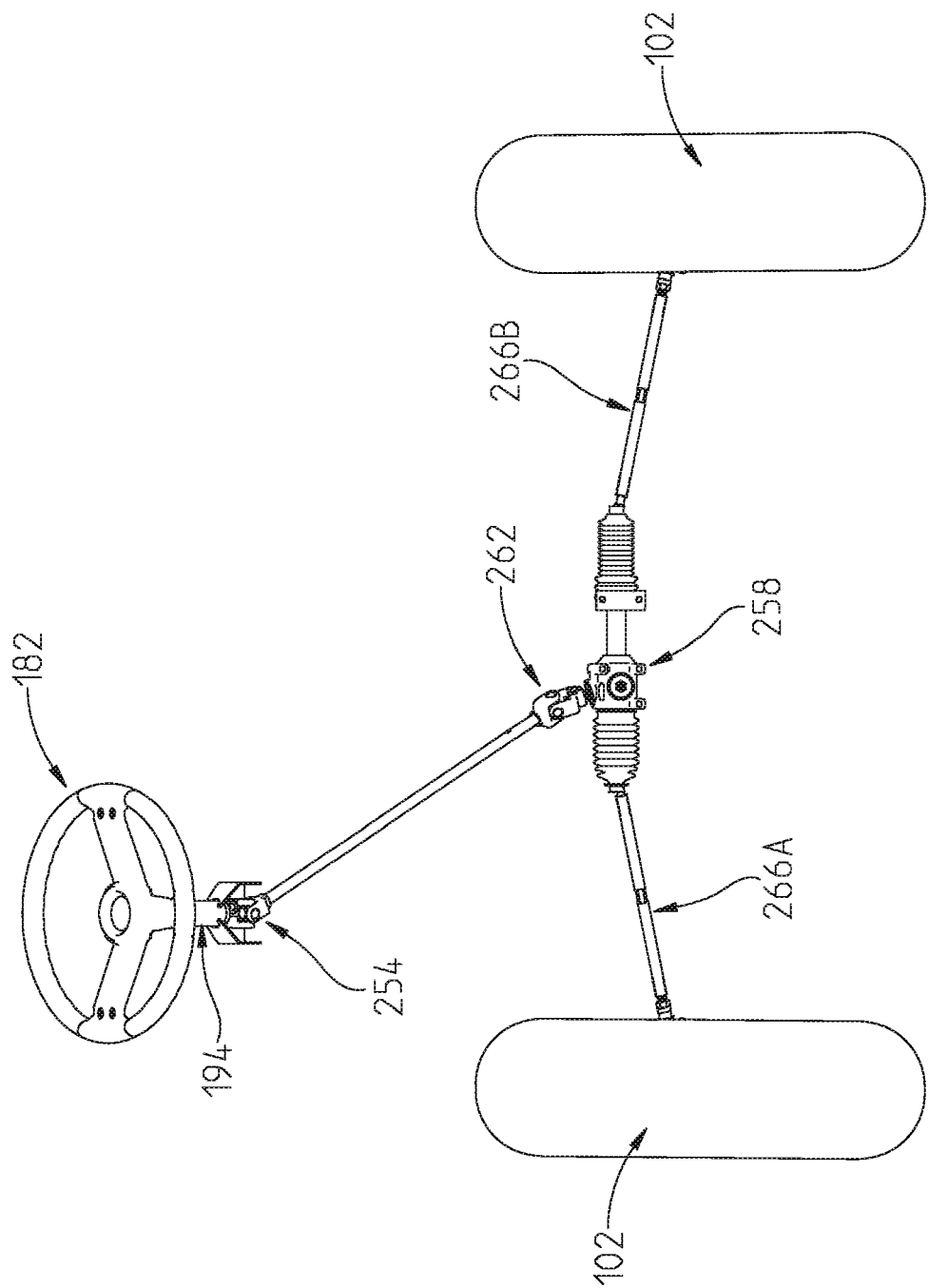
FIG. 16 illustrates a non-power steering steering assembly of the utility vehicle of FIG. 1.

Referring to FIG. 16, in one embodiment, power steering unit 252 is omitted and a straight steering shaft connects steering column 194 to steering rack 258 through steering shaft 254 and fourth u-joint 262. In one embodiment, the gear ratio for steering rack 258 is different depending on whether power steering unit 252 is included (as in FIG. 15) or is omitted (as in FIG. 16). In one embodiment, the gear ration is about 1.3 to 1 for the arrangement shown in FIG. 16 and about 1.6 to 1 on the arrangement shown in FIG. 15 with power steering unit 252

Referring to FIG. 13, power steering unit 252 is generally in line with steering shaft 250 and steering shaft 264. Power steering unit 252 may be located at any position between steering column 194 and steering rack 258. Referring to FIG. 12 12, power steering unit 252 is located generally rearward of attachment members 214 and in an area 281 as represented in FIG. 2. Referring to FIG. 4, area 281 is also shown. Power steering unit 252 is positioned under dashboard body member 203 and behind an under dash body member 215 (see FIG. 12 for assembled location of power steering unit 252).

In one embodiment, power steering unit 252 is an electric power steering unit which receives its power from the electrical system of vehicle 100. In one embodiment, power steering unit 252 is programmable to account for different vehicle conditions and/or operator preferences. In one embodiment, a controller 300 has an associated memory 302 which includes one or more speed profiles 303 which define the amount current to the motor of the power steering unit which is coupled to steering shaft 264 to vary the torque level of the power steering unit 252 provided to steering shaft 264. Controller 300 provides the input to power steering unit 252 to control the operation of power steering unit 252.

In one embodiment, a first speed profile provides that at speeds below a threshold speed that power steering unit 252 provides a first amount of steering effort and assist (torque level provided to steering shaft 264) and at road speeds power steering unit 252 provides a second amount of steering effort and assist (torque level provided to steering shaft 264), the second amount being lower than the first amount. In one example, the second amount is no assist. In one embodiment, the amount of assist varies over a range of speeds and is not limited to simply two discrete speeds. A speed sensor 304 may be used as an input to controller 300 to provide an indication of a speed of vehicle 100. Exemplary speed sensors include a wheel speed sensor coupled to the front axle and a sensor positioned in the shiftable transmission to monitor the speed of the output shaft. In one example, the speed sensor is a sensor which monitors the location of the throttle, in that, it is assumed that vehicle 100 is traveling at higher speeds when the throttle is more open. In one embodiment, one or more user inputs 306 may be provided which allow an operator to select between multiple speed profiles 303.

Figure 17:
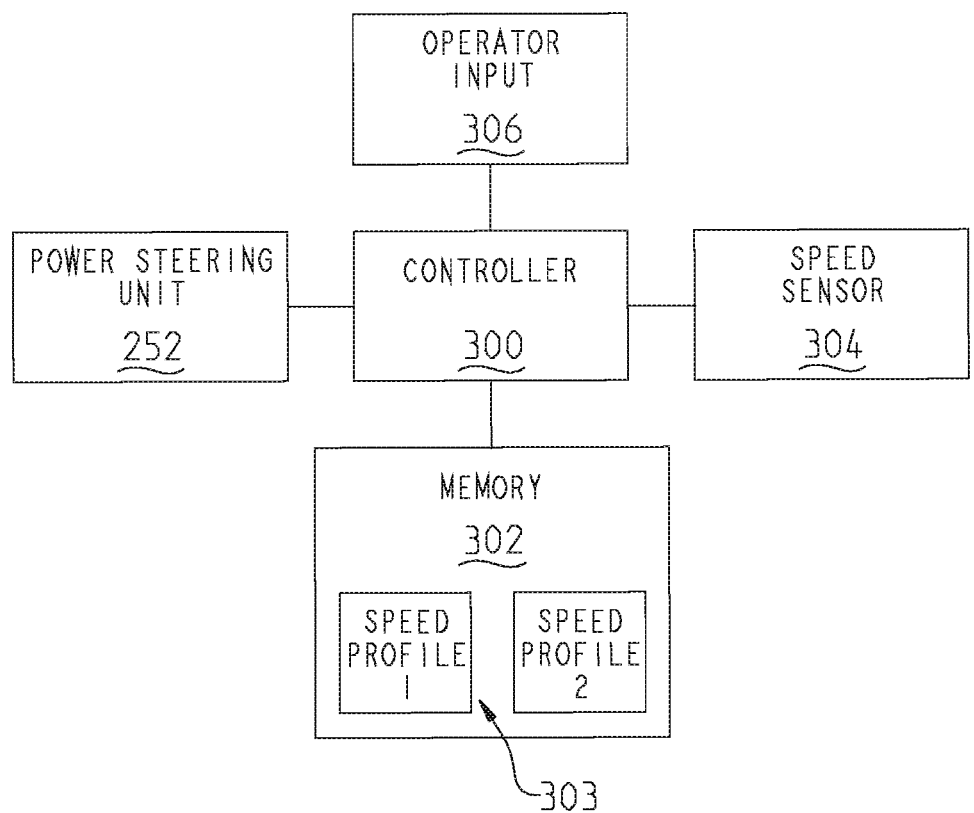
FIG. 17 is a representative view of a control system for the steering assembly shown in FIG. 16.
Figure 17A:
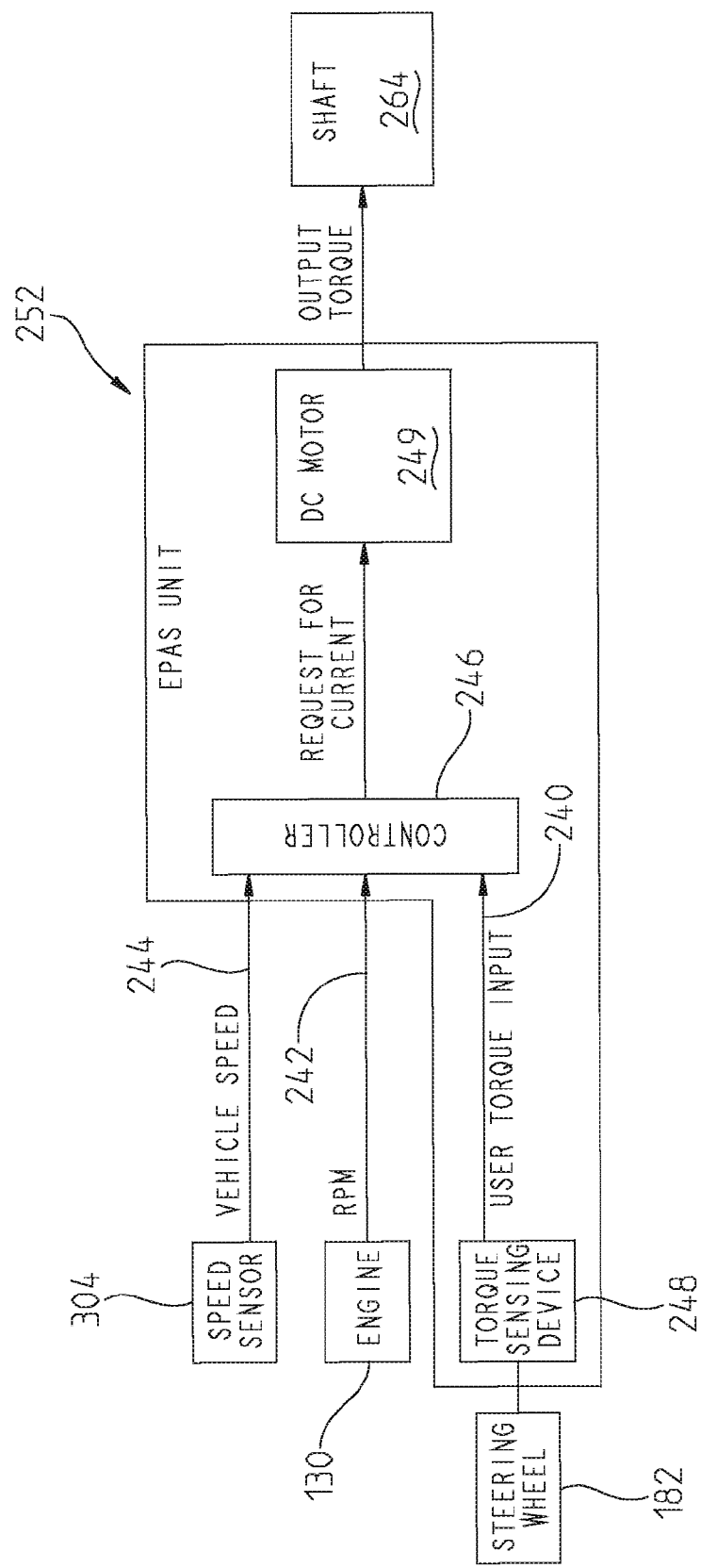
FIG. 17A is a representative view of the power steering unit of FIG. 15.

Referring to FIG. 17A, an exemplary embodiment of power steering unit 252 is shown. Power steering unit 252 receives a torque input 240 from the vehicle operator (through shaft 250), a revolutions per minute (rpm) input 242 from the power source 130, and a speed input 244 from a speed sensor 304. These inputs are provided to a controller 246 of power steering unit 252. Controller 246 provides a current signal to an electric motor 249. Shaft 264 is coupled to shaft 250 through power steering unit 252. Motor 259 is also coupled to steering shaft 264 through a gear set and provides assistance to rotate steering shaft 264 in addition to the force applied through shaft 250 by the operator.

In one embodiment, controller 246 is controller 300. In one example, controller 246 receives a further input from user inputs 306. In one embodiment, controller 246 is in communication with controller 300 (which is external to power steering unit 252) to obtain speed profiles 303 and additional inputs, such as user inputs 306.

The torque input 240 is generated by turning steering wheel 182 and is measured by a torque sensing device 248 which is housed within power steering unit 252. Torque sensing device 248 measures the angular displacement between two shafts connected by a torsional element (one of the shafts responsive to the movement of steering shaft 250 or being the steering shaft 250). The angular displacement is converted to a torque value. The torque value is received by controller 246 and is used by controller 246 to determine an amount of assist which power steering unit 252 should provide through motor 249 and the direction in which the assist needs to be supplied (left turn or right turn). The speed input 244 is also used to vary the amount of assist provided by power steering unit 252 depending on the speed of vehicle 100. As explained herein, the amount of assist may be a function of a speed profile. In one example, the speed profile has distinct constant assist levels based on vehicle speed. In another example, the speed profile varies over a range of vehicle speeds. The RPM input 242 provides an indication of whether power source 130 is running or not running.

Figure 14:
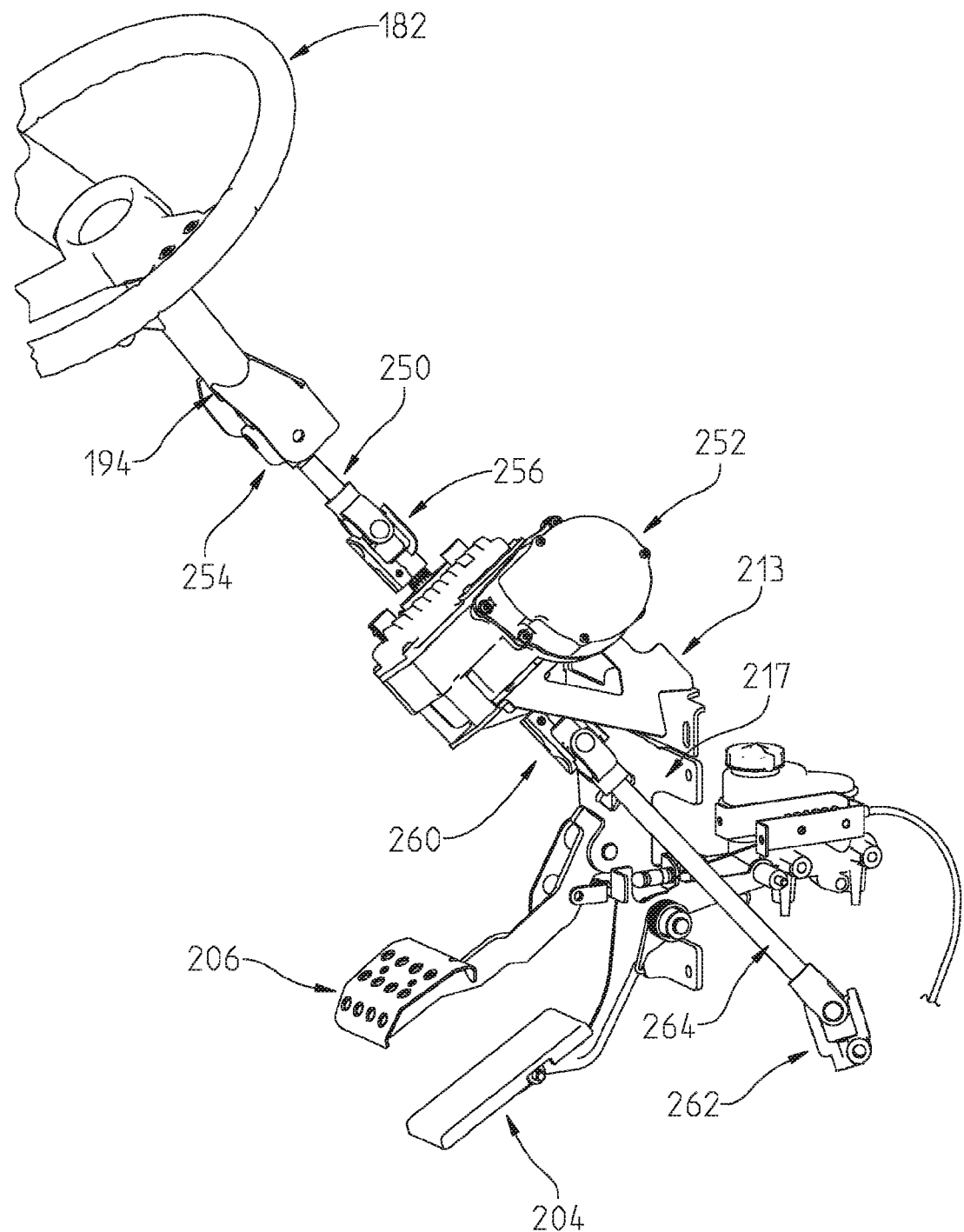
FIG. 14 illustrates a perspective view of the portion of the operator controls of FIG. 13.

Returning to FIGS. 13 and 14, pedal 204 and pedal 206 are moveably coupled to a bracket 217 which is mounted to frame 116. By mounting both pedal 204 and pedal 206 to the same bracket 217, pedal 204 and pedal 206 may be installed as a single unit.

Figure 18:
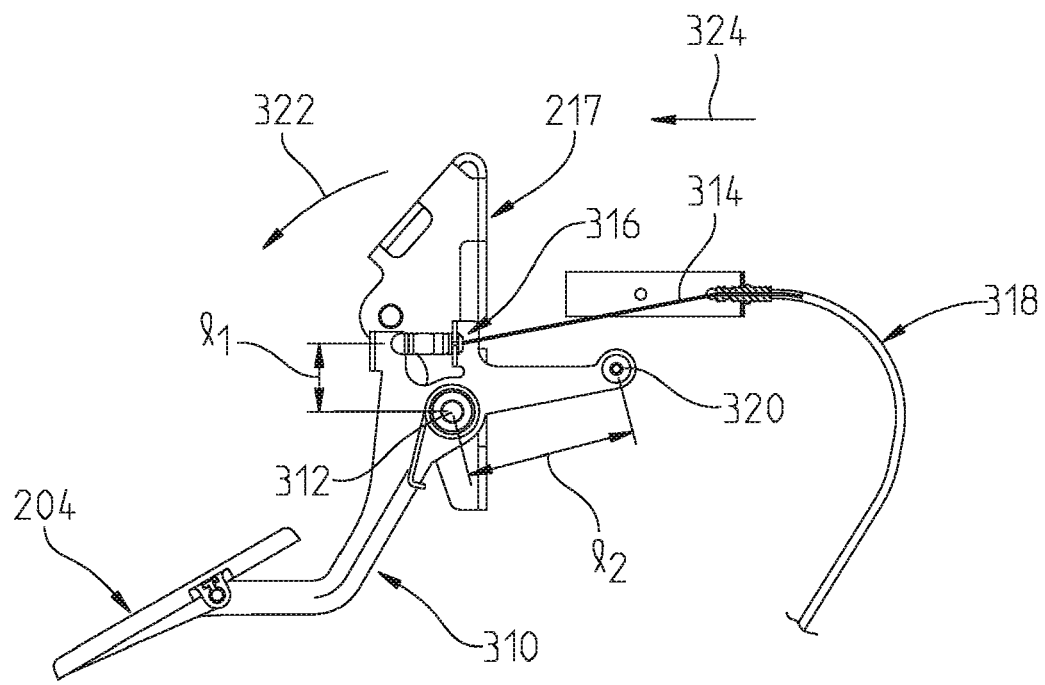
FIG. 18 illustrates a side view of the acceleration pedal of the speed control system of FIG. 13 in a non-depressed arrangement.
Figure 19:
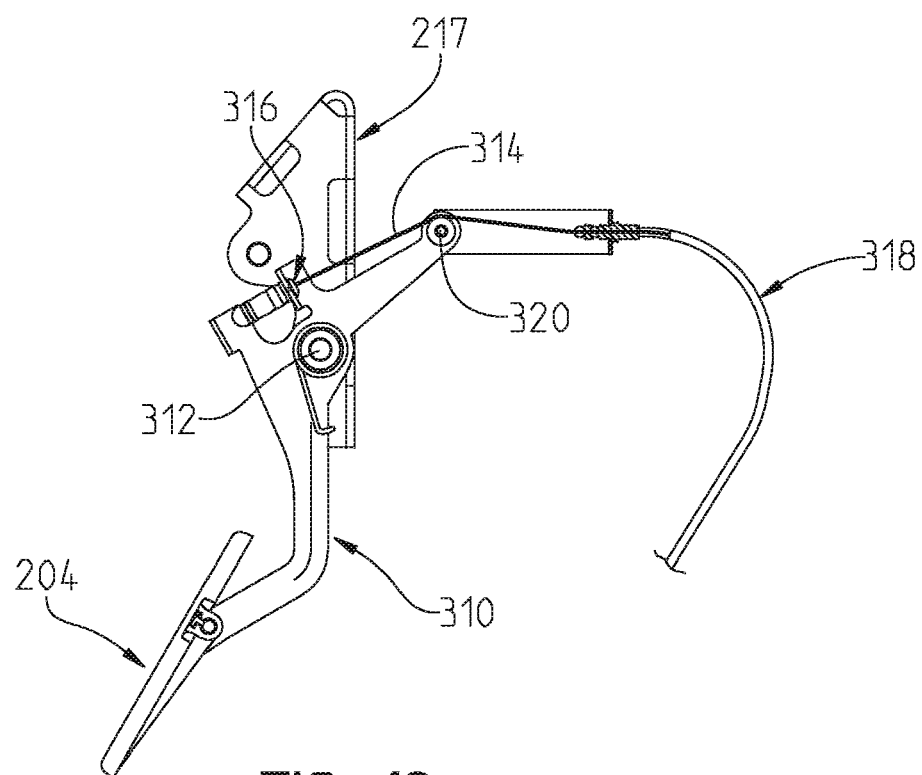
FIG. 19 illustrates the acceleration pedal of FIG. 18 in a fully depressed arrangement wherein a kicker interacts with a throttle cable to adjust the rate of throttle opening.

Turning to FIGS. 18 and 19, a side view of pedal 204 is shown. Pedal 204 is rotatably coupled to a pedal arm 310. Pedal arm 310 is rotatably about a pivot 312. A throttle cable 314 is coupled to pedal arm 310 at a first location 316. By rotating pedal arm 310 about pivot 312 in direction 322 cable 314 is pulled from a sheath 318 generally in direction 324. Throttle cable 314 is coupled to power source 130 to control the operation of power source 130.

Referring to FIG. 19, as pedal arm 310 is rotated in direction 322 a kicker 320 contacts throttle cable 314. Pedal 204 is shown fully depressed in FIG. 19 while pedal 204 is not depressed in FIG. 18. As shown in FIG. 18, first location 316 is spaced apart from pivot 312 by a distance 11 while kicker 320 is spaced apart from pivot 312 by a distance 12. As pedal 204 moves from the position in FIG. 18 to the position in FIG. 19, pedal arm 310 is rotated about one-half of the way before kicker 320 contacts throttle cable 314. At this point throttle cable 314 has been advanced a first distance from sheath 318. Once kicker 320 contacts throttle cable 314, throttle cable 314 is advanced a second distance in direction 324 from sheath 318 as pedal arm 310 is rotated the second one-half way to the position in FIG. 19. The second distance being larger than the first distance. In one embodiment, a total distance is equal to the first distance plus the second distance, the second distance being about 75 percent of the total distance. As such, the first distance correlates to the throttle body being opened by about 25 percent (through 50 percent depression of pedal 204) and the second distance correlates to the throttle body being opened by about 75 percent (through 100 percent depression of pedal 204).

The presence of kicker 320 assists in the drivability of vehicle 100. At low speeds over bumpy terrain, as the operator foot bounces relative to pedal 204, the effect of unintended depressions of pedal 204 is minimized while at high speeds on smooth terrain the response to a depression on pedal 204 is increased.

In one embodiment, a position of pedal 204 is sensed by a sensor which communicates the position of pedal arm 310 to controller 300. Controller 300 may then have various profiles to correspond to the non-linearity of the response of the throttle body due to the position of pedal arm 310. In one embodiment, an operator may select a predetermined mode having a predetermined profile. In one example mode, the upper speed of vehicle 100 may be limited by correlating the full depression of pedal 204 to the selected upper speed, such as 25 miles per hour.

Referring to FIG. 20, the air intake system for power source 130 is shown. An air inlet box 330 which receives fresh air and is generally positioned in area 332 (see FIG. 4) and is generally at a height equal to headlights 334. Air exits air inlet box 330 and travels through an air duct 336 to a resonator box 338. Resonator box 338 is positioned behind seating 176 (see FIG. 21). Air passes from resonator box 338 through air duct 340 to an air filter 342. Air passes through the filter in air filter 342 through an air duct 344 and into power source 130.

Figure 21:
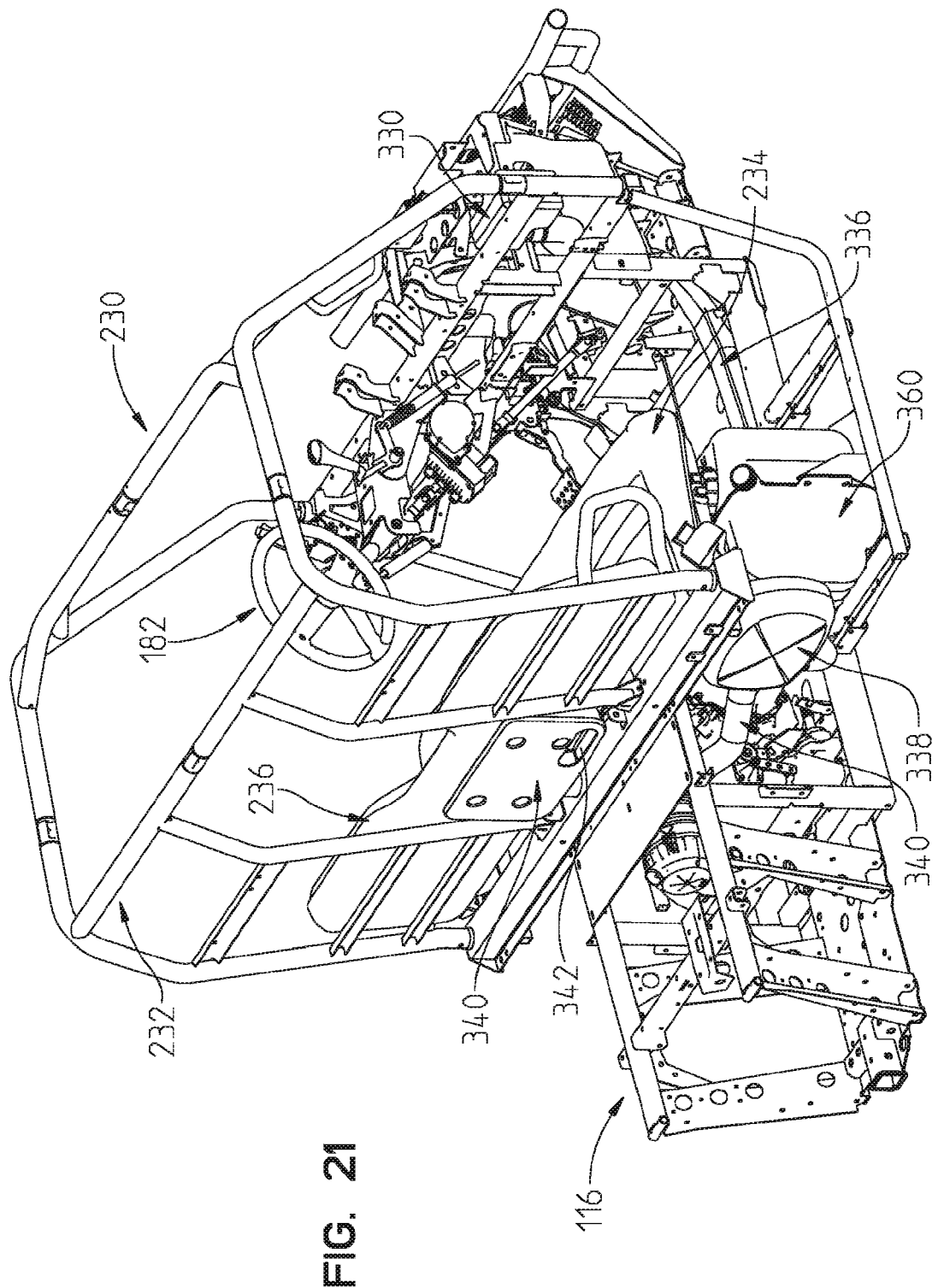
FIG. 21 illustrates the two sir supply systems of FIG. 20 located in the utility vehicle of FIG. 1.

A CVT air box 350 is also shown in FIG. 20. CVT air box 350 includes an air inlet 352 through which fresh air enters. The air travels through air box 350 and through air duct 354 into clutch housing 356. As shown in FIG. 21, CVT air box 350 is positioned in the back of seating 176. Traditionally the air box for the CVT is positioned forward of the operator area. By placing CVT air box 350 behind seating 176, at least two benefits are realized. First, the length of air duct 354 is reduced which results in better cooling for the air in clutch housing 356. This increases the life of the belt used in CVT 135. In one embodiment, the belt temperatures are about twenty degrees lower than having CVT air box 350 positioned forward of operator area 174. Second, the amount of dust which enters CVT air box 350 is about the same when traveling alone in vehicle 100 and while following another vehicle 100.

Referring to FIG. 21, a fuel storage tank 360 is shown. Third u-joint 260 provides fuel to power source 130. In one embodiment, fuel storage tank 360 includes a tank vent having a roll valve which closes the tank vent when vehicle 100 rolls over, such as in an accident.

Vehicle 100 includes four wheel independent suspension. Referring to FIG. 8, each of ground engaging members 102 of rear axle 110 is coupled to frame 116 through a rear suspension 370. Rear suspension 370 includes a lower control arm 372 and an upper control arm 374 and a shock 376. Exemplary shocks 376 include springs and gas shocks. Shock 376 is coupled at a first end to upper control arm 374 of rear suspension 370 and at a second end to frame 116. Frame 116 includes multiple attachment locations for mounting shock 376. Additional details regarding the rear suspension 370 is found in the 2019 applications, the disclosures of which are incorporated by reference.

In one embodiment, shock 376 are load leveling shocks. In one embodiment, shock 376 are Nivomat shocks which are self leveling shocks. Shock 376 want to stay at the same height, commonly known as the ride zone. As such, if a load is placed in bed 150, shock 376 is shortened and enters a pumping zone. When in the pumping zone, every bump vehicle 100 hits is actually assisting in the pumping of fluid into a chamber within shock 376 which increases the air pressure in shock 376, resulting in an air spring in shock 376 being raised back up to the desired height for the ride zone. If the load is removed from bed 150, shock 376 goes above the ride zone and pressure bleeds off to return shock 376 to the ride zone.

In one embodiment, the range of suspension travel (upward movement of lower control arm 372 and upper control arm 374) is about 7.5 inches. In one embodiment, with the shock 406 the range of suspension travel of suspension 370 is about 9 inches.

Figure 48:
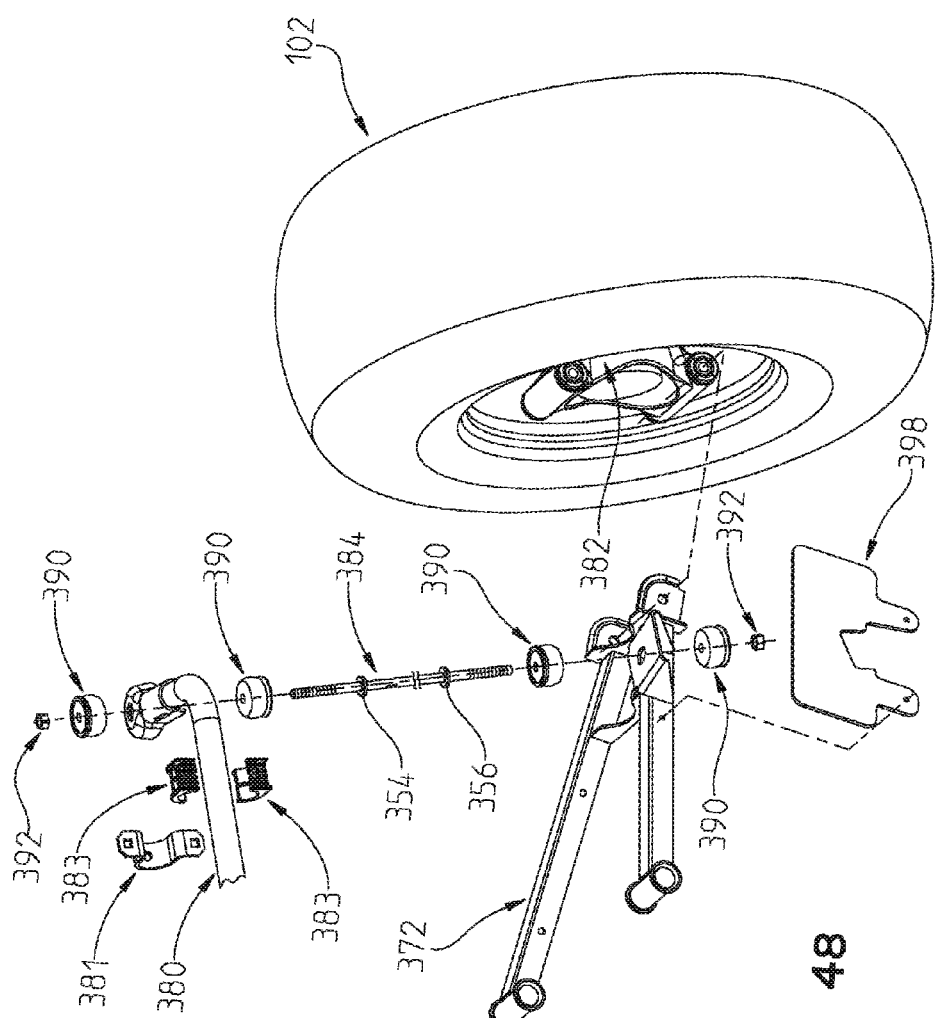
FIG. 48 illustrates the coupling of a torsion bar coupled to the rear suspension of the vehicle.

Referring to FIG. 48, a stabilizer or torsion bar 380 is coupled to inner hub assembly 382 of ground engaging member 102 by rod 384 (Same configuration on both sides of rear axle 110). Torsion bar 380 is also coupled to frame 116 through bracket 381 and clamp bodies 383. More particularly, rod 384 has an upper end 386 which is received in an opening through torsion bar 380 and a lower end 388 which is received through an opening in lower control arm 372. Both upper end 386 and lower end 388 carry a pair of bushing 390 (one on each side of the respective torsion bar 380 and lower control arm 372) and a retainer 392.

Rod 384 further includes an upper stop 394 and a lower stop 396 coupled to the shaft of the rod 384. Upper stop 394 interacts with the bushing 390 adjacent to torsion bar 380 to limit the upward movement of rod 384. Lower stop 396 interacts with the bushing 390 adjacent to lower control arm 372 to limit the downward movement of rod 384. Further, a guard 398 is coupled to lower control arm 372 with couplers to protect rod 384 from debris.

The length of rod 384 may be adjusted to accommodate different suspensions. Also, the durometer of bushings 390 may be adjusted to change the compliance in the system.

Figure 22:
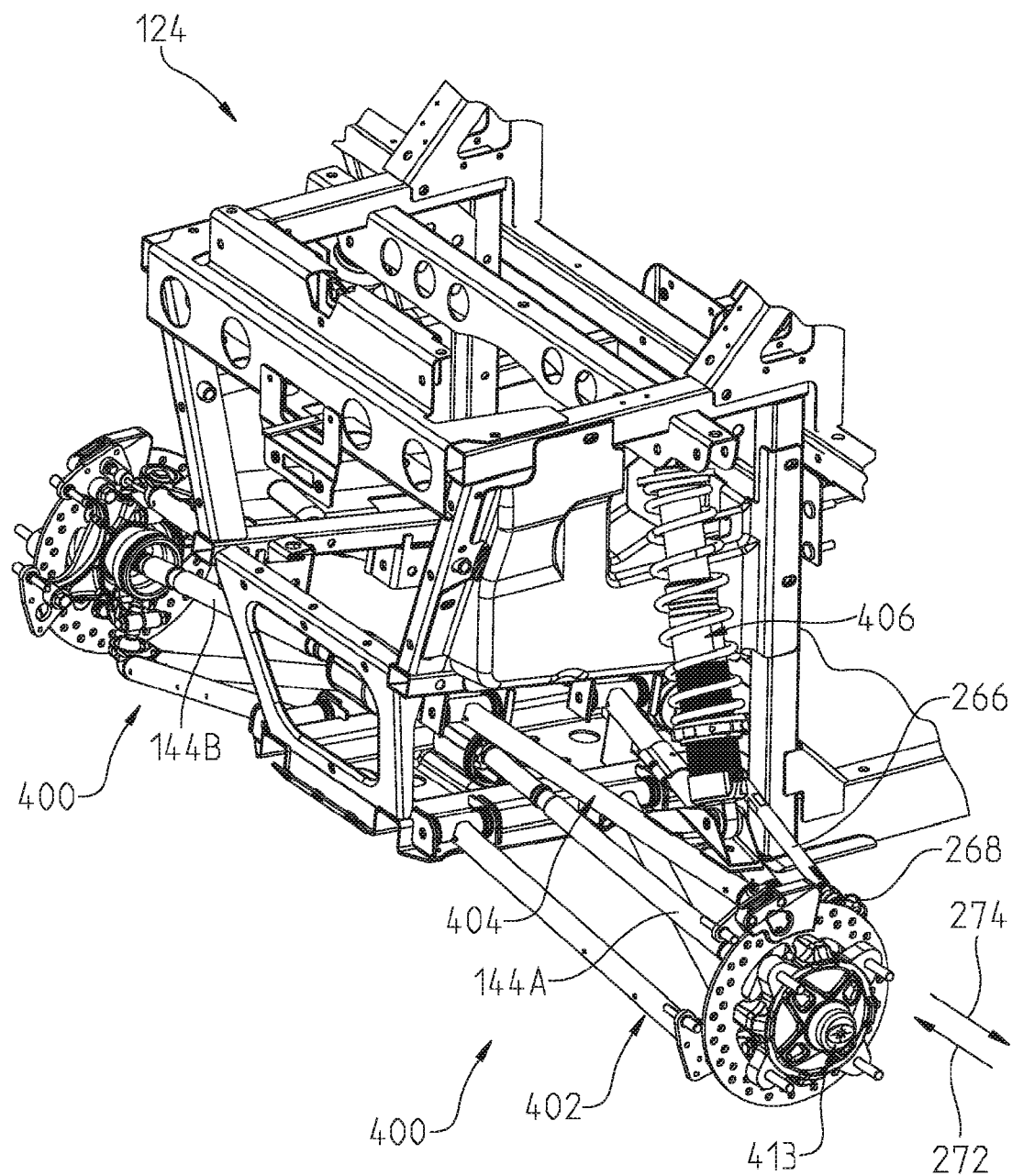
FIG. 22 illustrates a front suspension of the utility vehicle of FIG. 1 including for each wheel a pair of control arms and a shock.
Figure 23:
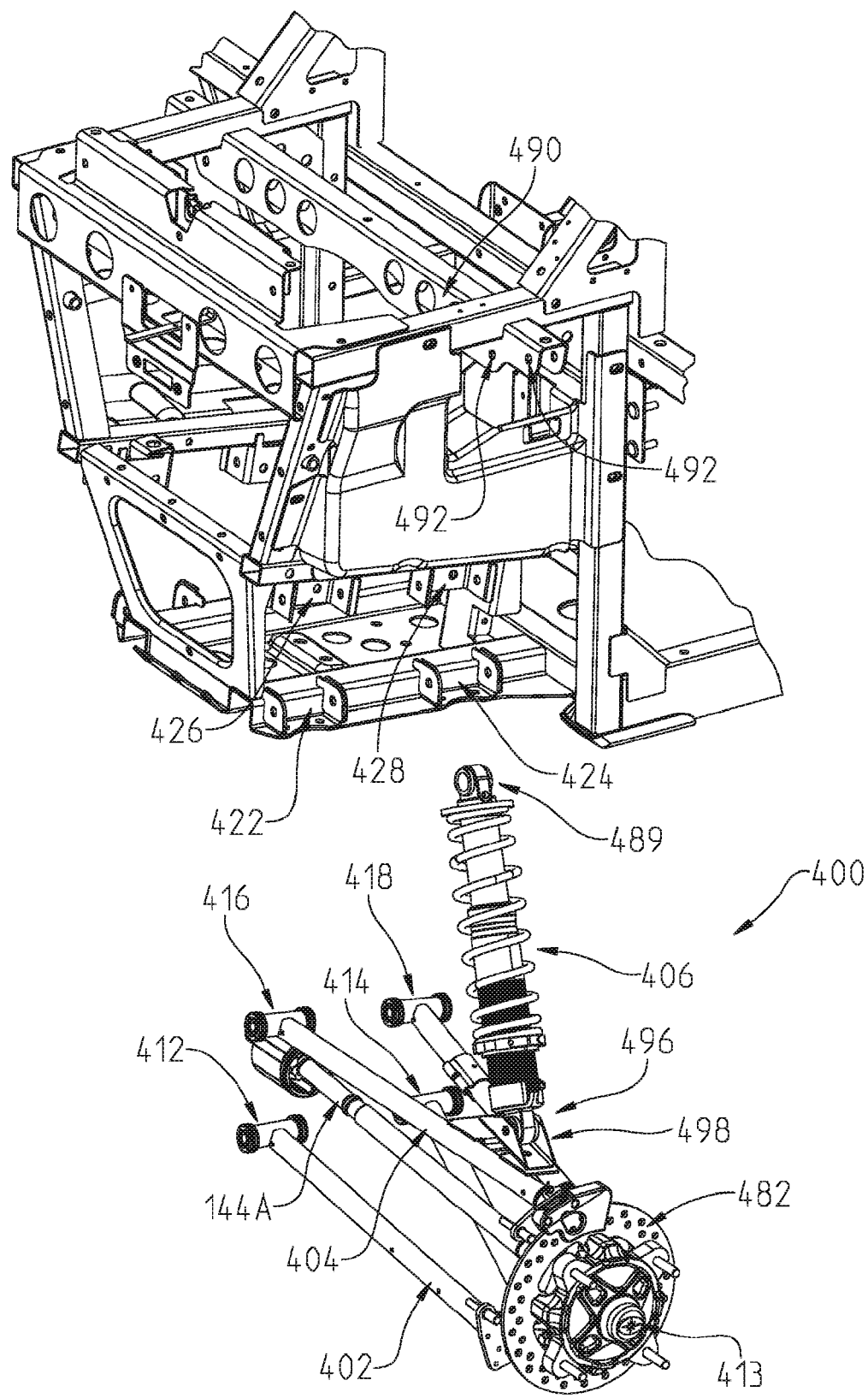
FIG. 23 illustrates the pair of control arm and shock of the operator side front suspension exploded from the frame of the utility vehicle.

Referring to FIGS. 22 and 23, each of ground engaging members 102 of front axle 108 are coupled to front portion 124 of frame 116 through front suspensions 400. Front suspension 400 for the left side of vehicle 100 is described herein and is equally applicable to the front suspension 400 which is a mirror thereof.

Figure 24:
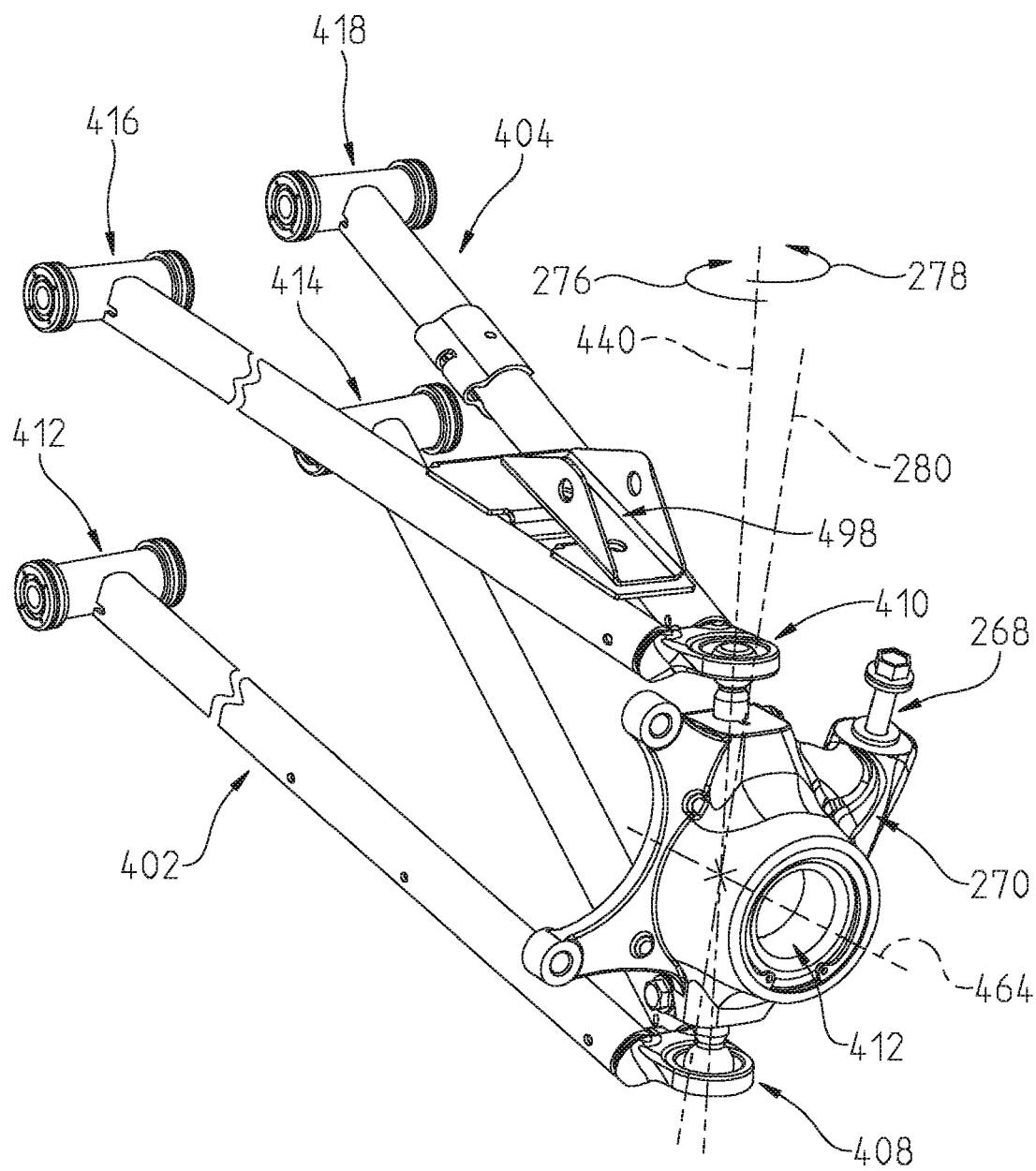
FIG. 24 illustrates the connection between the pair of control arms of FIG. 23 and a wheel carrier.
Figure 25:
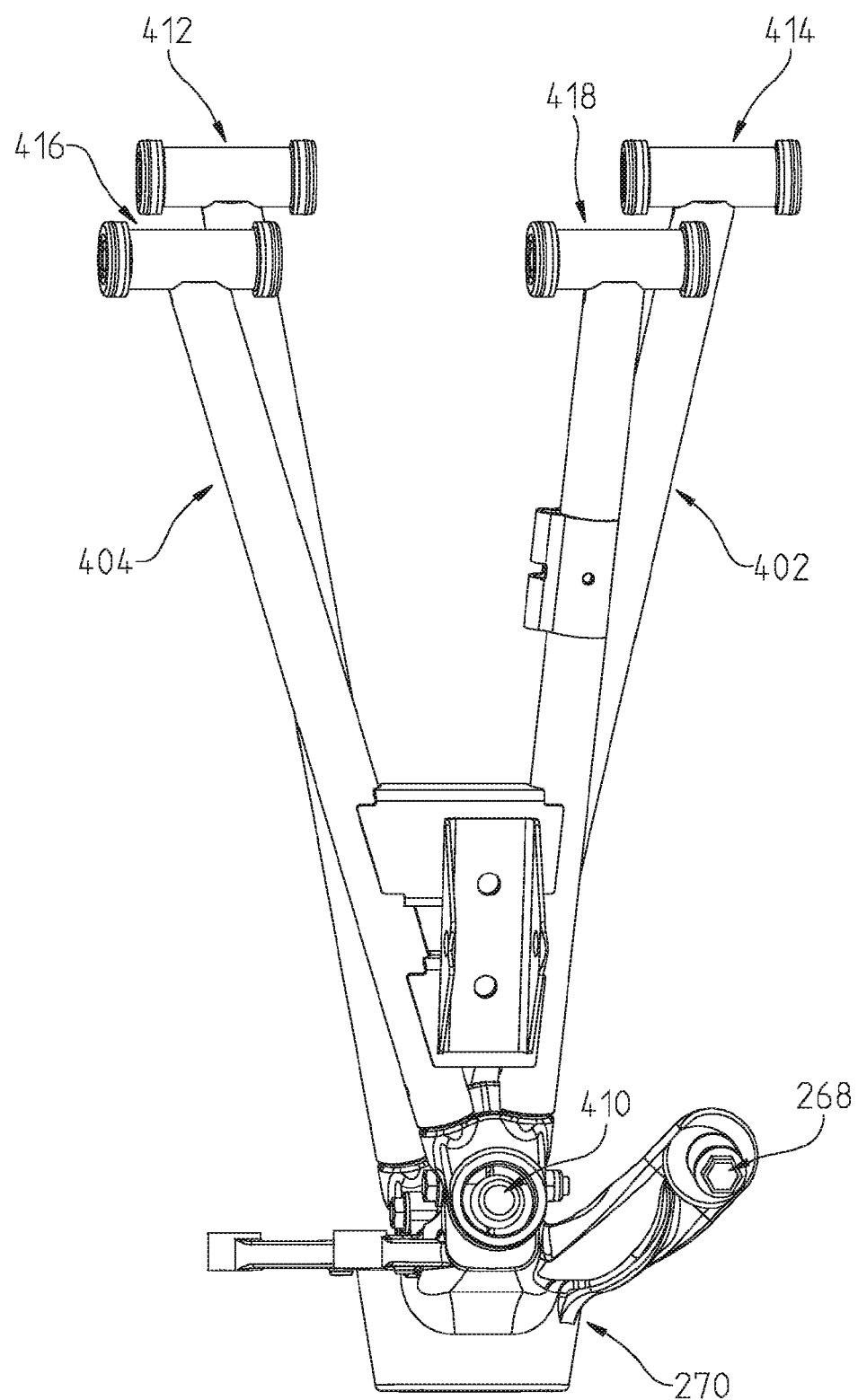
FIG. 25 illustrates a top view of FIG. 24.

Front suspensions 400 includes a lower control arm 402, upper control arm 404, and a shock 406. Referring to FIG. 24, each of lower control arm 402 and upper control arm 404 are A-arms and are coupled at a first end to wheel carrier 270 through respective ball joints 408 and 410. The ball joints 408 and 410 permit the rotation of wheel carrier 270 about axis 280 in direction 276 and direction 278. Wheel carrier 270 includes a bearing 412 to which a hub 413 is coupled. Hub 413 is in turn coupled to ground engaging members 102. In one embodiment, the range of suspension travel (upward movement of lower control arm 372 and upper control arm 374) is about 9.625 inches.

Lower control arm 402 includes attachment member 412 and attachment member 414 which are coupled to front portion 124 of frame 116 through respective couplers and upper control arm 404 includes attachment member 416 and attachment member 418 which are coupled to front portion 124 of frame 116 through respective couplers. Each of attachment members 412-418 are received by respective attachment members 422-428 of front portion 124 of frame 116 as shown in FIG. 23.

Figure 10:
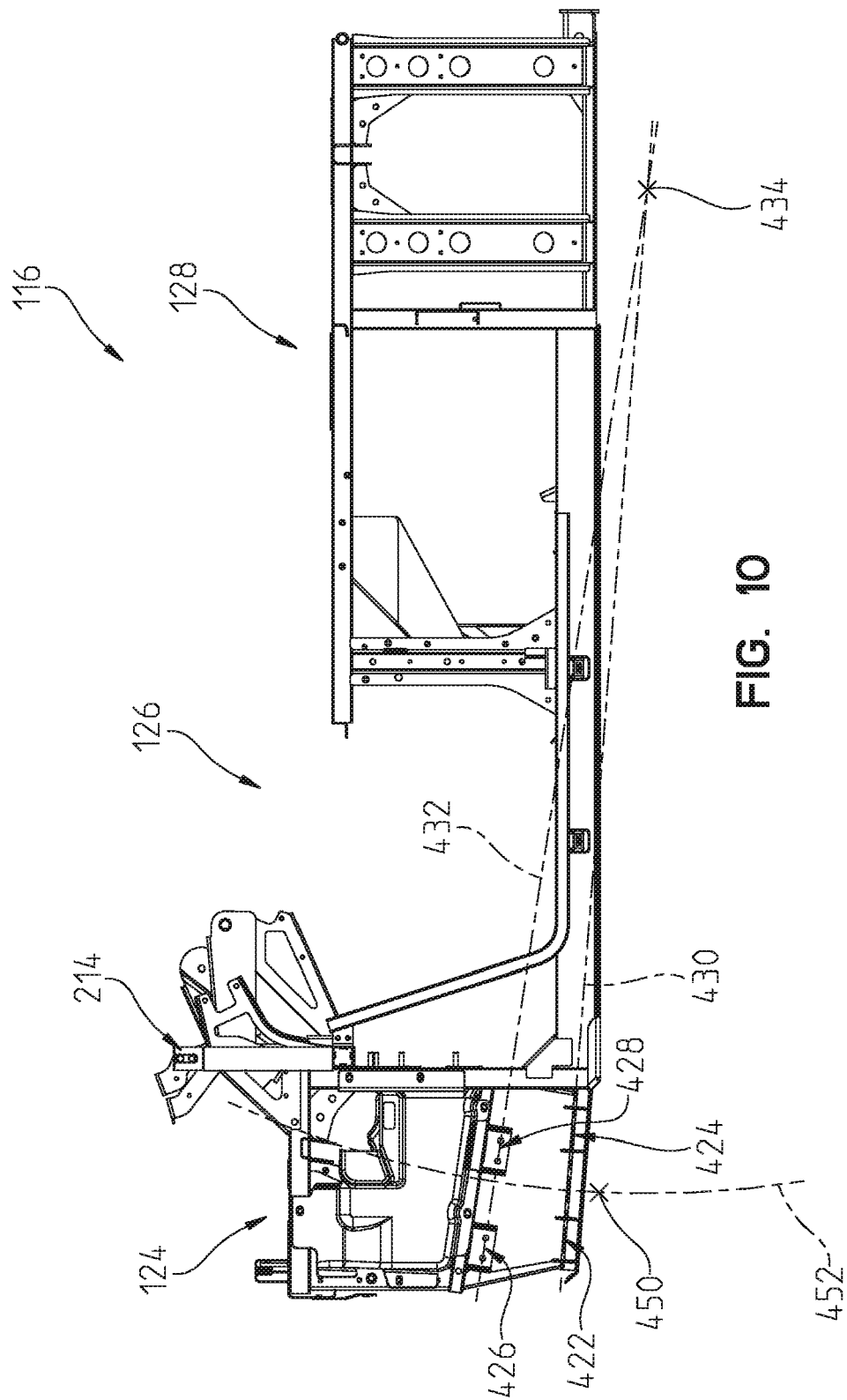
FIG. 10 illustrates a side view of the frame of FIG. 9.

Referring to FIG. 10, attachment members 422-428 of front portion 124 are angled from horizontal. Front portion 124 is coupled to the remainder of frame 116 and is angled upward relative to the skid plate 117 (see FIG. 9) of frame 116. In one embodiment, front portion 124 is angle at least about 4.5 degrees upward. In one embodiment, front portion 124 is angled about 4.5 degrees upward. As shown in FIG. 10, attachment members 422 and 424 are in line (see line 430 in FIG. 10) and are also angled upward by the same amount as front portion 124. Attachment members 426 and 428 are in line (see line 432 in FIG. 10) and non-parallel with attachment members 422 and 424. In one embodiment, attachment members 426 and 428 are angled upward more relative to skid plate 117 than attachment members 422 and 424 such that line 430 and line 432 intersect at point 434 as seen from the side view of FIG. 10. In one embodiment, attachment member 426 and 428 are angled at least about 8.75 degrees upward relative to skid plate 117. In one embodiment, attachment member 426 and 428 are angled about 8.75 degrees upward relative to skid plate 117.

Attachment members 426 and 428 are positioned outward from attachment members 422 and 424. In one embodiment, attachment members 422 and 424 are positioned outward from a longitudinal center plane by about 5.9 inches and attachment members 426 and 428 are positioned outward from the longitudinal center plane by about 7.3 inches. In one embodiment, attachment members 422-428 are positioned in the same plane vertically.

By having upper control arm 404 at a steeper angle than lower control arm 402, ball joint 410 associated with upper control arm 404 travels through a different arc than ball joint 408 associated with lower control arm 402. This results in an increase in the caster angle which is the angle axis 280 makes with a vertical axis 440 which intersects axis 280 along a rotational axis 464 of hub 413. Additional details regarding the caster angle of dual control arm suspensions are provided in U.S. Pat. No. 6,942,050, the disclosure of which is expressly incorporated by reference herein.

The increase in caster increases the stability of vehicle 100 to want to continue to proceed straight forward. This is beneficial in many situations. A first example situation is when the brakes of vehicle 100 are applied quickly, such as when something darts in front of vehicle 100. The front of vehicle 100 dives meaning front portion 124 becomes closer to the ground which causes the rotation of lower control arm 402 and upper control arm 404 which in turn increases the caster. This increase in caster keeps vehicle 100 traveling generally straight instead of wanting to swerve to one side or the other. Second, the increase in caster works to counteract the magnitude that front portion 124 dives when the brakes are applied. This is because as front suspension 400 is moving up the increase in caster is trying to rotate wheel carrier 270 toward operator area 174 while the brakes and ground engaging members 102 are trying to rotate wheel carrier 270 away from operator area 174. The increase in caster effectively reduces the desire to rotate ground engaging members 102 away from operator area resulting in lowering the magnitude of the dive of front portion 124.

The angling of front portion 124 results in a greater ground clearance for the front of vehicle 100. Further, the angling of lower control arm 402 and upper control arm 404 relative to horizontal results in a recessional wheel travel when bumps are encountered. If lower control arm 402 and upper control arm 404 were parallel, such as both being about 4.5 degrees from horizontal, then ground engaging members 102 would have a recessional wheel travel and move linearly along a line angled 4.5 degrees from vertical back towards operator area 174. Since lower control arm 402 and upper control arm 404 are angled at two different angles from horizontal, ground engaging members 102 does not travel linearly rearward, but rather moves through an arc 452 (see FIG. 10).

Referring to FIG. 10, lines 430 and 432 intersect at point 434. The center of hub 413 is represented by point 450. As lower control arm 402 and upper control arm 404 move upward, point 450 moves generally along an arc 452 centered on point 434. As such, by moving point 434 closer to point 450, ground engaging members 102 moves backward toward operator area 174 at a higher rate than illustrated and alternatively by moving point 434 further from point 450, ground engaging members 102 moves backward toward operator area 174 at a lower rate than illustrated. The recessional wheel travel assists when bumps are encountered because ground engaging members 102 is moving backward with the bump which results in less of a jolt to the operator.

Referring to FIG. 27, upper and lower ball joints 408 and 410 together define an axis of rotation 440, commonly referred to the kingpin axis. The closer to vertical that axis 440 is the easier it is to turn ground engaging members 102. Turning of steering wheel 182 rotates ground engaging members 102 about axis 440. A central plane of wheel 104 defines a front wheel center axis 460. A king pin offset 462 is defined as the distance between the king pin axis 440 and the wheel center axis 460, as measured along the rotational axis 464 of hub 413. The ride and handling characteristics of vehicle 100 are generally improved by reducing the king pin offset 462. The king pin offset 462 is a moment arm, so every time a ground engaging member 102 hits a bump the king pin offset 462 is creating the steering torque (i.e. the desire to have ground engaging members 102 turn). By shortening king pin offset 462, the less effort it takes to turn steering wheel 182 and the less steering torque you receive back through steering wheel 182, such as due to bumps.

In the illustrative embodiment, the king pin offset 462 is less than about 54 millimeters ("mm"), and is illustratively equal to about 53.17 mm. Additional details regarding the advantages of reducing the king pin offset are disclosed in U.S. patent application Ser. No. 12/069,521, filed Feb. 11, 2008, the disclosure of which is expressly incorporated by reference herein.

As shown in FIG. 27, ball joints 408 and 410 are tucked inside of wheel 104. In the illustrated embodiment, wheel 104 is a 12 inch rim. In order to package ball joints 408 and 410 inside of wheel 104, brake 480 was moved to a location on the front side of ground engaging members 102.

Figure 29:
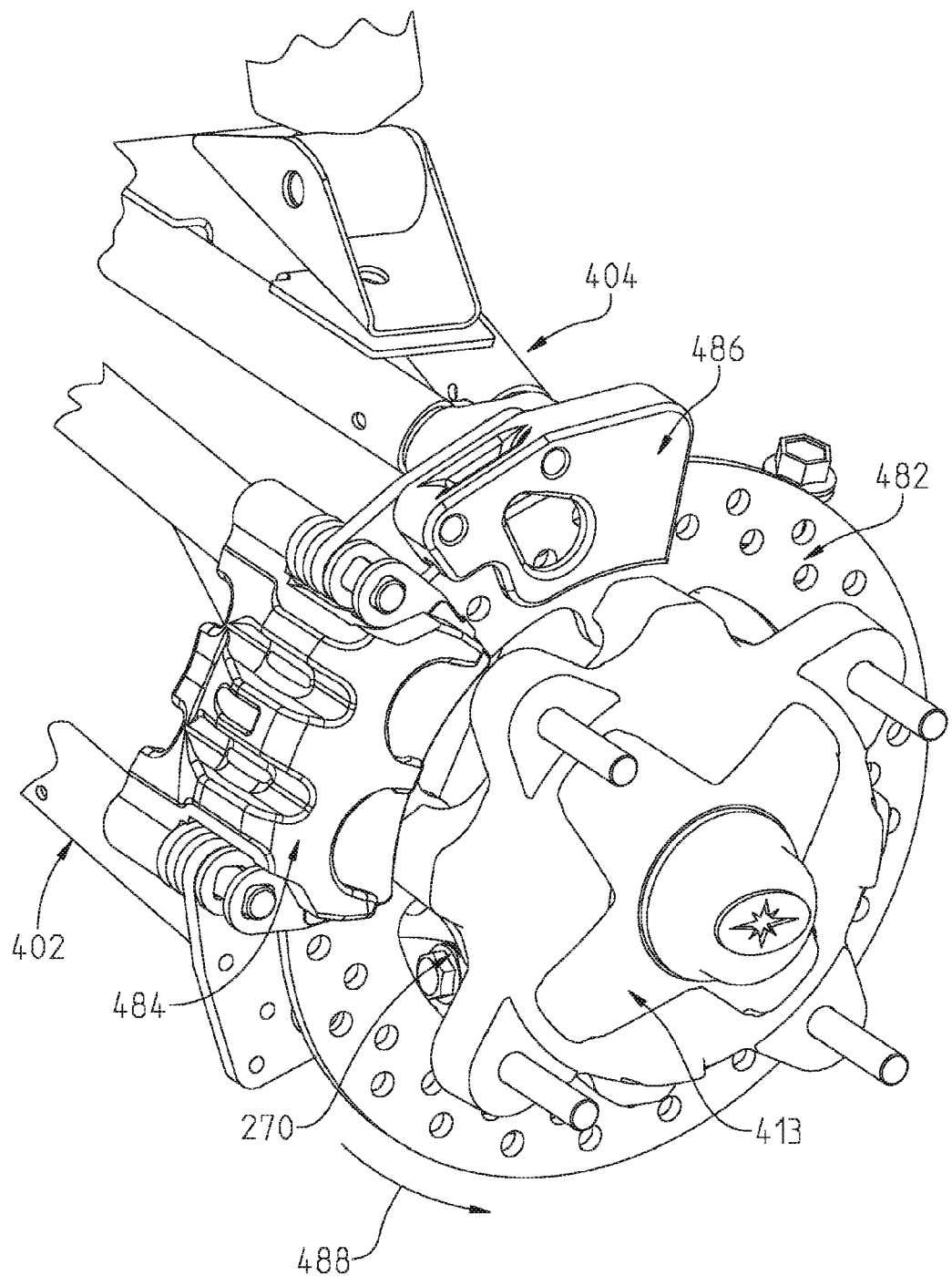
FIG. 29 illustrates a brake system of the utility vehicle of FIG. 1.

Referring to FIG. 29, brake 480 is a disc brake and includes a disc 482 coupled to hub 413 and a brake unit 484 coupled to wheel carrier 270. In one embodiment, brake unit 484 is a dual piston brake unit as described in U.S. patent application Ser. No. 12/092,153, filed Apr. 30, 2009, and U.S. Provisional Patent Application Ser. No. 60/918,502, filed Mar. 16, 2007, the disclosures of which are expressly incorporated by reference herein. Brake 480 further includes a brake disc scraper 486 which removes debris from disc 482 as it rotates in direction 488.

Referring to FIG. 26, a width of vehicle 100 from an outside of front wheel 106 to the outside of the other front wheel 106 is about 58.2 inches (w3 shown on FIG. 26 is about 29.1 inches). A width of vehicle 100 from an inside of front wheel 106 to the inside of the other front wheel 106 is about 44.4 inches (w2 shown on FIG. 26 is about 22.2 inches). As such, a width of vehicle 100 from the center plane of front wheel 106 to the center plane of the other front wheel 106 is about 51.3 inches. Also shown on FIG. 26, a width of front portion 124 from attachment member 422 on a first side to attachment member 422 on the other side is about 11.8 inches (w1 shown on FIG. 26 is about 5.9 inches). A length of lower control arm 402 is about 18.6 inches (CA shown on FIG. 26). A high ratio of lower A arm length (2*CA) to vehicle width (w2+(w3−w2)/2) is desired. In the illustrated embodiment, this ratio is about 73 percent. In one embodiment, the ratio is at least about 73 percent.

Referring to FIG. 23, shock 406 is shown. Shock 406 is a gas shock having an upper end 489 rotatably coupled to a cross bar 490 of front portion 124 at either location 492 or location 494. Location 494 is outboard from location 492 and provides a stiffer setup for front suspensions 400. Additional details regarding multiple shock setups are disclosed in U.S. patent application Ser. No. 12/092,153, filed Apr. 30, 2009, and U.S. Provisional Patent Application Ser. No. 60/918,502, filed Mar. 16, 2007, the disclosures of which are expressly incorporated by reference herein. A lower end 496 of shock 406 is coupled to a bracket 498 supported by upper control arm 404.

Figure 28:
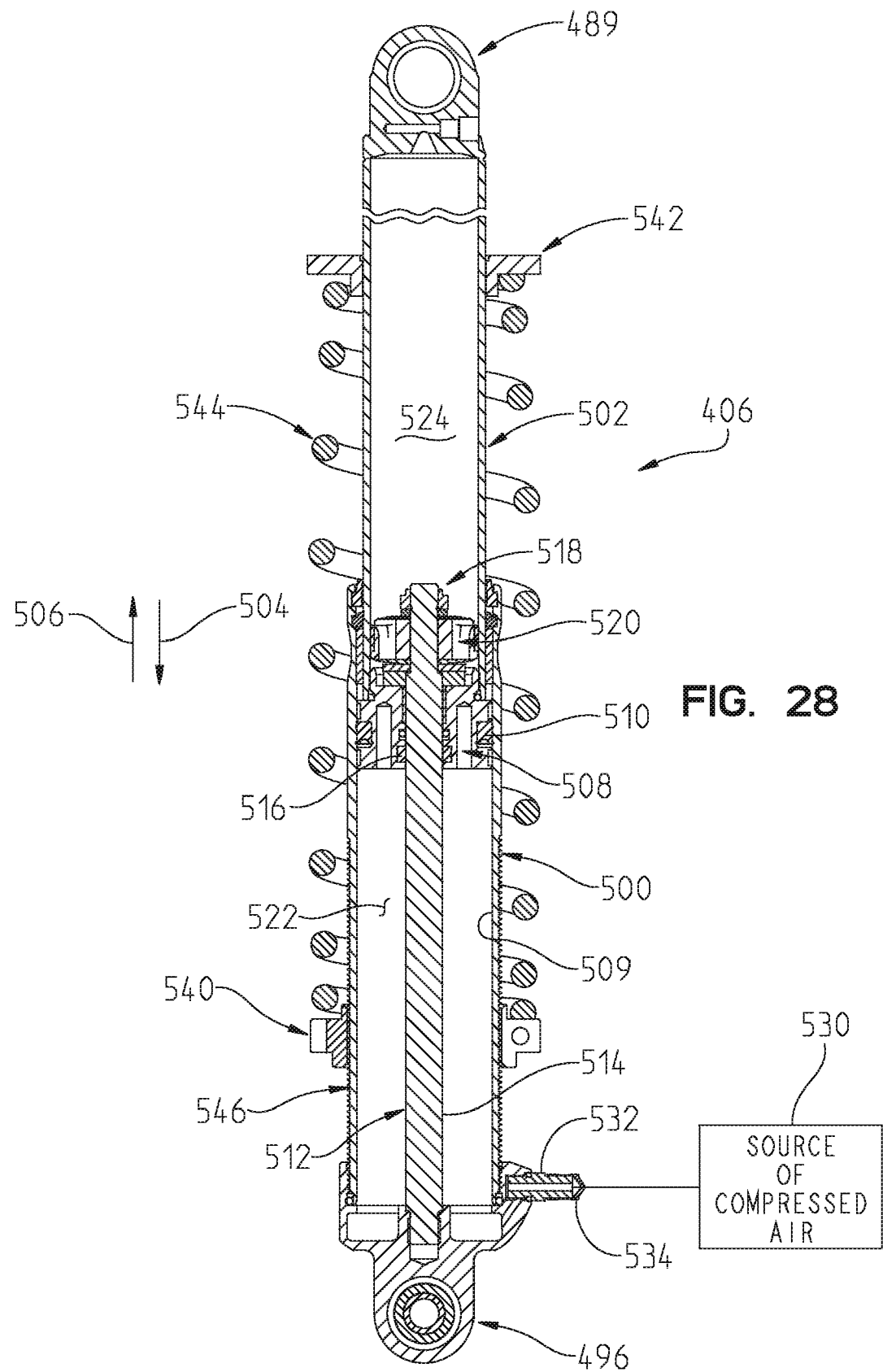
FIG. 28 illustrates a cross-section view of the shock of FIG. 22.

Referring to FIG. 28, a representative cross-section of shock 406 is shown. As shown in FIG. 26, shock 406 includes a first body member 500 and a second body member 502. Second body member 502 has a smaller diameter than first body member 500 and is received in an interior therein. Second body member 502 is moveable relative to first body member 500 in direction 504 and direction 506. Second body member 502 has coupled on a first end a piston 508 which seals against an interior wall 509 of first body member 500 through a seal 510. Piston 508 has a central opening which receives a guide shaft 512 which is coupled to first body member 500. Piston 508 seals against an exterior surface 514 of guide shaft 512 through seal 516. As such, an air chamber 522 in first body member 500 is generally isolated from an air chamber 524 in second body member 502.

As second body member 502 moves in direction 504, piston 508 also moves in direction 504. Guide shaft 512 has coupled at an end 518 a damping piston 520. Damping piston 520 includes a plurality of apertures which permit air in air chamber 524 to pass therethrough. Damping piston 520 serves to act as a stop limiting the travel of second body member 502 in direction 506. Damping piston 520 also serves to resist the movement of second body member 502 in direction 504.

Compressed air is provided to air chamber 522 from a source of compressed air 530 through an air inlet valve 532 which is in fluid communication with air chamber 522 through a fluid conduit not shown in the present cross section. Increasing the pressure of the air within air chamber 522 increases a fluidic stiffness of shock 406 while decreasing the pressure of the air within air chamber 522 decreases a fluidic stiffness of shock 406.

Shock 406 also has a mechanical stiffness adjustment. First body member 500 has coupled thereto a stop member 540. Second body member 502 has coupled thereto a stop member 542. Compressed between stop member 540 and stop member 542 is a spring 544. Spring 544 provides a force which wants to expand the separation of stop member 540 and stop member 542 and thus resists the movement of second body member 502 in direction 504 relative to first body member 500.

At least one of stop member 540 and stop member 542 is movable relative to first body member 500 and second body member 502, respectively. Illustratively, stop member 540 is threadably engaged with an exterior surface 546 of first body member 500. Stop member 540 may be advanced in direction 506 by rotating stop member 540 relative to first body member 500 in a first direction and may retreat in direction 504 by rotating stop member 540 in a second, opposite direction. By advancing stop member 540 in direction 506, a mechanical stiffness of shock 406 is increased while retreating stop member 540 in direction 504 a mechanical stiffness of shock 406 is decreased.

As described herein, shock 406 has two methods to vary an overall stiffness of shock 406. The overall stiffness is a combination of a fluidic stiffness and a mechanical stiffness. As such, the overall stiffness of shock 406 may be decreased by reducing the mechanical stiffness, reducing the fluidic stiffness, or reducing both the mechanical stiffness and the fluidic stiffness and the overall stiffness of shock 406 may be increased by increasing the mechanical stiffness, increasing the fluidic stiffness, or increasing both the mechanic Shock 406 provides a gas shock which is capable of functioning at atmospheric pressure in air chamber 522 and at a positive pressure in air chamber 522. In one embodiment, air chamber 522 is at atmospheric pressure for a standard setup. Thus, in the standard setup spring 544 is providing the stiffness of shock 406. The stiffness may be adjusted by moving stop member 540. When a load is placed on vehicle 100, such as the attachment of a plow, a positive pressure is introduced into air chamber 522 to increase the overall stiffness of shock 406. This returns shock 406 to its standard setting length and vehicle 100 to its standard setting height. Once the load is removed from vehicle 100, the positive pressure in air chamber 522 may be bled off to return air chamber 522 to atmospheric pressure and the standard setup.

In one embodiment, the source of compressed air 530 is external to vehicle 100, such as an air compressor at a gas station. To vary the air pressure, an operator of vehicle 100 would simply travel to the location of the air compressor or bring the air compressor to vehicle 100 (in the case of a portable home air compressor) and attach the air compressor to air inlet valve 532 to provide additional air to air chamber 522.

In one embodiment, vehicle 100 includes an onboard air compressor as source of compressed air 530. A user input is provided, such as on dashboard body member 203, whereby an operator may activate the onboard compressor to provide additional air to air chamber 522. In this embodiment, controller 300 is able to provide pressurized air to air chamber 522 and a controlled valve is able to bled air from air chamber 522. In one embodiment, controller 300 stores a plurality of pressure settings in memory 302. A user through the user input selects one of the stored pressure settings and controller 300 controls the onboard compressor and/or the controlled valve to adjust the pressure in air chamber 522. In this manner, a first pressure setting could correspond to a standard setup and a second pressure setting could correspond to a plow accessory setup or a setup for a particular terrain type.

In one embodiment, shock 406 is provided on both front suspensions 400 and rear suspension 370 to provide adjustment on all four ground engaging members 102 with either a stand alone source of compressed air 530 or an onboard source of compressed air 530. In one embodiment, controller 300 controls the pressure in each of all four shock 406 provided as part of rear suspension 370 and front suspensions 400.

Figure 30:
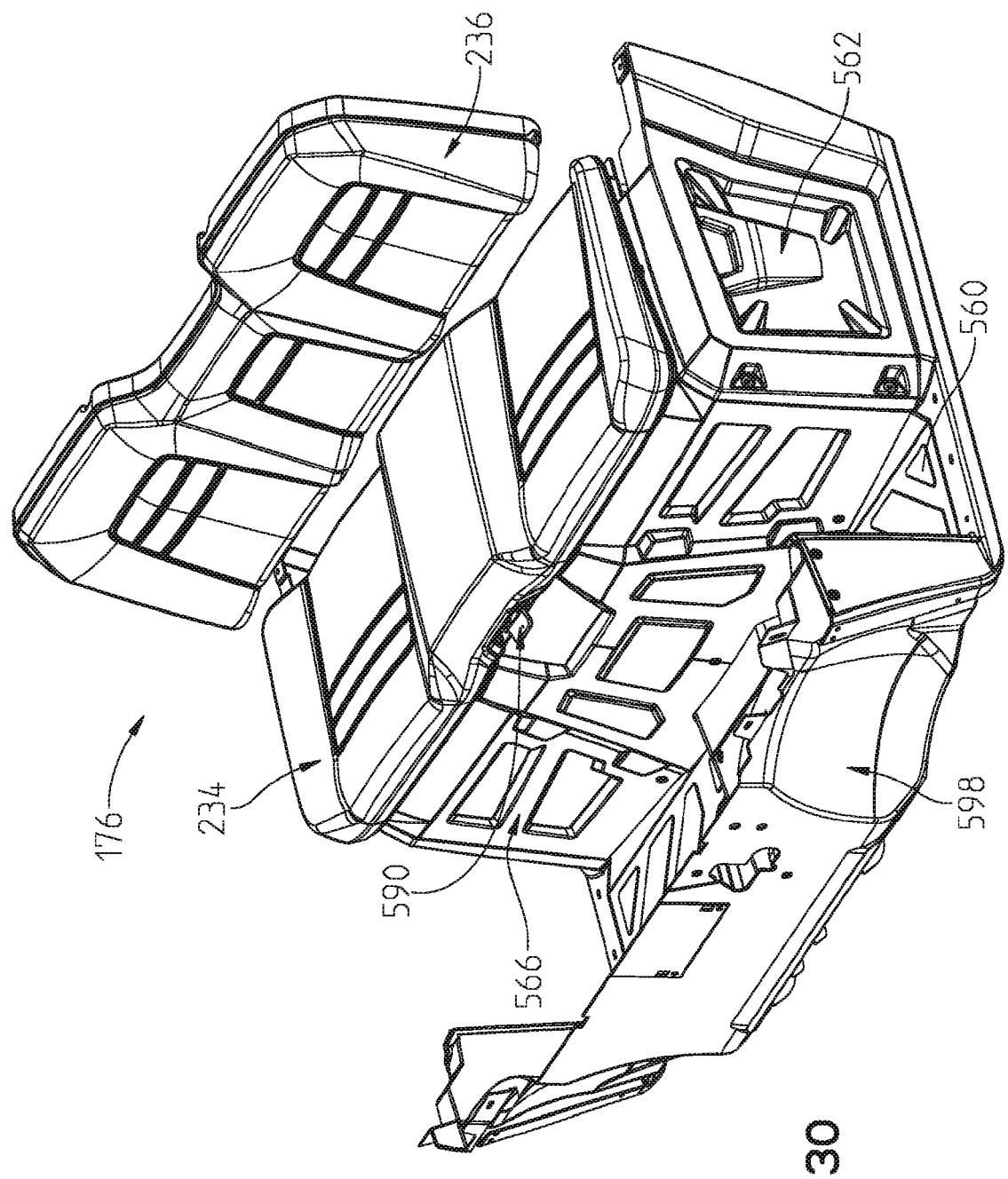
FIG. 30 illustrates an assembly of the lower body panels of an operator area of the utility vehicle of FIG. 1 and the seating of FIG. 1.
Figure 31:
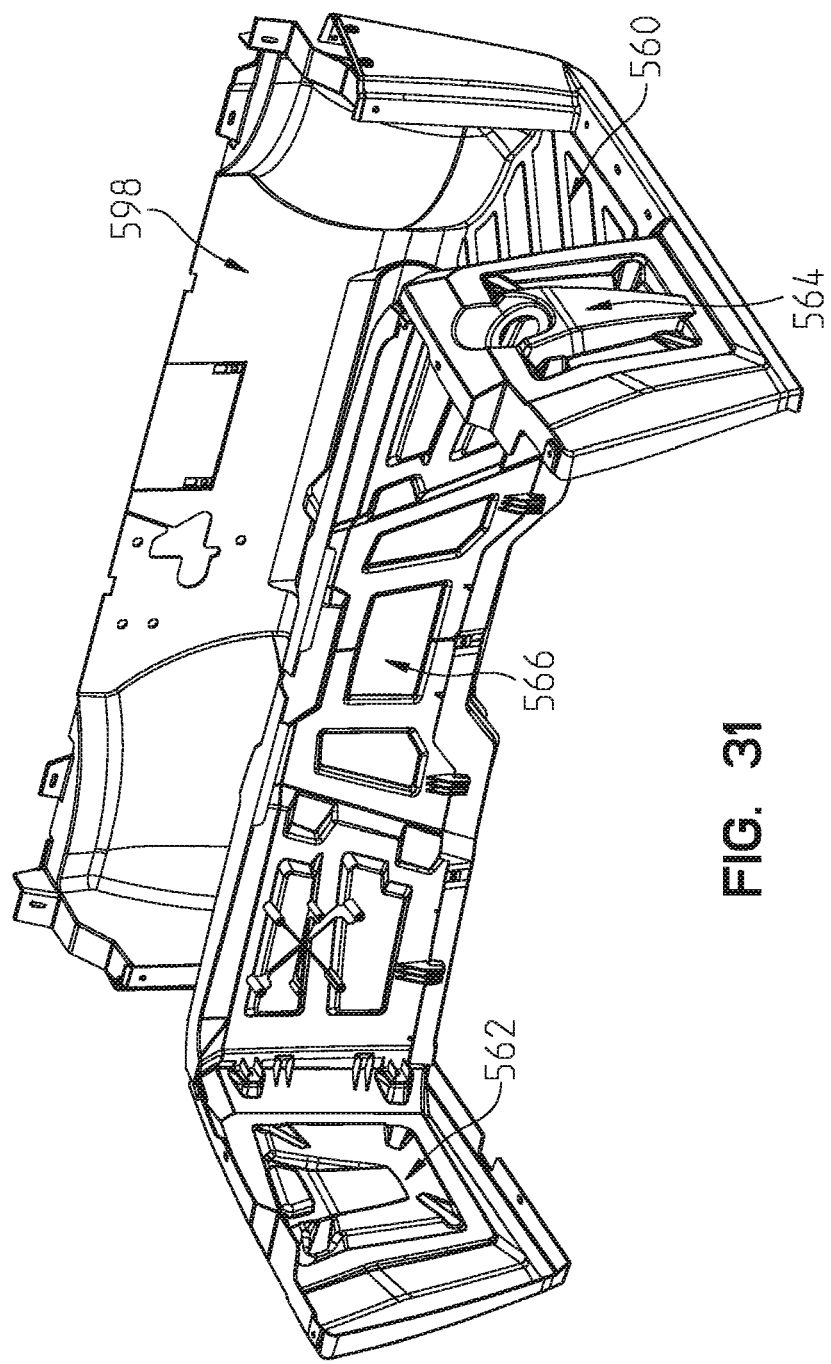
FIG. 31 illustrates a perspective view of the lower body panels of the operator area of the utility vehicle of FIG. 1.
Figure 32:
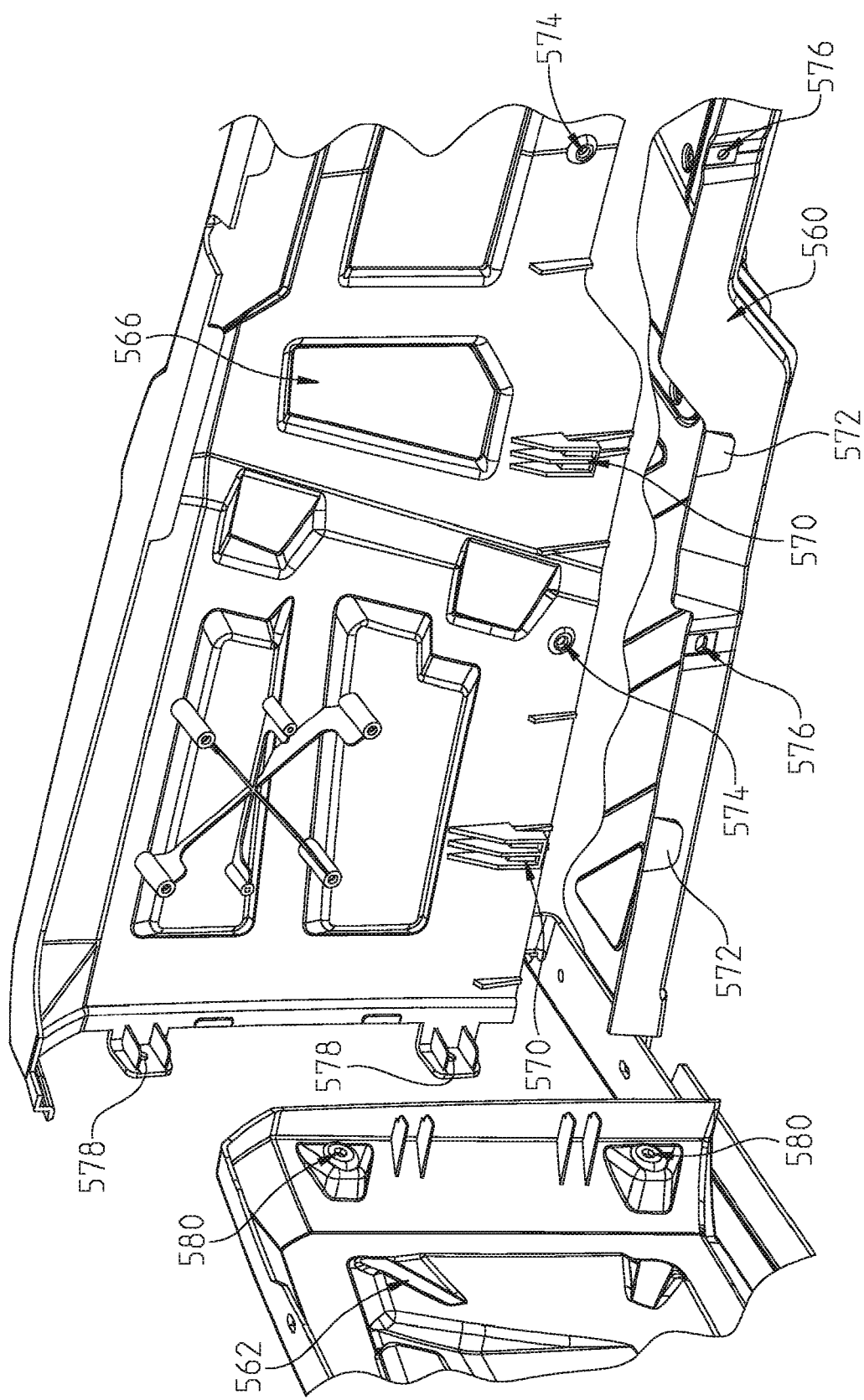
FIG. 32 illustrates the connection of a floor body panel, a first side body panel, a removable engine access body panel of FIG. 30.

Referring to FIG. 30, seating 176 is shown in combination with a floor body panel 560, a first side body panel 562, a second side body panel 564 (see FIG. 31), and a removable under seat body panel 566. Seat body panel 566 is removable to allow access to power source 130. Referring to FIG. 32, seat body panel 566 includes a plurality of retainers 570 which interact with portions 572 of floor body panel 560. In the illustrated embodiment, retainers 570 are clips which clip over wedge shaped portions 572.

Seat body panel 566 is further coupled to floor body panel 560 through connectors received in openings 574 in seat body panel 566 and openings 576 in floor body panel 560. Seat body panel 566 is further coupled to first side body panel 562 through connectors received in openings 578 in seat body panel 566 and openings 580 in first side body panel 562 and is coupled to second side body panel 564 through similar connections. Seat body panel 566 is removed to permit access to power source 130 by removing the connectors attaching seat body panel 566 to floor body panel 560, first side body panel 562, and second side body panel 564 and then rotating and lifting seat body panel 566 relative to floor body panel 560 to uncouple retainers 570 from portions 572.

Figure 33:
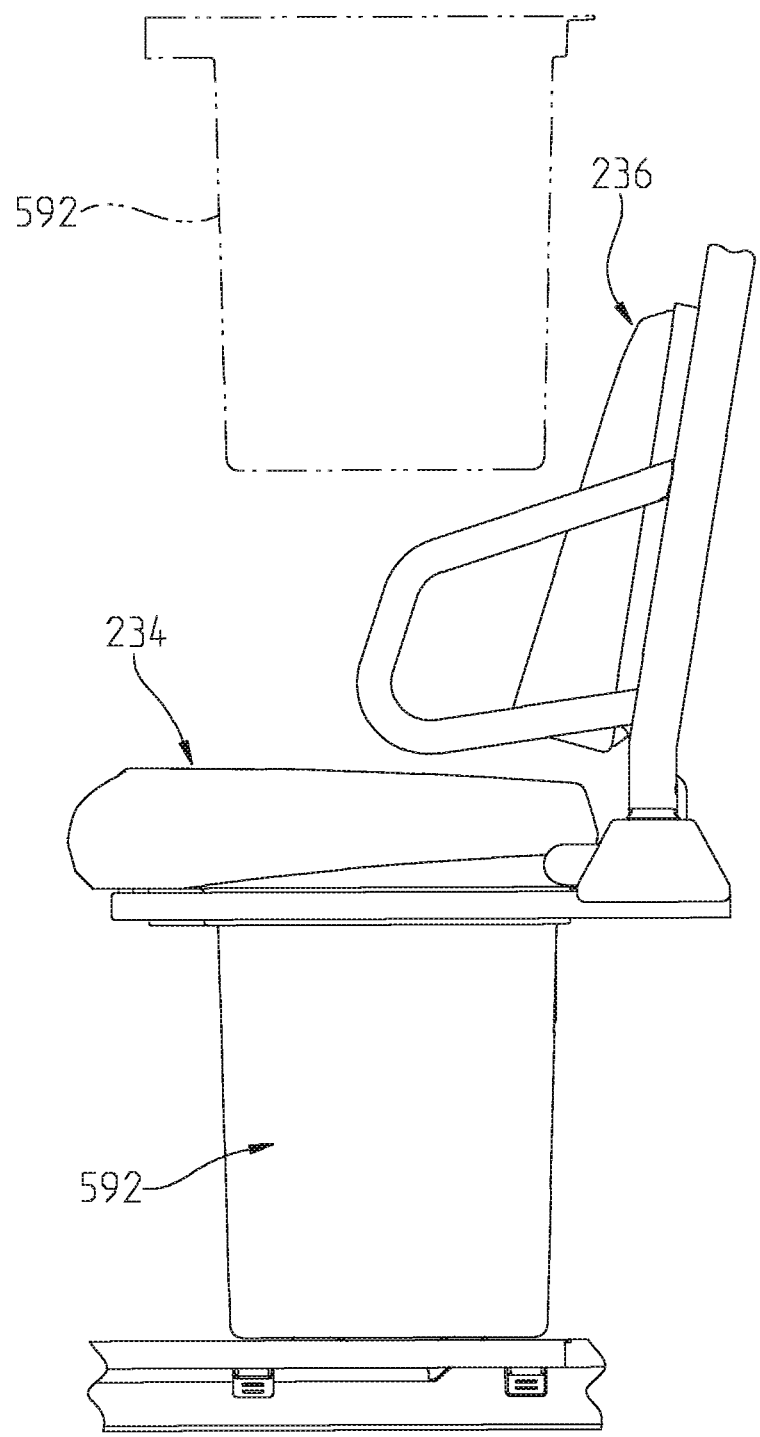
FIG. 33 illustrates a removable storage bin stored below the seating of the utility vehicle of FIG. 1.
Figure 34:
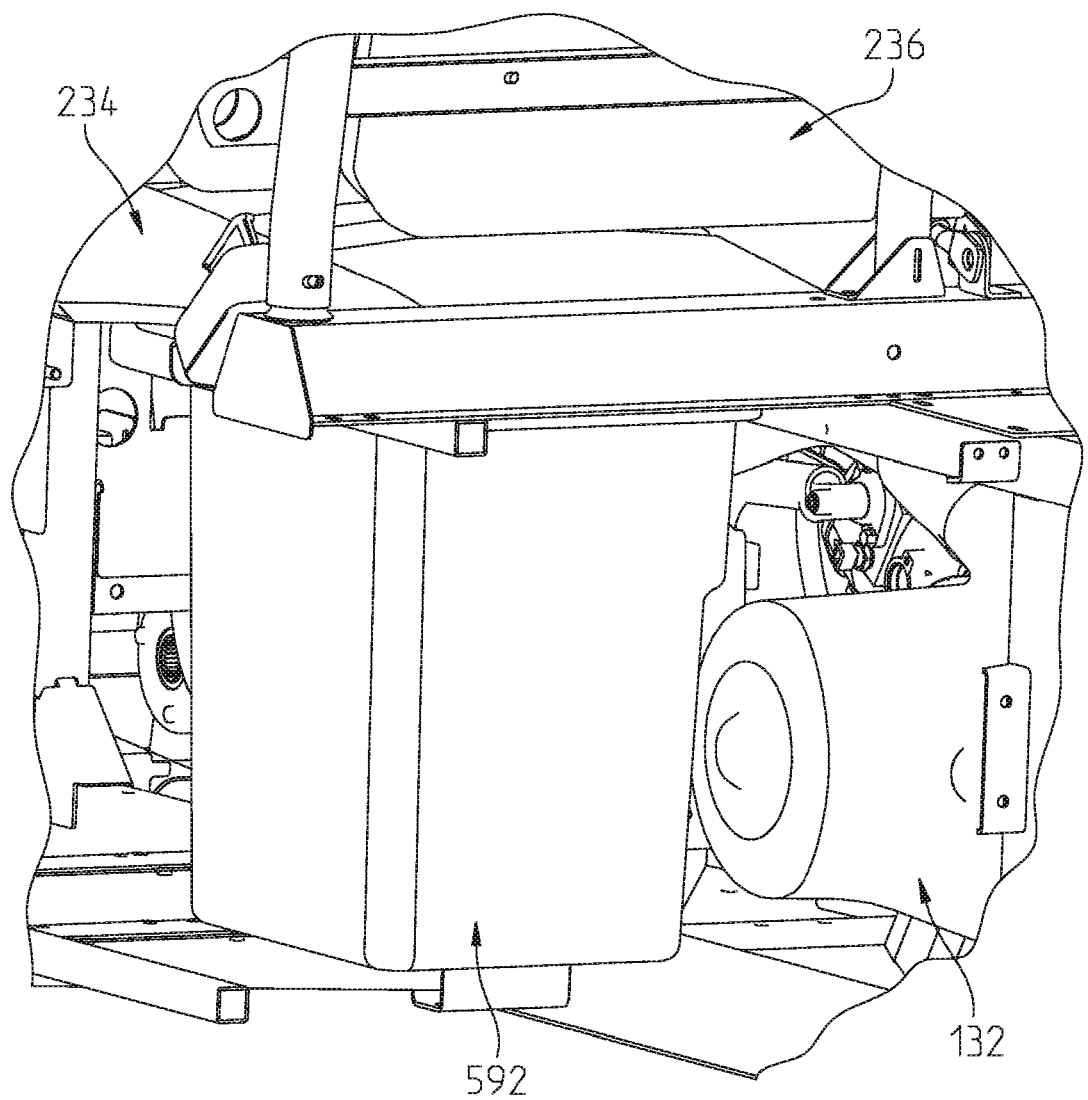
FIG. 34 illustrates the removable storage bin stored below the seating of the utility vehicle of FIG. 1.
Figure 35:
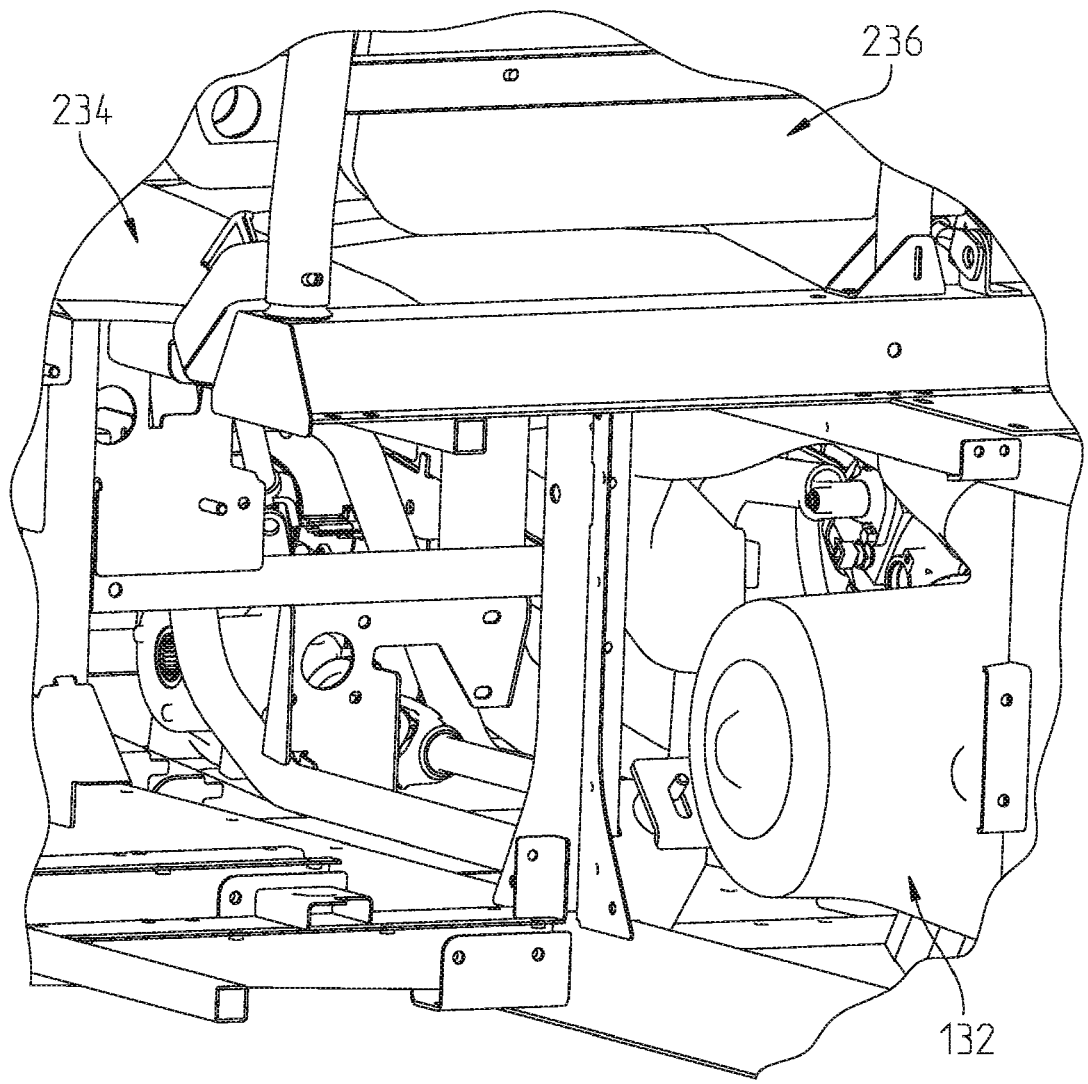
FIG. 35 illustrates the area corresponding to the removable storage bin when the removable storage bin is not stored therein.

Power source 130 may also be accessed by rotating seat bottom portion 234 forward. Referring to FIG. 30, a latch lever 590 is provided that releases the back portion of seat bottom portion 234 allowing the back portion of seat bottom portion 234 to rotate forward. Referring to FIGS. 33-35, another reason for rotating seat bottom portion 234 forward is to access and/or remove a storage bin 592 from below the operator's seat. With storage bin 592 removed access to CVT 135 is more accessible as shown by comparing FIG. 34 and FIG. 35.

Figure 36:
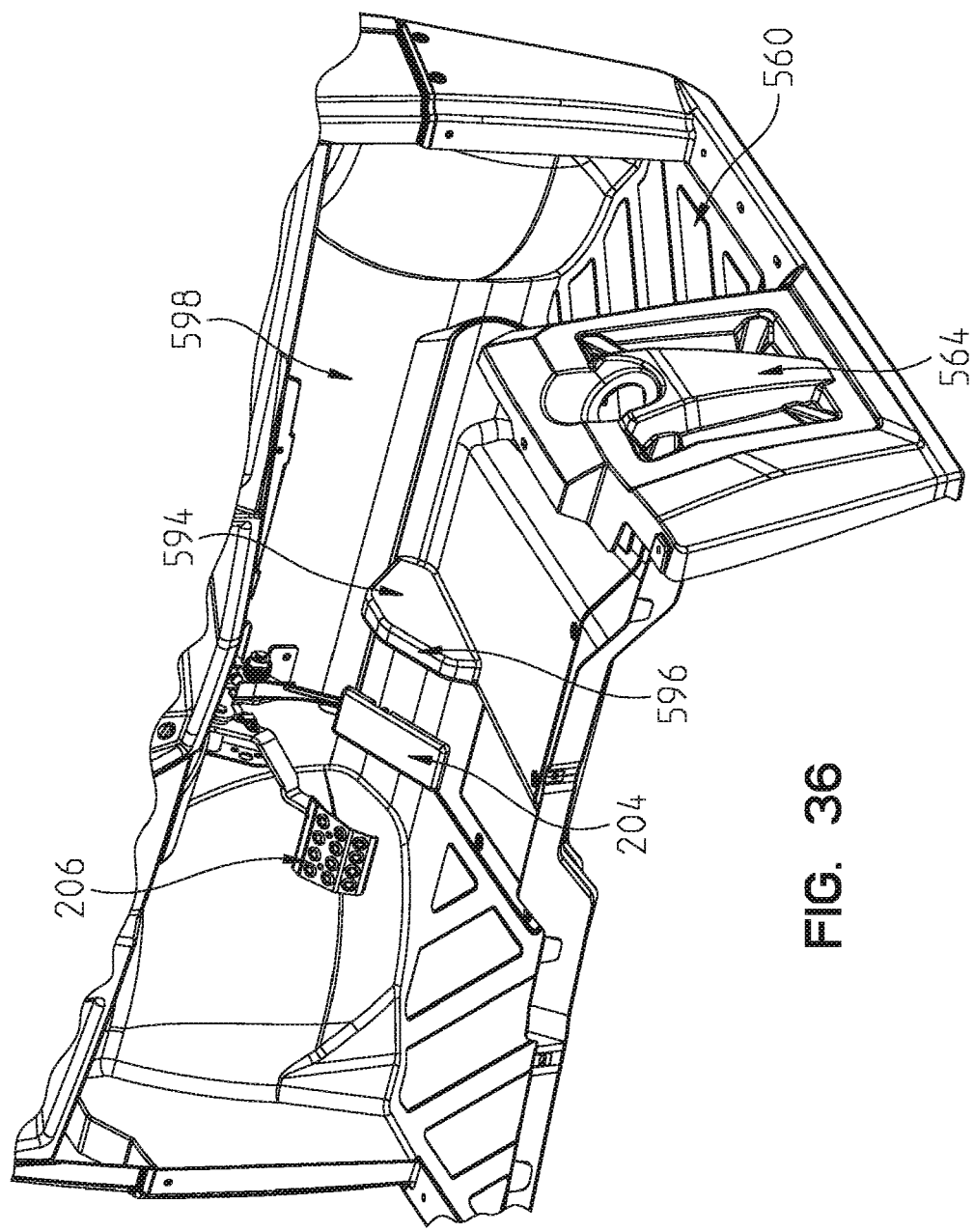
FIG. 36 illustrates a guard member provided as part of the floor body panel.
Figure 37:
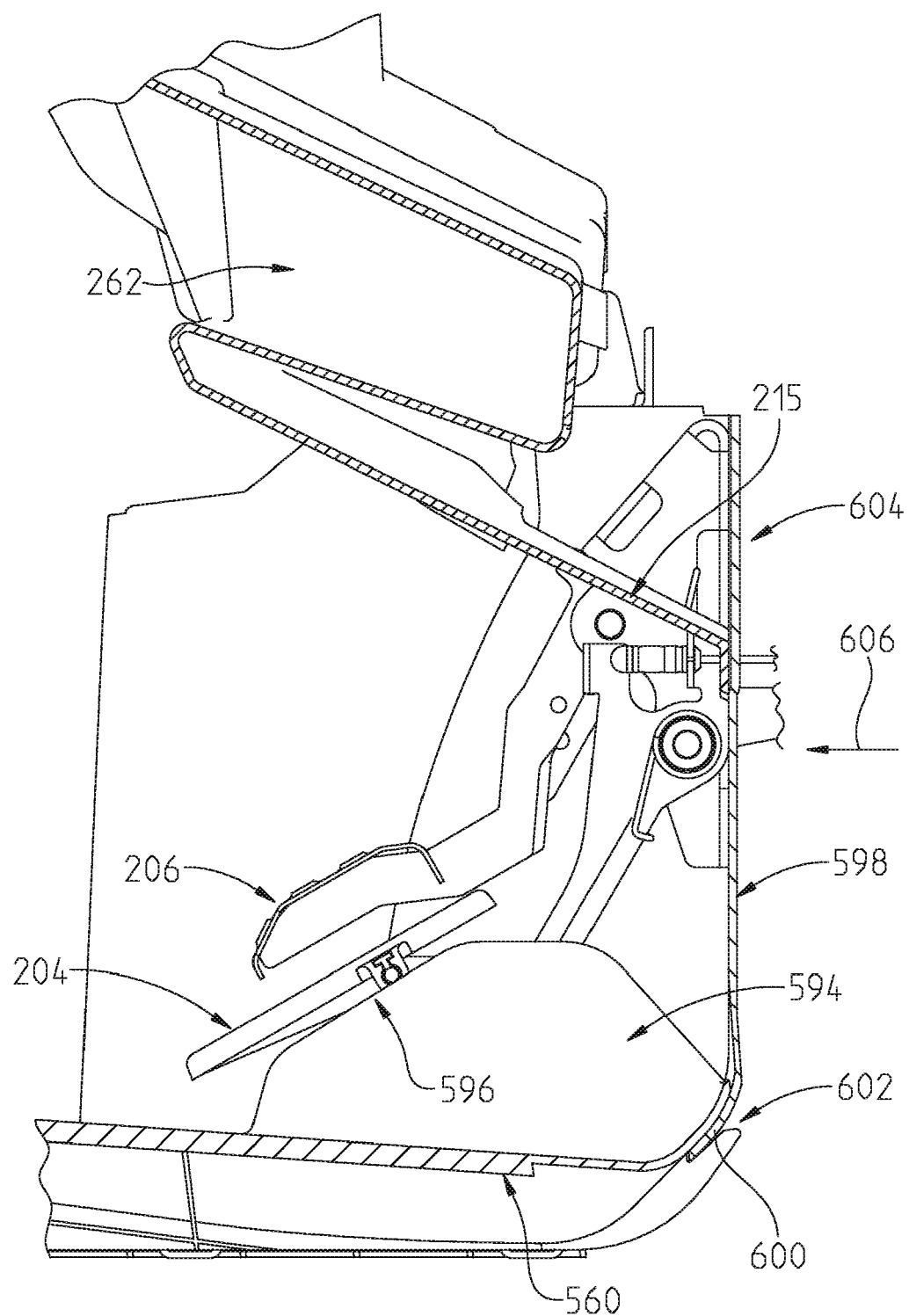
FIG. 37 illustrates a cross-section of the floor body panel, a front lower body panel, and an under dash body panel and the placement of the guard member of FIG. 36.

Referring to FIG. 36, floor body panel 560 is shown with the locations of pedal 204 and pedal 206. Floor body panel 560 further includes a guard member 594. Guard member 594 is positioned to prevent the foot of a passenger from entering vehicle operator position 192 and inadvertently depressing pedal 204. In the illustrated embodiment, guard member 594 does not extend across to seat body panel 566, but is rather localized in the area corresponding to pedal 204. Referring to FIG. 37, guard member 594 includes a first surface 596 which is generally parallel with pedal 204 and a height which is below a top edge of pedal 204 when pedal 204 is in the non-depressed position shown in FIG. 37.

As shown in FIG. 37, a front body panel 598 is shown which is coupled to floor body panel 560. A lower portion 600 of front body panel 598 is received in a groove 602 in floor body panel 560. At an upper portion 604 front body panel 598 overlaps dash body member 215. As such dash body member 215, floor body panel 560, and front body panel 598 cooperate to close of operator area 174 below dashboard body member 203 such that air from a front of vehicle 100 in direction 606 is restricted from entering operator area 174 between dash body member 215 and front body panel 598 and between floor body panel 560 and front body panel 598.

Figure 38:
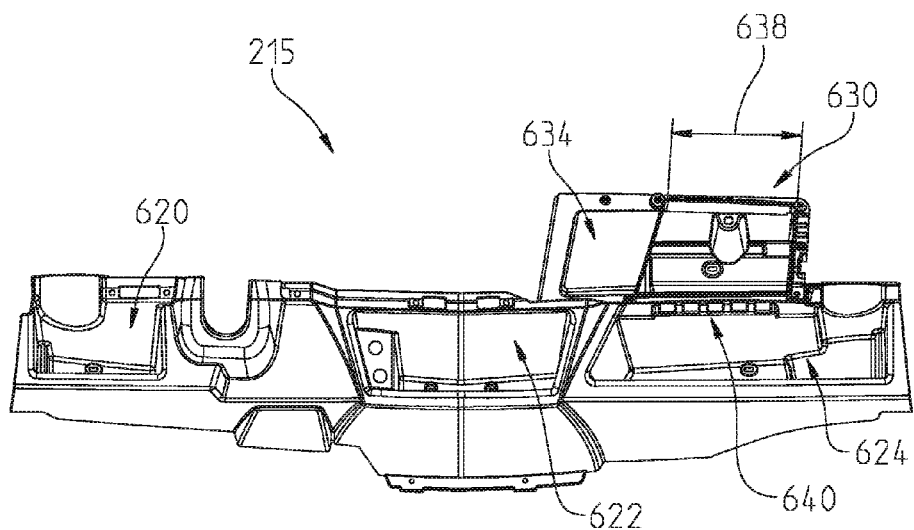
FIG. 38 illustrates the under dash panel of FIG. 37 having a front panel for a glove box closed.
Figure 39:
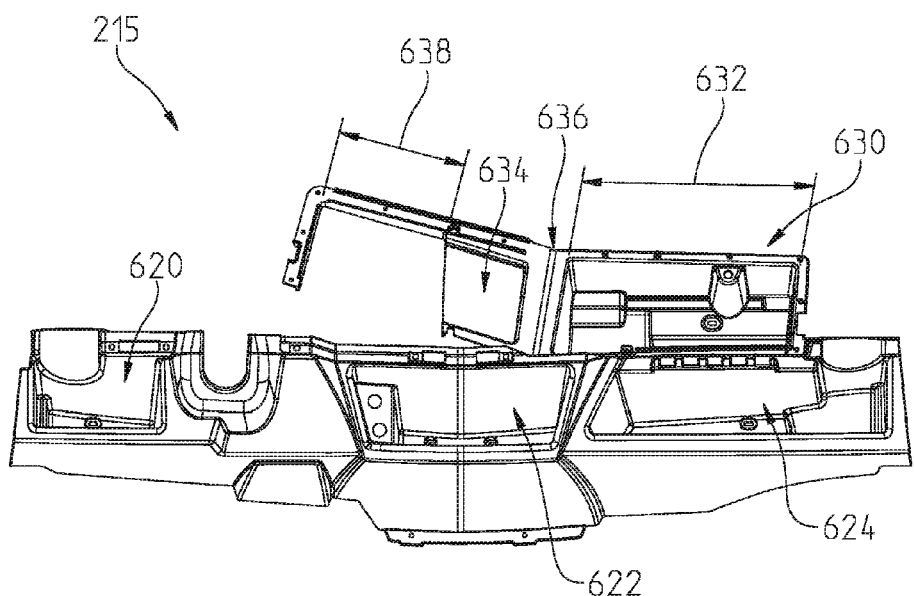
FIG. 39 illustrates the under dash panel of FIG. 37 having a front panel for a glove box open.

Referring to FIGS. 38 and 39, under dash body member 215 includes a plurality of storage bins 620, 622, and 624 which are positioned lower than dashboard body member 203. In one embodiment, each of storage bins 620, 622, and 624 are positioned below a seating surface of seat bottom portion 234. As shown in FIG. 38, storage bin 620 is positioned to the left of opening 626 for tilt steering member 183. Storage bin 622 is generally centered with vehicle 100. Storage bin 624 is positioned generally in a passenger area of operator area 174. Each of storage bins 260, 262, and 264 are angled such that a back portion of the respective storage bin is lower than a front portion of the respective storage bin. This is shown in FIG. 37 for storage bin 262.

Figure 40:
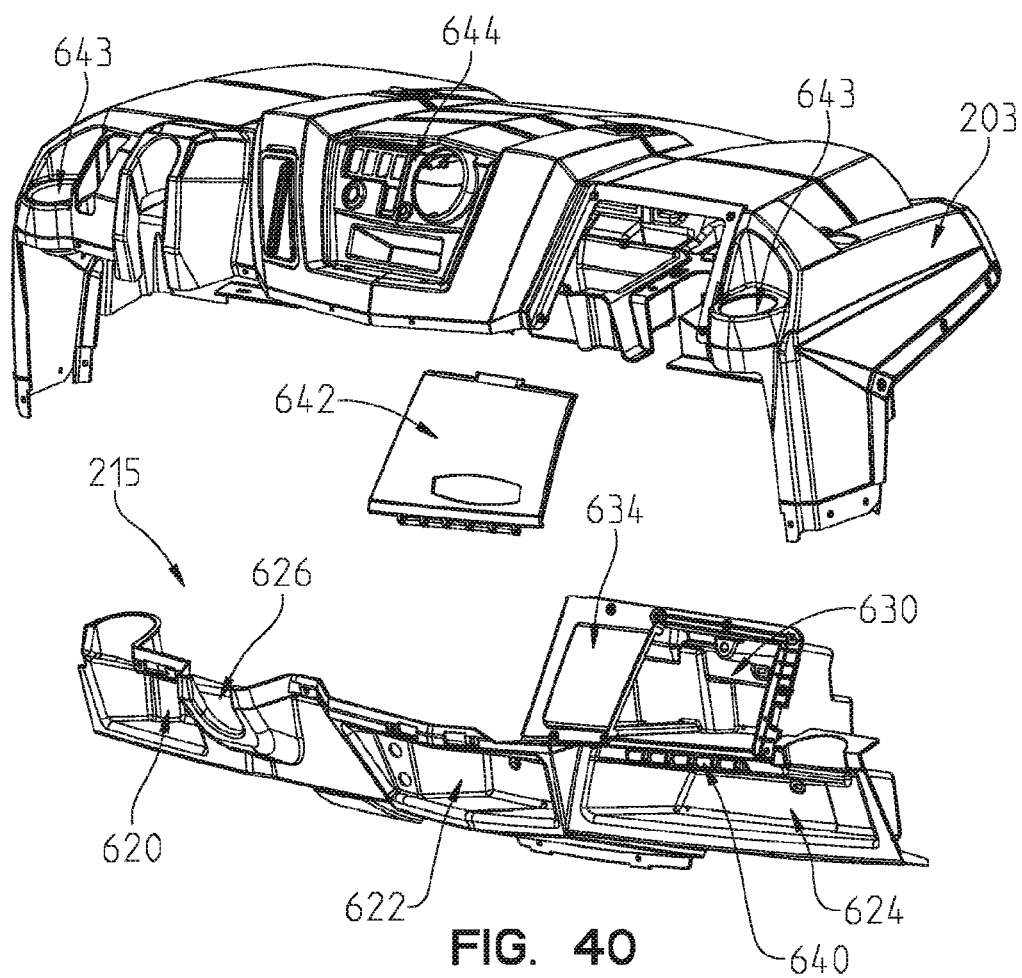
FIG. 40 illustrates an exploded assembly of the under dash body panel, a dash board body panel, and a glove box cover.

Referring to FIG. 39, under dash body member 215 further includes a glove box compartment 630. Glove box compartment 630 has a first width indicated by reference number 632. Also provided as part of under dash body member 215 is a front cover 634 for glove box compartment 630. Front cover 634 is coupled to the remainder of under dash body member 215 through a living hinge 636. Front cover 634 may be folded over the opening defined by glove box compartment 630 to produce a glove box with an access opening having a width indicated by reference number 638. Front cover 634 permits a large glove box compartment 630 to have a smaller access opening while ensuring that the contents of glove box compartment 630 do not inadvertently fall out of glove box compartment 630. In one embodiment, front cover 634 is screwed to the remainder of under dash body member 215 to secure it in place. Under dash body member 215 also includes a series of clips which form apart of the hinge for a cover 642 (see FIG. 40) of glove box compartment 630.

Figure 41:
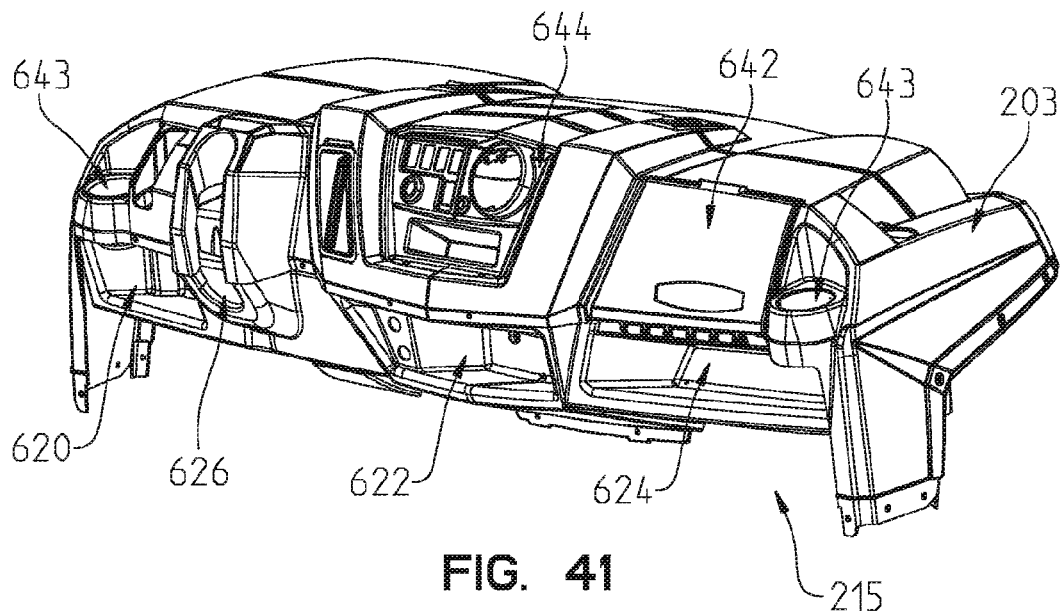
FIG. 41 illustrates the assembly of FIG. 40 assembled together.

Referring to FIG. 41, under dash body member 215, dashboard body member 203, and glove box cover 642 are shown assembled together. Dashboard body member 203 also includes cup holders 643 and a modular body member 644 which provides a plurality of instrumentation regarding the operation of vehicle 100. Modular body member 644 is removable relative to dashboard body member 203. This is useful when assembling electrical accessories to vehicle 100 in that it is easier to retrieve wires with modular body member 644 removed. It also facilitates upgrades to vehicle 100, such as the inclusion of a navigation system. Also, a first modular body member 644 may be used with a first power source 130 and a second modular body member 644 may be used with a second power source 130.

Figure 42:
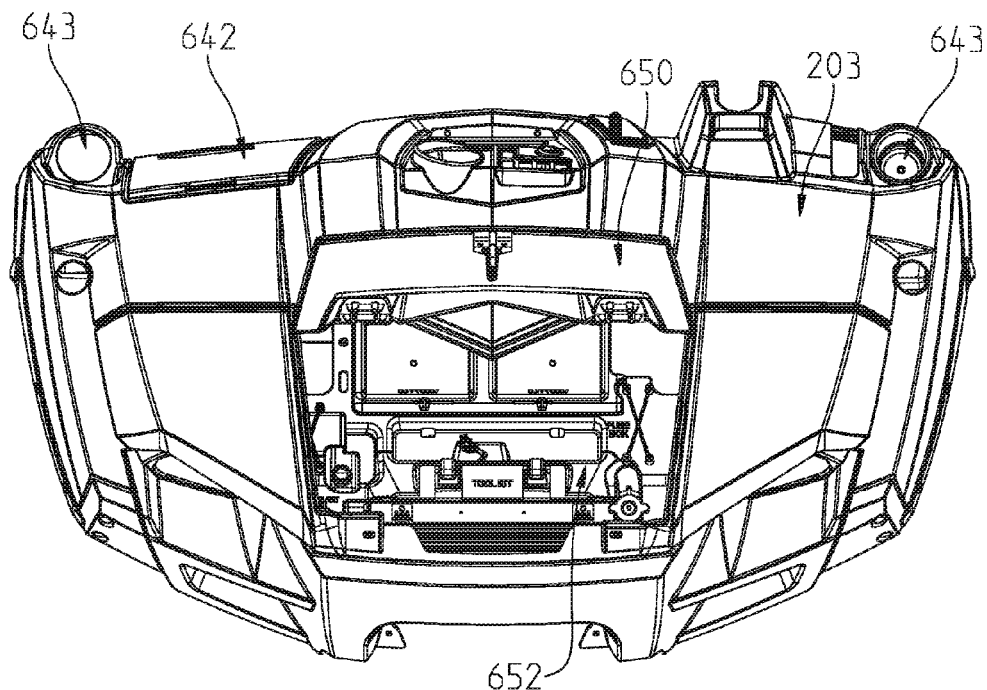
FIG. 42 illustrates a top view of the dash board body panel, a front body panel, and a hood.
Figure 43:
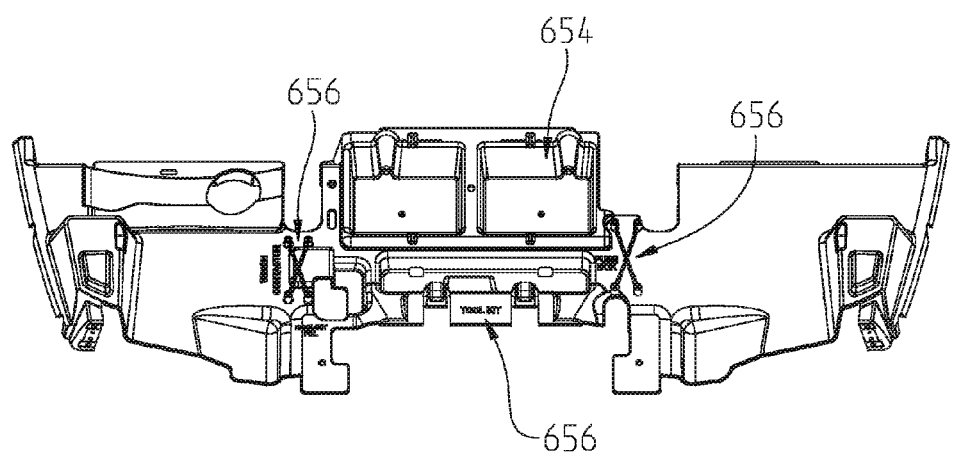
FIG. 43 illustrates a top view of a molded hood liner component accessible through the hood of FIG. 42.

Referring to FIG. 42, vehicle 100 also includes a hood 650 which is rotatable upward as shown in FIG. 42. Underneath hood 650 is a hood liner 652. Hood liner 652 is shown in FIG. 43. hood liner 652 includes bins 654 for holding up to two batteries and integrated supports 656 molded in to support various components, such as a fuse box.

Figure 44:
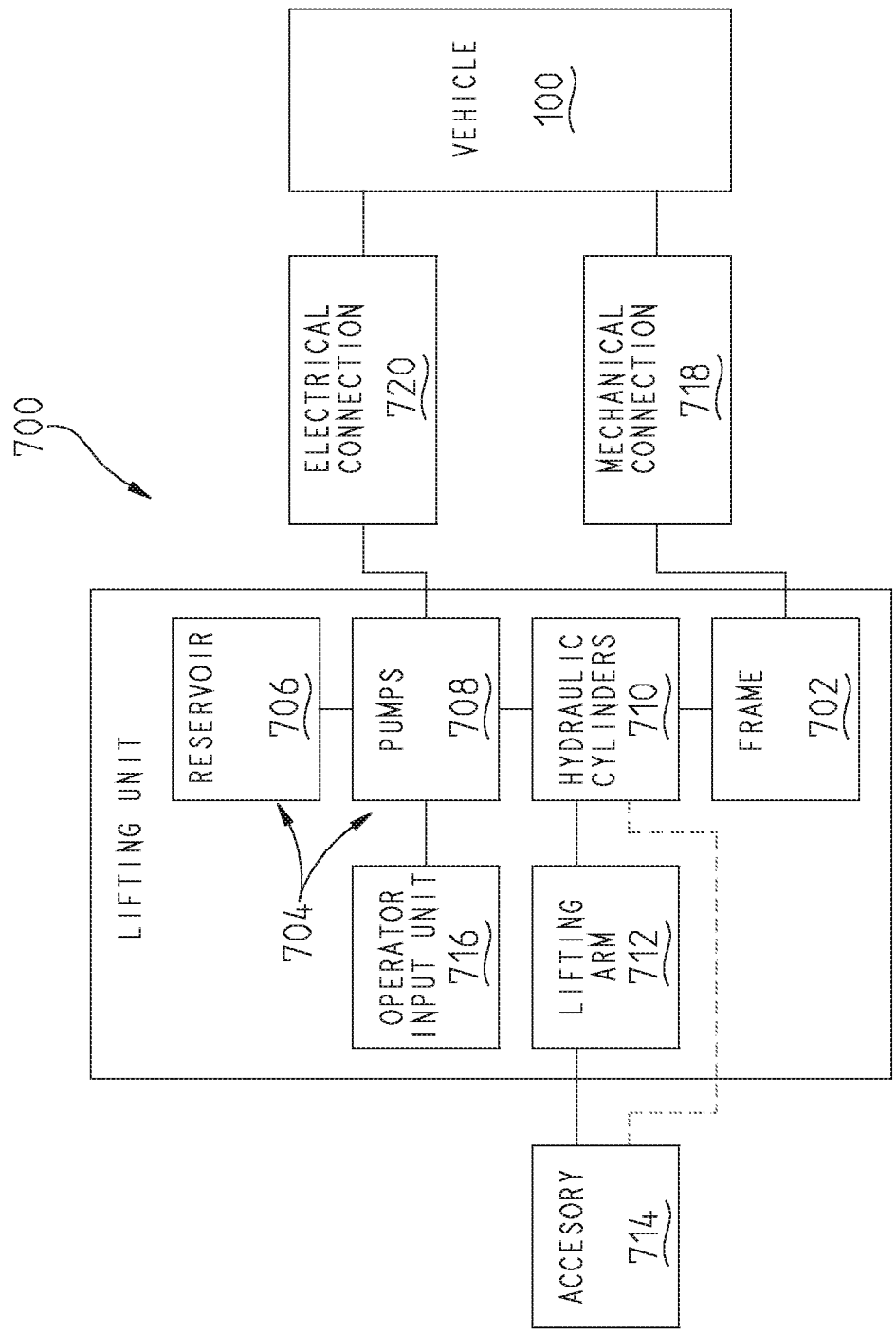
FIG. 44 illustrates a representative view of an accessory lift system for attachment to the utility vehicle of FIG. 1.

Referring to FIG. 44, a representation of an accessory lifting unit 700 is shown. Lifting unit 700 includes a frame 702 which supports a hydraulic system 704. Hydraulic system 704 includes one or more hydraulic reservoirs 706, one or more hydraulic pumps 708, and one or more hydraulic cylinders 710. The hydraulic cylinders 710 are in fluid communication with pumps 708 and reservoirs 706. Hydraulic cylinders 710 are further coupled to a lifting arm 712 to move the lifting arm 712 relative to frame 702. An accessory 714 may be coupled to lifting arm 712 and moveable therewith. Exemplary accessories include plows, buckets, hooks, and other suitable accessories. In one embodiment, such as a bucket accessory, the accessory is coupled to one of hydraulic cylinders 710 to actuate the movement of a first portion of the accessory relative to a second portion of the accessory (such as to dump a bucket). The movement of the hydraulic cylinders 710 being governed by inputs to an operator input unit 716 which controls pumps 708.

Lifting unit 700 is a self contained system and is coupled to vehicle 100 through a mechanical connection 718 and an electrical connection 720. Electrical connection 720 provides the power needed for lifting unit 700 and/or the connection to operator input 716 which may be positioned in operator area 174, such as supported by dashboard body panel 203.

Figure 45:
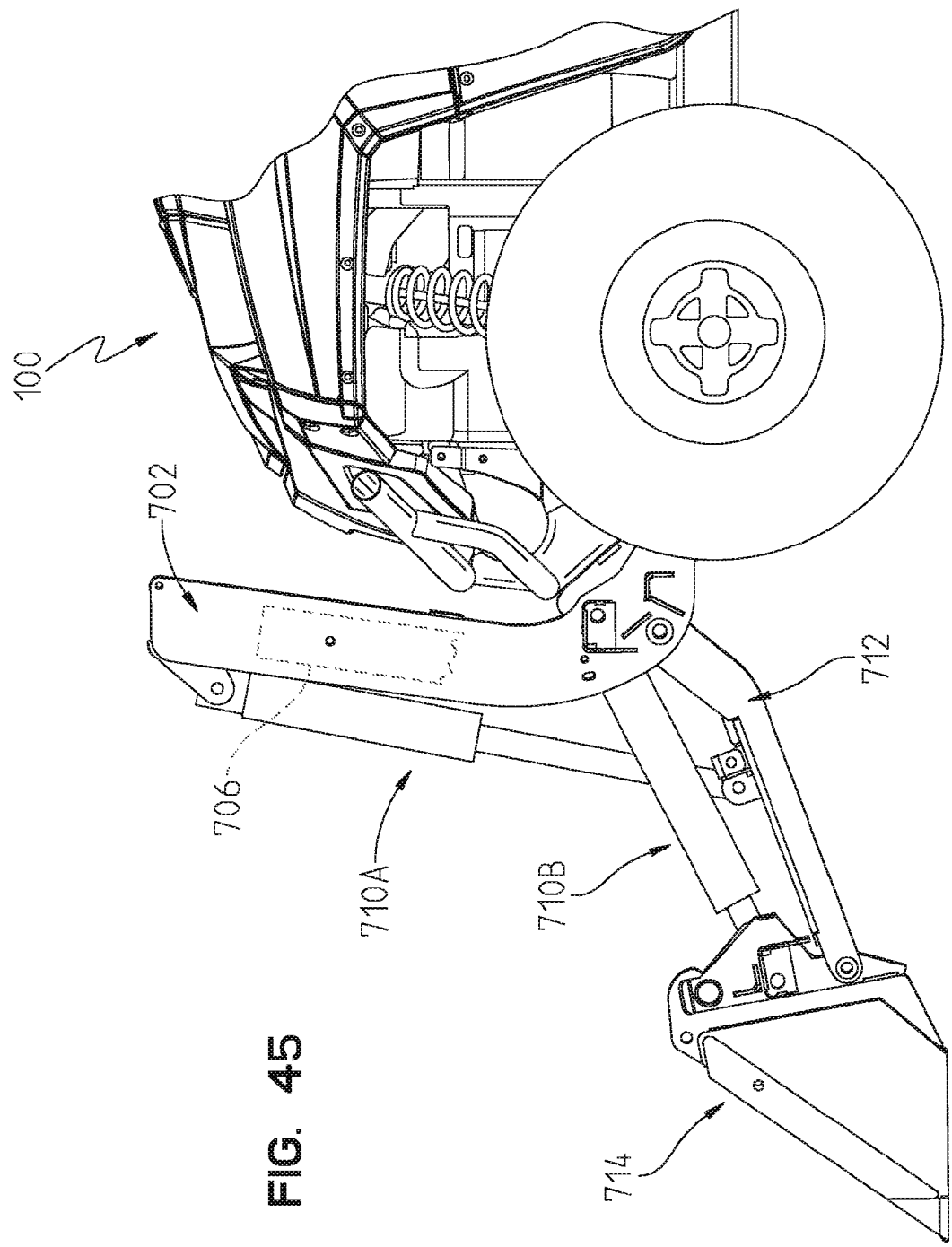
FIG. 45 illustrates an accessory lift system attached to the utility vehicle of FIG. 1 with hydraulic lines omitted.
Figure 46:
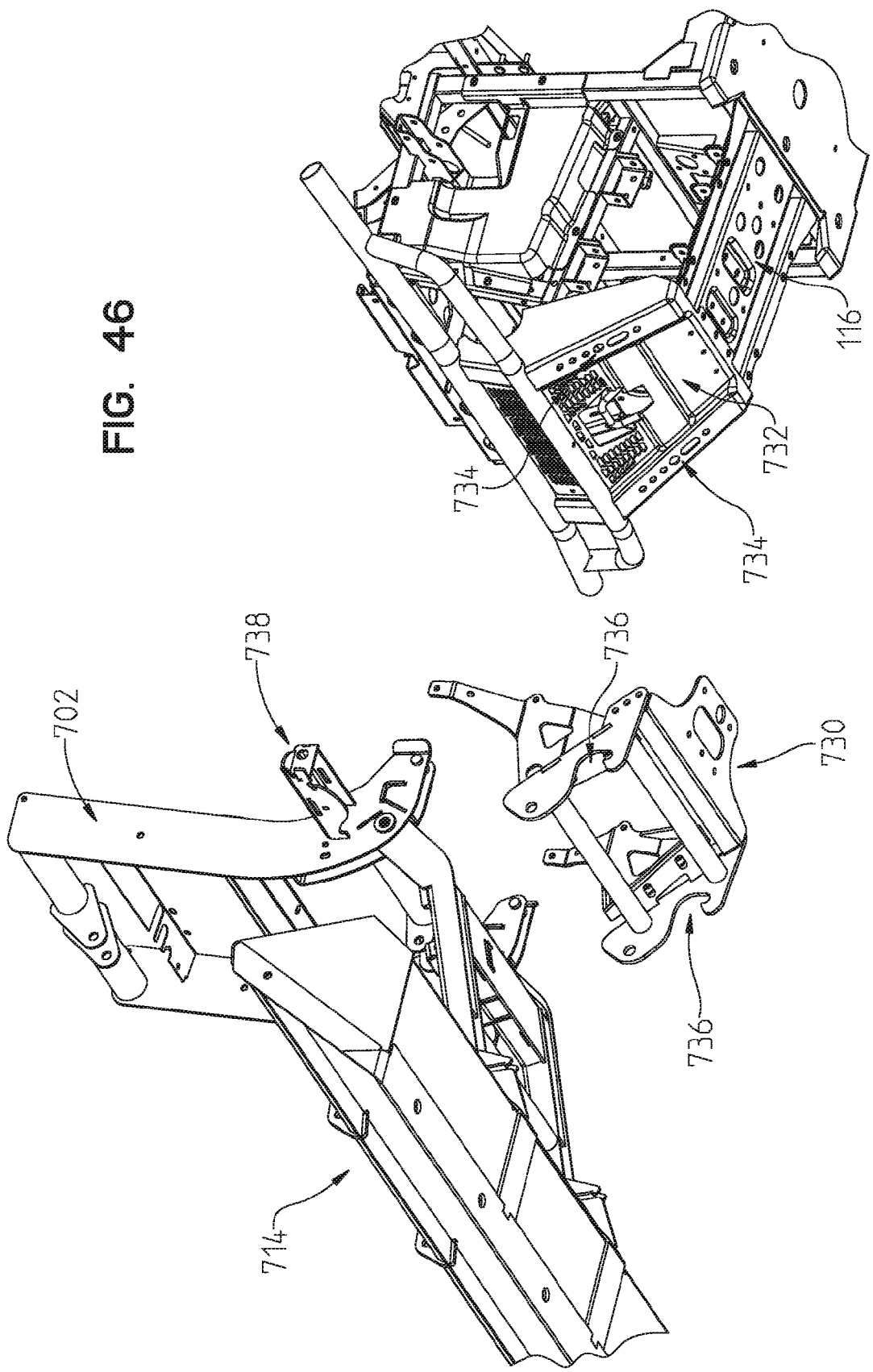
FIG. 46 illustrates an exploded view of portion of the accessory lift system of FIG. 45.

Referring to FIGS. 45-47, an exemplary embodiment of accessory lifting unit 700 is shown coupled to vehicle 100. As shown in FIG. 45, two hydraulic cylinders 710A and 710B are shown. Cylinder 710A is coupled to frame 702 and lifting arm 712 and is actuatable to move lifting arm 712 relative to frame 702. Cylinder 710A is coupled to lifting arm 712 and accessory 714 and is actuatable to move accessory 714 relative to frame 702.

Referring to FIG. 46, a front bumper 732 is coupled to frame 116 of vehicle 100. A frame 730 is coupled to front bumper 732 at locations 734 with couplers. Frame 730 includes features 736 which along with features 738 interact with a coupler which makes the mechanical connection 718 to couple accessory lifting unit 700 to frame 730. In embodiment, the coupler which makes the mechanical connection is the BOSS brand SmartHitch 2 system used with the BOSS brand snow plow available from Northern Star industries located in Iron Mountain, Mich. 49801-0787. The BOSS brand SmartHitch 2 system is also used to couple accessory 714 to lifting arm 712.

Figure 49A:
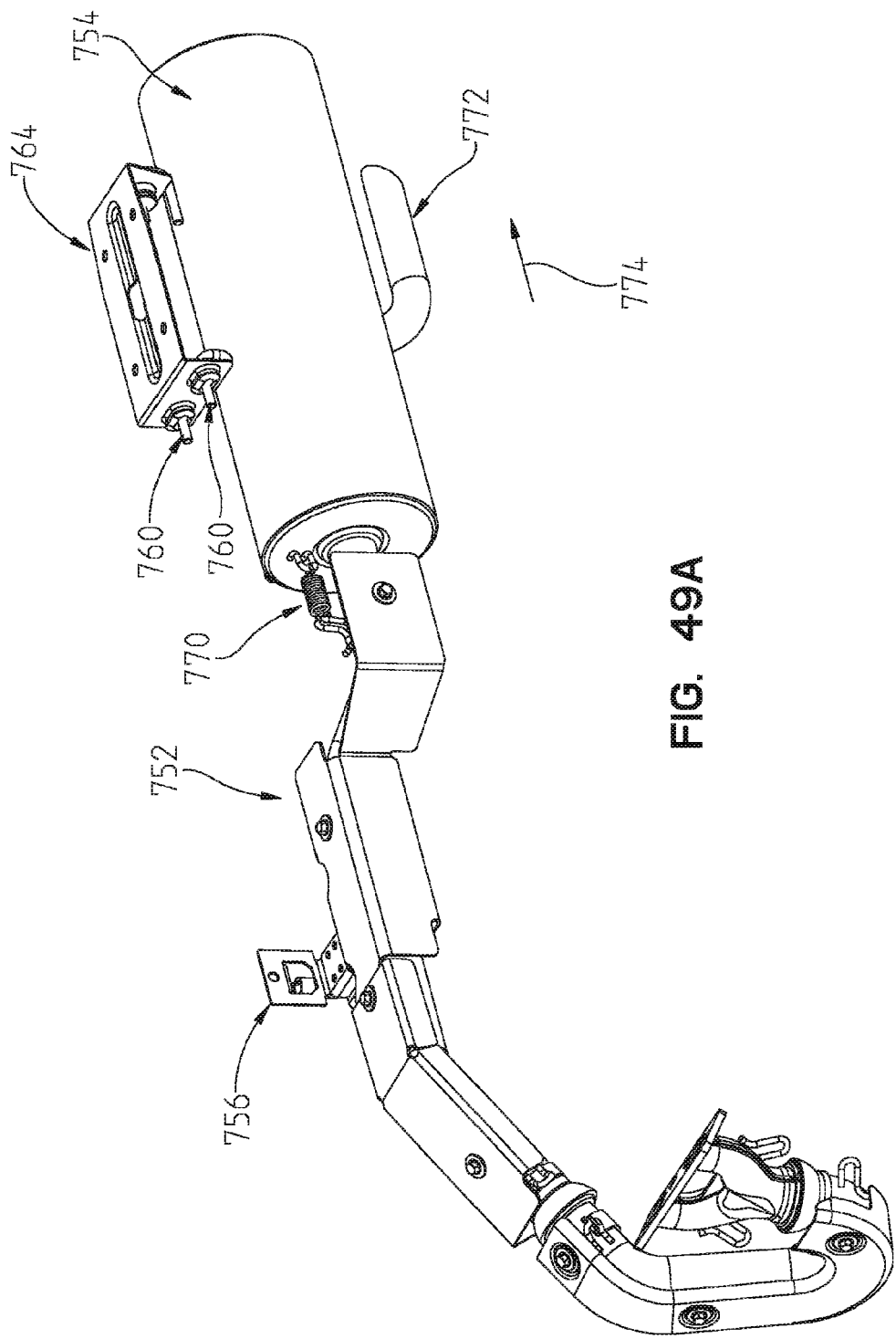
FIG. 49A and FIG. 49B illustrate an exhaust system of the vehicle.
Figure 49B:
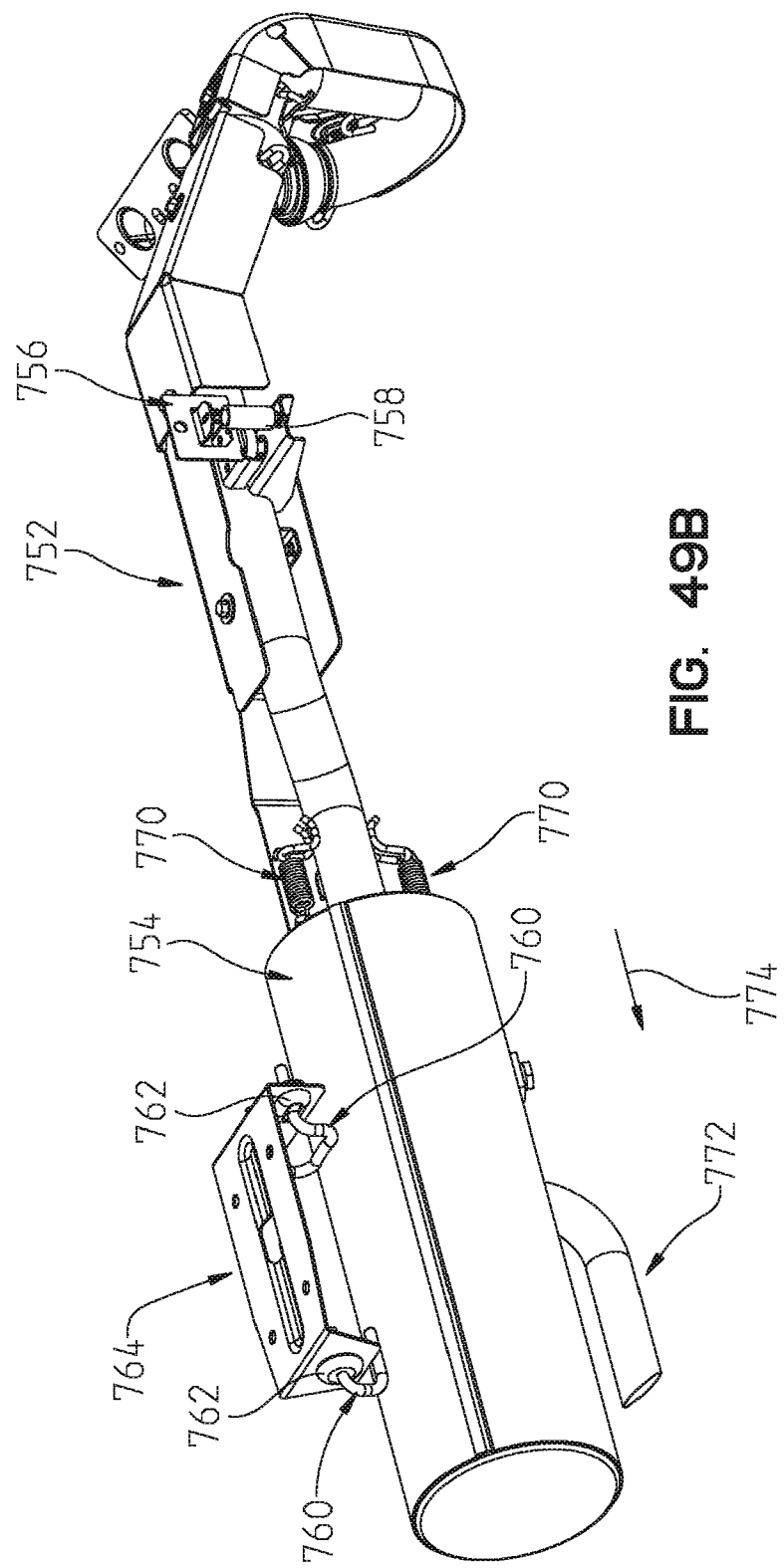
Figure 50:
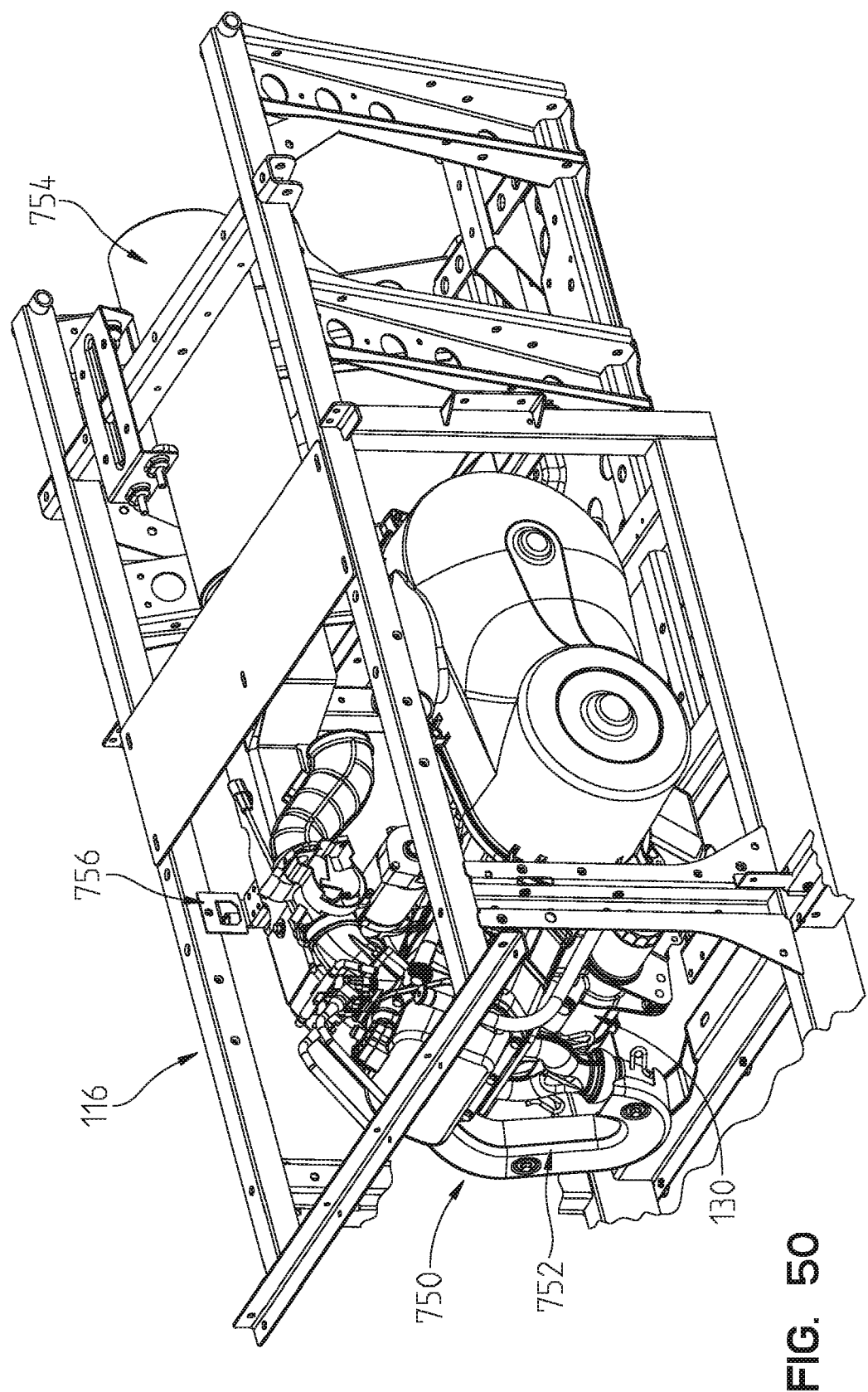
FIG. 50 illustrates the exhaust system coupled to the frame of the vehicle.

Referring to FIGS. 49A, 49B, and 50, the exhaust system 750 is shown. Referring to FIG. 50, an exhaust conduit 752 is coupled to power source 130. The exhaust conduit 752 travels back along frame 116 and is received in a muffler 754. Referring to FIG. 49B, exhaust conduit 752 is coupled to a bracket 756 through a spring 758. Bracket 756 is in turn coupled to frame 116.

Muffler 754 receives an end of exhaust conduit 752 and includes a plurality of hooks 760 which are received in grommets 762 carried by a bracket 764. Exhaust exits muffler 754 through a tail pipe 772. Bracket 764 is in turn coupled to frame 116. Muffler 754 is coupled to exhaust conduit 752 through springs 770. As such, exhaust conduit 752 is not rigidly coupled to frame 116, but rather floats relative to frame 116. Without springs 770 coupling muffler 754 to exhaust conduit 752, muffler 754 may be moved in direction 774 and removed from frame 116.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A shock, comprising:
a first body member supporting a first piston and having a first stop member;
a second body member having a second stop member, the second body member being received in an interior of the first body member and the first piston being received in an interior of the second body member, the second body member including a second piston received in the first body member;
a spring being compressed between the first stop member of the first body member and the second stop member of the second body member, at least one of the first stop member and the second stop member being moveable relative to the respective one of the first body member and the second body member; and an air inlet member being in fluid communication with the interior the first body member.

2. The shock of claim 1, wherein the second stop member is moveable relative to the second body member to adjust the compression of the spring between the first stop member and the second stop member.

3. The shock of claim 1, wherein the second stop member is a ring having an opening which receives the second body member.

4. The shock of claim 3, wherein the second stop member has a threaded internal surface which engages with a threaded external surface of the second body member.

5. The shock of claim 1, wherein an overall stiffness of the shock may be adjusted by both a mechanical stiffness and a fluidic stiffness.

6. The shock of claim 5, wherein the mechanical stiffness is adjusted by changing a separation of the first stop member and the second stop member.

7. The shock of claim 5, wherein the fluidic stiffness is adjusted by passing air through the air inlet and one of into the interior of the first body member and out of the interior of the first body member.

8. The shock of claim 1, wherein the first stop member is moveable relative to the first body member and the second stop member is moveable relative to the second body member.

9. The shock of claim 1, wherein the first stop member is a first ring which receives the first body member, the first ring being movable relative to the first body member, and wherein the second stop member is a second ring which receives the second body member, the second ring being movable relative to the second body member.

10. The shock of claim 1, wherein the second piston is coupled to an end of the second body member.

11. The shock of claim 10, wherein the second piston carries a seal, the seal being spaced apart from the second body member.

12. The shock of claim 10, wherein the second piston is threadably coupled to the second body member.

13. The shock of the claim 10, wherein the second piston includes a central opening which receives a guide shaft, the guide shaft being coupled to the first body member.

14. The shock of claim 13, wherein the guide shaft supports the first piston.

15. The shock of claim 14, wherein the guide shaft is coupled to the first body member proximate a first end of the guide shaft and the first piston is supported by the guide shaft proximate a second end of the guide shaft.

16. The shock of claim 15, wherein the first piston is positioned between the second end of the guide shaft and the second piston.

17. The shock of claim 16, wherein the first piston is a dampening piston.

* * * * *